United States Patent
Harada et al.

(10) Patent No.: US 9,882,212 B2
(45) Date of Patent: Jan. 30, 2018

(54) ACTIVE MATERIAL, NONAQUEOUS ELECTROLYTE BATTERY, BATTERY PACK AND BATTERY MODULE

(71) Applicant: KABUSHIKI KAISHA TOSHIBA, Minato-ku (JP)

(72) Inventors: Yasuhiro Harada, Isehara (JP); Norio Takami, Yokohama (JP); Yorikazu Yoshida, Yokohama (JP); Kazuki Ise, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 30 days.

(21) Appl. No.: 15/066,402

(22) Filed: Mar. 10, 2016

(65) Prior Publication Data
US 2016/0268603 A1 Sep. 15, 2016

(30) Foreign Application Priority Data

Mar. 13, 2015 (JP) .................................. 2015-050791
Jan. 29, 2016 (WO) .................. PCT/JP2016/052708

(51) Int. Cl.
*H01M 4/00* (2006.01)
*H01M 4/485* (2010.01)
(Continued)

(52) U.S. Cl.
CPC .......... *H01M 4/485* (2013.01); *C01G 23/003*
(2013.01); *C01G 23/005* (2013.01);
(Continued)

(58) Field of Classification Search
CPC .. C01G 23/005; C01G 31/006; C01G 33/006; C01G 35/006; C01G 39/006;
(Continued)

(56) References Cited

U.S. PATENT DOCUMENTS

| 5,478,674 A | 12/1995 | Miyasaka |
| 2004/0131941 A1 | 7/2004 | Belharouak et al. |
| (Continued) | | |

FOREIGN PATENT DOCUMENTS

| JP | 6-310143 A | 11/1994 |
| JP | 10-208747 A | 8/1998 |
| (Continued) | | |

OTHER PUBLICATIONS

International Search Report and Written Opinion dated May 10, 2016 in PCT/JP2016/052708 with (English translation of categories of cited documents).
(Continued)

*Primary Examiner* — Mark F Huff
*Assistant Examiner* — Monique Wills
(74) *Attorney, Agent, or Firm* — Oblon, McClelland, Maier & Neustadt, L.L.P.

(57) ABSTRACT

In general, according to one embodiment, there is provided an active material. The active material contains a composite oxide having an orthorhombic crystal structure. The composite oxide is represented by a general formula of $Li_{2+w}Na_{2-x}M1_yTi_{6-z}M2_zO_{14+\delta}$. In the general formula, the M1 is at least one selected from the group consisting of Cs and K; the M2 is at least one selected from the group consisting of Zr, Sn, V, Nb, Ta, Mo, W, Fe, Co, Mn, and Al; and w is within a range of $0 \le w \le 4$, x is within a range of $0 < x < 2$, y is within a range of $0 \le y < 2$, z is within a range of $0 < z \le 6$, and $\delta$ is within a range of $-0.5 \le \delta \le 0.5$.

14 Claims, 12 Drawing Sheets

(51) Int. Cl.

| | | |
|---|---|---|
| C01G 23/00 | (2006.01) | |
| H01M 4/131 | (2010.01) | |
| H01M 4/36 | (2006.01) | |
| H01M 10/052 | (2010.01) | |
| C01G 25/00 | (2006.01) | |
| C01G 31/00 | (2006.01) | |
| C01G 33/00 | (2006.01) | |
| C01G 35/00 | (2006.01) | |
| C01G 39/00 | (2006.01) | |
| C01G 49/00 | (2006.01) | |
| C01G 51/00 | (2006.01) | |
| H01M 4/62 | (2006.01) | |
| H01M 10/0525 | (2010.01) | |
| H01M 4/02 | (2006.01) | |

(52) U.S. Cl.
CPC ......... *C01G 25/006* (2013.01); *C01G 31/006* (2013.01); *C01G 33/006* (2013.01); *C01G 35/006* (2013.01); *C01G 39/006* (2013.01); *C01G 49/0027* (2013.01); *C01G 51/42* (2013.01); *H01M 4/131* (2013.01); *H01M 4/366* (2013.01); *H01M 10/052* (2013.01); *C01P 2002/72* (2013.01); *C01P 2002/76* (2013.01); *C01P 2002/77* (2013.01); *C01P 2006/12* (2013.01); *C01P 2006/40* (2013.01); *H01M 4/625* (2013.01); *H01M 10/0525* (2013.01); *H01M 2004/021* (2013.01); *H01M 2004/027* (2013.01)

(58) Field of Classification Search
CPC ........ C01G 49/0027; H01M 2004/027; H01M 4/131; H01M 4/366; H01M 4/485; H01M 4/625; H01M 110/0525; H01M 2004/021
See application file for complete search history.

(56) References Cited

U.S. PATENT DOCUMENTS

| | | |
|---|---|---|
| 2008/0078594 A1 | 4/2008 | Harada et al. |
| 2009/0042095 A1 | 2/2009 | Inagaki et al. |
| 2012/0328930 A1 | 12/2012 | Inagaki et al. |
| 2014/0295231 A1 | 10/2014 | Ise et al. |
| 2014/0312269 A1* | 10/2014 | Laumann ............... C01G 23/00 252/182.1 |
| 2015/0010820 A1 | 1/2015 | Takami et al. |

FOREIGN PATENT DOCUMENTS

| | | |
|---|---|---|
| JP | 2005/267940 A | 9/2005 |
| JP | 2007-227199 A | 9/2007 |
| JP | 2008-91079 A | 4/2008 |
| JP | 4237659 B2 | 12/2008 |
| JP | 2009-43679 A | 2/2009 |
| JP | 2010-123424 A | 6/2010 |
| JP | 2013-8493 A | 1/2013 |
| JP | 2014-103032 A | 6/2014 |
| JP | 2014-238960 A | 12/2014 |
| JP | 2015-35420 A | 2/2015 |
| KR | 10-2014-0117273 A | 10/2014 |
| WO | WO 2016/088193 A1 | 6/2016 |

OTHER PUBLICATIONS

Extended European Search Report dated Jun. 10, 2016 in Patent Application No. 16153345.0.
Zonghai Chen, et al., "Titanium-Based Anode Materials for Safe Lithium-Ion Batteries" Advanced Functional Materials, vol. 23, XP001581750, 2013, pp. 959-969.
A. Detcheva, et al., "Analysis of single crystals based on strontium-lithium-titanium oxides by inductively coupled plasma atomic emission spectrometry" Spectrochimica Acta Part B, vol. 58, XP004703791, 2003, pp. 1481-1488.
Kaiqiang Wu, et al., "Phase composition and electrochemical performance of sodium lithium titanates as anode materials for lithium rechargeable batteries" Journal of Power Sources, vol. 275, XP029109324, 2015, pp. 419-428.
I. Koseva, et al., "A new family of isostructural titanates, $MLi_2Ti_6O_{14}$(M = Sr, Ba, Pb)" Journal of Alloys and Compounds, vol. 389, XP027812612, 2005, pp. 47-54.
Damien Dambournet, et al., "$MLi_2Ti_6O_{14}$ (M = Sr, Ba 2Na) Lithium Insertion Titanate Materials: A Comparative Study" Inorganic Chemistry, vol. 49, No. 6, XP055273926, 2010, pp. 2822-2826.
Extended European Search Report dated Jul. 13, 2016 in Patent Application No. 16159127.6.
Mengmeng Lao, et al., "Preparation and Electrochemical Characterization of $Li_{2+x}Na_{2-x}Ti_6O_{14}$ (0 ≤ x ≤ 0.2) as anode Materials for Lithium-ion batteries" Ceramics International, Elsevier, vol. 41, No. 2, XP029106099, Oct. 27, 2014, pp. 2900-2907.
Pengfei Wang, et al., "Improved Lithium Storage Performance of Lithium Sodium Titanate Anode by Titanium Site Substitution with Aluminum" Journal of Power Sources, Elsevier, vol. 293, XP055285710, May 20, 2015, pp. 33-41.
Office Action dated Jul. 12, 2016 in Japanese Patent Application No. 2016-088601 (with unedited computer generated English translation).
Office Action dated Jul. 12, 2016 in Japanese Patent Application No. 2016-015626 (with unedited computer generated English translation).
Office Action dated Jul. 12, 2016 in Japanese Patent Application No. 2016-088372 (with English translation).
Office Action dated Jul. 12, 2016 in Japanese Patent Application No. 2016-041529 (with English translation).
International Search Report dated May 10, 2016 in PCT/JP2016/052708 (submitting English translation only, original previously filed).
Office Action dated Jan. 31, 2017 in Korean Patent Application No. 10-2016-0027533.
I. Belharouak, et al., "$Li_2MT_6O_{14}$ (M=Sr, Ba): new anodes for lithium-ion batteries" Electrochemistry Communications, vol. 5, 2003, pp. 435-438.
S. Y. Yin, et al. "Reversible lithium storage in $Na_2Li_2Ti_6O_{14}$ as anode for lithium ion batteries" Electrochemistry Communications, vol. 11, 2009, pp. 1251-1254.
Izumi Nakai, et al., "Funmatsu X sen Kaisetsu no Jissai (Reality of Powder X-Ray Analysis)" X-Ray Analysis Investigation Conversazione, The Japan Society for Analytical Chemistry, Asakura Publishing Co., Ltd., 2002, pp. 97-115.

* cited by examiner

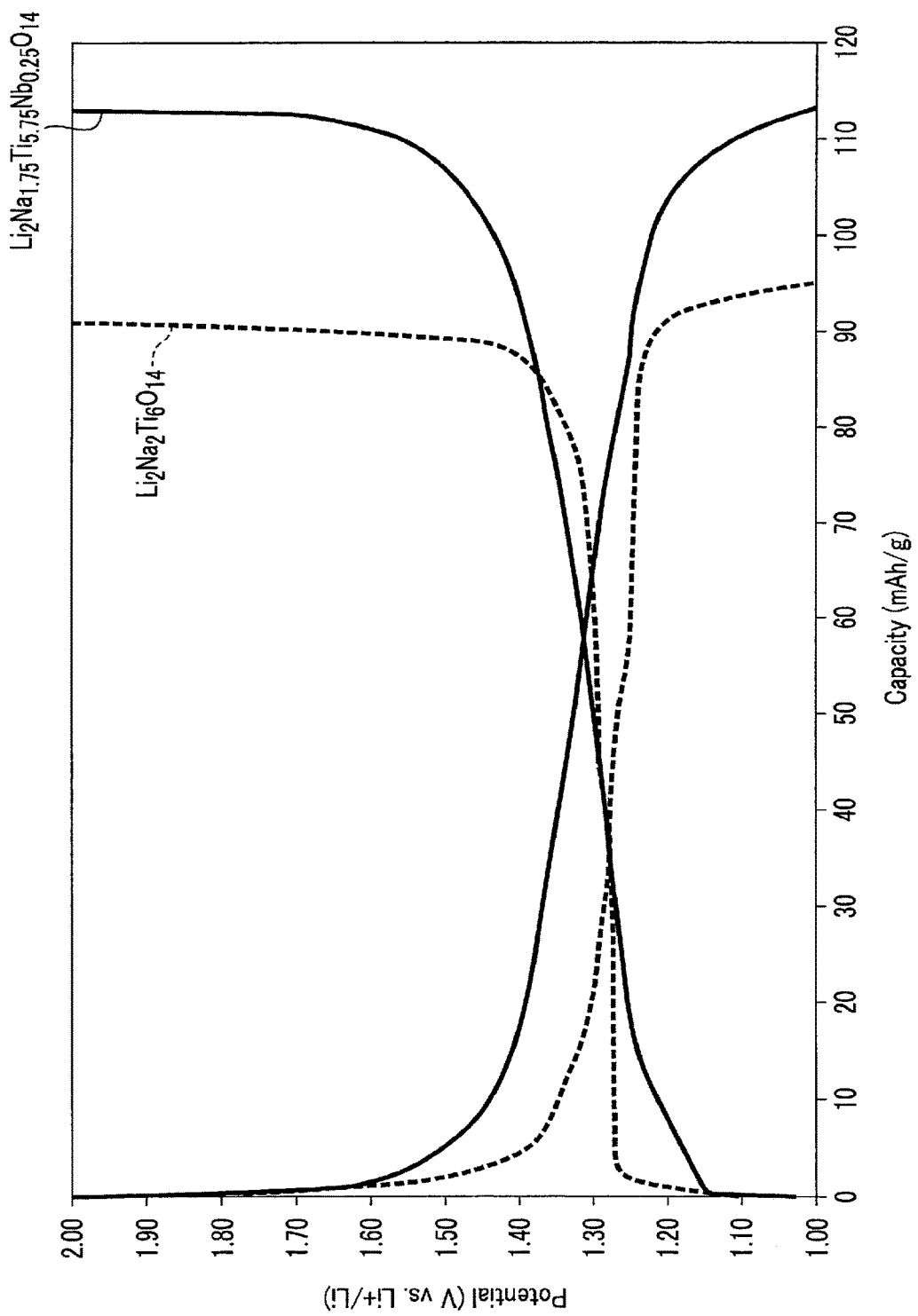
F I G. 1

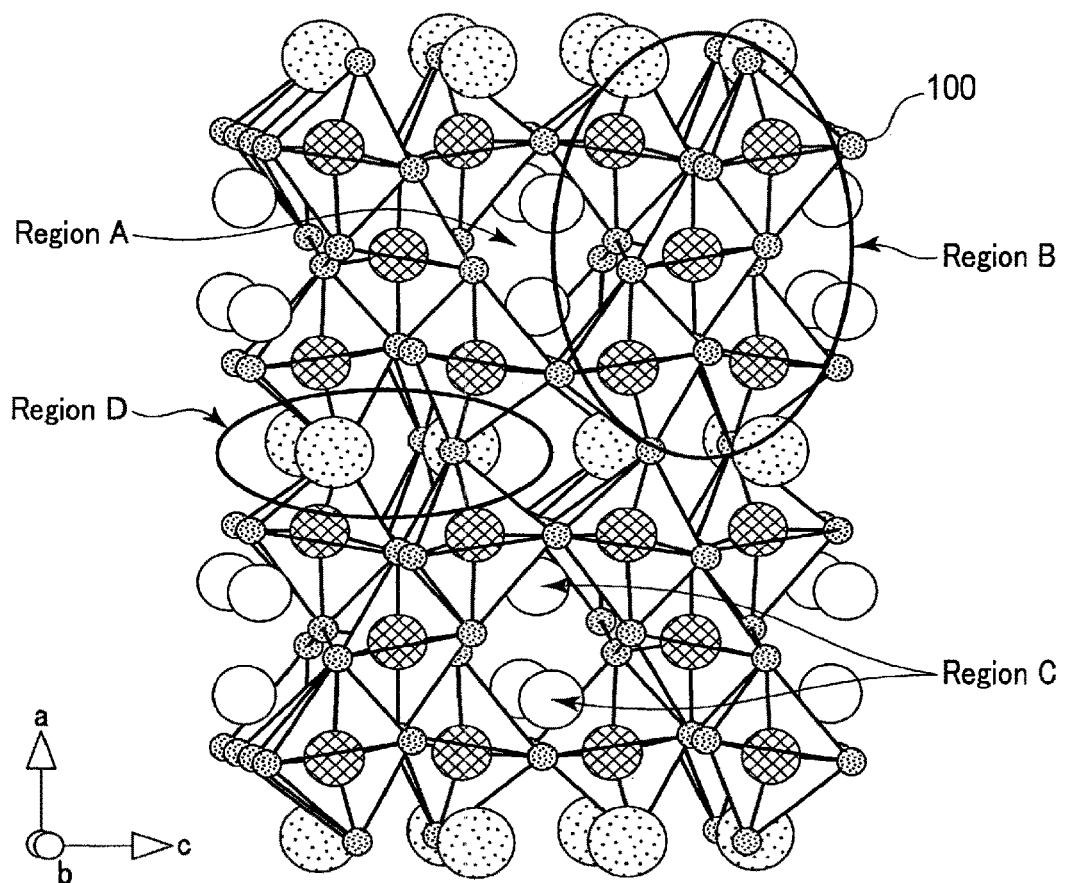
F I G. 2

ACTIVE MATERIAL, NONAQUEOUS ELECTROLYTE BATTERY, BATTERY PACK AND BATTERY MODULE

CROSS-REFERENCE TO RELATED APPLICATIONS

This application is based upon and claims the benefit of priority from the Japanese Patent Application No. 2015-050791, filed Mar. 13, 2015, and PCT Application No. PCT/JP2016/052708, filed Jan. 29, 2016, the entire contents of all of which are incorporated herein by reference.

FIELD

Embodiments described herein relate generally to an active material for a battery, a nonaqueous electrolyte battery, a battery pack and a battery module.

BACKGROUND

Recently, a nonaqueous electrolyte battery such as a lithium ion secondary battery has been actively researched and developed as a high energy-density battery. The nonaqueous electrolyte battery is expected to be used as a power source for hybrid vehicles, electric cars, an uninterruptible power supply for base stations for portable telephone, or the like. For this, the nonaqueous electrolyte battery is desired to have a high energy density as well as to be excellent in other performances such as rapid charge-and-discharge performances and long-term reliability. For example, a nonaqueous electrolyte battery enabling rapid charge-and-discharge not only remarkably shortens a charging time but also makes it possible to improve performances related to motivity and to efficiently recover regenerative energy from motivity, in a hybrid vehicle or the like.

In order to enable rapid charge-and-discharge, electrons and lithium ions must be able to migrate rapidly between the positive electrode and the negative electrode. However, when a battery using a carbon-based negative electrode is repeatedly subjected to rapid charge-and-discharge, dendrite precipitation of metal lithium occurs on the electrode, raising the fear as to heat generation and fires caused by internal short circuits.

In light of this, a battery using a metal composite oxide in place of a carbonaceous material in the negative electrode has been developed. Particularly, in a battery using titanium oxide as the negative electrode active material, rapid charge-and-discharge can be stably performed. Such a battery also has a longer life than those using a carbonaceous material.

However, titanium oxide has a higher potential based on metal lithium than the carbonaceous material. That is, titanium oxide is nobler. Furthermore, titanium oxide has a lower capacity per weight. Therefore, a battery using titanium oxide as the negative electrode active material has a problem that the energy density is lower. Particularly, when a material having a high potential based on metal lithium is used as a negative electrode material, a battery using the material has a lower voltage than that of a conventional battery using a carbonaceous material. Therefore, when the battery is used for systems requiring a high voltage such as an electric vehicle and a large-scale electric power storage system, the battery has a problem that the battery series number is increased.

The potential of the electrode using titanium oxide is about 1.5 V based on metal lithium and is higher (nobler) than that of the negative electrode using carbonaceous material. The potential of titanium oxide is due to the oxidation-reduction reaction between $Ti^{3+}$ and $Ti^{4+}$ when lithium is electrochemically inserted and extracted, and is therefore limited electrochemically. It is therefore conventionally difficult to drop the potential of the electrode to improve the energy density.

BRIEF DESCRIPTION OF THE DRAWINGS

FIG. 1 shows a charge-and-discharge curve of a composite oxide $Li_2Na_2Ti_6O_{14}$, and a charge-and-discharge curve of a composite oxide $Li_2Na_{1.75}Ti_{5.75}Nb_{0.25}O_{14}$;

FIG. 2 is a crystal structure view of $Li_2Na_{1.5}Ti_{5.5}Nb_{0.5}O_{14}$, which is one example of a composite oxide having symmetry of a space group Fmmm;

DETAILED DESCRIPTION

Figure 3:
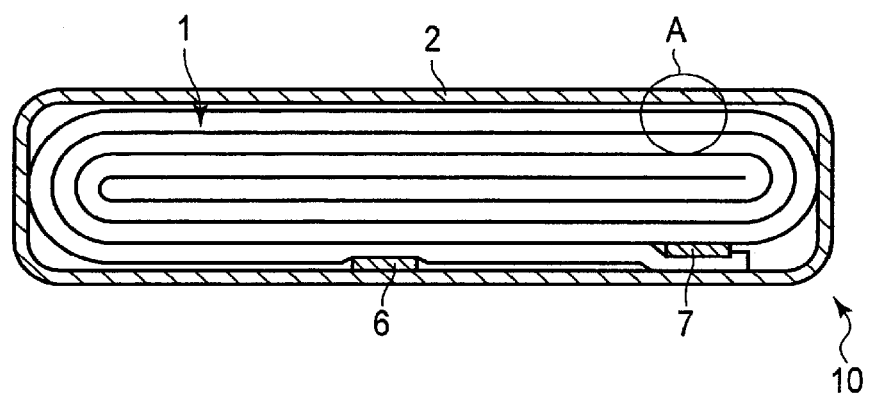
FIG. 3 is a cross-sectional view of a nonaqueous electrolyte battery as an example according to a second embodiment.

In general, according to one embodiment, there is provided an active material. The active material contains a composite oxide having an orthorhombic crystal structure. The composite oxide is represented by a general formula of $Li_{2+w}Na_{2-x}M1_yTi_{6-z}M2_zO_{14+\delta}$. In the general formula, the M1 is at least one selected from the group consisting of Cs and K; the M2 is at least one selected from the group consisting of Zr, Sn, V, Nb, Ta, Mo, W, Fe, Co, Mn, and Al; and w is within a range of $0 \le w \le 4$, x is within a range of $0 < x < 2$, y is within a range of $0 \le y < 2$, z is within a range of $0 < z \le 6$, and $\delta$ is within a range of $-0.5 \le \delta \le 0.5$.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be prop-

First Embodiment

According to a first embodiment, an active material for a battery containing a composite oxide having an orthorhombic crystal structure is provided. The composite oxide is represented by a general formula of $Li_{2+w}Na_{2-x}M1_yTi_{6-z}M2_zO_{14+\delta}$. In the general formula, the M1 is at least one selected from the group consisting of Cs and K; the M2 is at least one selected from the group consisting of Zr, Sn, V, Nb, Ta, Mo, W, Fe, Co, Mn, and Al; and w is within a range of $0 \leq w \leq 4$, x is within a range of $0 < x < 2$, y is within a range of $0 \leq y < 2$, z is within a range of $0 < z \leq 6$, and $\delta$ is within a range of $-0.5 \leq \delta \leq 0.5$.

The composite oxide contained in the active material for a battery according to the first embodiment is a substituted composite oxide in which, in an orthorhombic crystal structure of a composite oxide represented by the general formula of $Li_{2+w}Na_2Ti_6O_{14+\delta}$, a part of Na sites is substituted by a cation M1 and/or Na is removed from a part of the Na sites to form a vacancy, and at least a part of Ti sites is substituted by a cation M2.

When an Na amount in the crystal structure of the composite oxide is changed, an electrode potential behavior of the composite oxide based on the oxidation-reduction potential of metal lithium is changed. The active material for a battery according to the first embodiment containing the composite oxide, which is represented by the general formula $Li_{2+w}Na_{2-x}M1_yTi_{6-z}M2_zO_{14+\delta}$ wherein $0 < x < 2$, can have an average potential of lithium insertion of a range of 1.2 V (vs. Li/Li$^+$) to 1.45 V (vs. Li/Li$^+$) when an operating potential is within a range of 0.5 V to 3.0 V relative to the oxidation-reduction potential of the metal lithium. Thus, a nonaqueous electrolyte battery, using the active material for a battery according to the first embodiment as a negative electrode active material can show a battery voltage higher than that of, for example, a nonaqueous electrolyte battery using a titanium composite oxide which has an average potential of lithium insertion of 1.55 V (vs. Li/Li$^+$) in a range of the same operating potential, as the negative electrode.

In a composite oxide which has a vacancy at a portion corresponding to a part of the Na sites of the composite oxide represented by the general formula of $Li_{2+w}Na_2Ti_6O_{14+\delta}$, among the composite oxides represented by the general formula $Li_{2+w}Na_{2-x}M1_yTi_{6-z}M2_zO_{14+\delta}$, this vacancy can serve as a further site of insertion and extraction of Li ion. For this reason, in the composite oxide containing such a vacancy, Li ions can be more easily inserted and extracted than in the composite oxide represented by the general formula of $Li_{2+w}Na_2Ti_6O_{14+\delta}$; as a result, a higher charge-and-discharge capacity can be realized.

In the active material according to the first embodiment, a correlation between a charging capacity and a battery voltage can be more easily comprehended than in the composite oxide represented by the general formula of $Li_{2+w}Na_2Ti_6O_{14+\delta}$, in a potential range of 1.0 V (vs. Li/Li$^+$) to 1.45 V (vs. Li/Li$^+$). Referring FIG. 1, the reason why the correlation between the charging capacity and the battery voltage can be more easily comprehended in the active material for a battery according to the first embodiment is explained below.

FIG. 1 shows a charge-and-discharge curve (a broken line) of a composite oxide $Li_2Na_2Ti_6O_{14}$, and a charge-and-discharge curve (a solid line) of a composite oxide $Li_2Na_{1.75}Ti_{5.75}Nb_{0.25}O_{14}$. The composite oxide $Li_2Na_{1.75}Ti_{5.75}Nb_{0.25}O_{14}$, whose potential change is shown by the solid line, has an orthorhombic crystal structure, and is a composite oxide which can be contained in the active material for a battery according to the first embodiment. On the other hand, the composite oxide $Li_2Na_2Ti_6O_{14}$, whose potential change is shown by the broken line, is a composite oxide represented by the general formula of $Li_{2+w}Na_2Ti_6O_{14+\delta}$, and having an orthorhombic crystal structure. It can also be said that the composite oxide $Li_2Na_{1.75}Ti_{5.75}Nb_{0.25}O_{14}$ is a substituted oxide in which Na is removed from a part of the Na sites of the crystal structure of the composite oxide $Li_2Na_2Ti_6O_{14}$ to form a vacancy, and a part of the Ti sites thereof is substituted by Nb.

As shown by the a broken line in FIG. 1, each of the charge curve and the discharge curve of the composite oxide $Li_2Na_2Ti_6O_{14}$ contains a flat portion, in which a variation in the potential accompanied with a change in the capacity is small, as majority excluding an initial stage and a last stage of each of the charge and discharge. For example, it is found, from a charge curve in an Li insertion direction, when the composite oxide $Li_2Na_2Ti_6O_{14}$ is subjected to charge from a potential of 1.35 V (vs. Li/Li$^+$) to a potential of 1.20 V (vs. Li/Li$^+$), about 80 mAh/g is charged in this small difference in potential of 0.15 V. This charge capacity corresponds to about 90% of the total charge capacity of the composite oxide $Li_2Na_2Ti_6O_{14}$. Similarly, it is found, from a discharge curve in an Li extraction direction, when the composite oxide $Li_2Na_2Ti_6O_{14}$ is subjected to discharge from a potential of 1.20 V (vs. Li/Li$^+$) to a potential of 1.35 V (vs. Li/Li$^+$), about 90% of the total discharge capacity is discharged in this small difference in potential of 0.15 V. Thus, the charge curve and the discharge curve of the composite oxide $Li_2Na_2Ti_6O_{14}$ hardly show change in the potential accompanied with the changes of the charged capacity and the discharged capacity. That is, each of the charge and discharge curves of the composite oxide $Li_2Na_2Ti_6O_{14}$ contains the region in which the potential gradient is small as majority. In a nonaqueous electrolyte battery produced using the composite oxide having such a potential change in a negative electrode, it is difficult to comprehend the correlation between the charging capacity and the battery voltage, and to control SOC during the charge and discharge.

On the other hand, as shown by a solid line in FIG. 1, it is found that each of a charge curve and a discharge curve of the composite oxide $Li_2Na_{1.75}Ti_{5.75}Nb_{0.25}O_{14}$ has, as majority excluding the initial stage and the last stage of the charge and the discharge, a portion in which a variation in the potential accompanied with a change in the capacity is large. Specifically, it is found from the charge curve in the Li insertion direction that when the charge is started from a potential of 1.50 V (vs. Li/Li$^+$) and reaches 90% of the total capacity, the potential of the composite oxide $Li_2Na_{1.75}Ti_{5.75}Nb_{0.25}O_{14}$ becomes about 1.15 V (vs. Li/Li$^+$); in other words, the composite oxide $Li_2Na_{1.75}Ti_{5.75}Nb_{0.25}O_{14}$ exhibits a variation in the potential of about 0.35 V during the charge. Similarly, it is found from the discharge curve in the Li extraction direction that when the discharge is started from a potential of 1.15 V (vs. Li/Li$^+$) and reaches 90% of the total capacity, the capacity of the composite oxide $Li_2Na_{1.75}Ti_{5.75}Nb_{0.25}O_{14}$ becomes about 1.50 V (vs. Li/Li$^+$), and there is a variation in the potential of about 0.35 V during the discharge. Thus, each of the charge and discharge curves of the composite oxide $Li_2Na_{1.75}Ti_{5.75}Nb_{0.25}O_{14}$ contains, as majority, a portion in which a variation in the potential accompanied with a change in the capacity which is larger than that in the potential flat portion contained in the charge-and-discharge curve of the composite oxide $Li_2Na_2Ti_6O_{14}$, i.e., a portion having a larger gradient than the potential flat portion.

In addition, as shown by the solid line in FIG. 1, the charge-and-discharge curve of the composite oxide $Li_2Na_{1.75}Ti_{5.75}Nb_{0.25}O_{14}$ exhibits, excluding the initial stage and the last stage thereof, a continuous potential change which does not contain a potential step in which the potential steeply changes during the charge-and-discharge.

It is easy to comprehend the correlation between the charged-and-discharged capacity and the battery voltage for the nonaqueous electrolyte battery produced using the composite oxide exhibiting the potential change described above in the negative electrode, and thus the SOC of the battery can be easily managed.

As apparent from the charge-and-discharge curve shown in FIG. 1, the composite oxide $Li_2Na_2Ti_6O_{14}$ exhibits a charge-and-discharge capacity of about 90 mAh/g. On the other hand, the composite oxide $Li_2Na_{1.75}Ti_{5.75}Nb_{0.25}O_{14}$ exhibits a charge-and-discharge capacity of 115.9 mAh/g, and can exhibit a charge-and-discharge capacity which is higher than that of the composite oxide $Li_2Na_2Ti_6O_{14}$.

The composite oxide contained in the active material for a battery according to the first embodiment can exhibit a continuous potential change which does not contain a potential steps within the potential range of 1.0 V to 1.45 V (vs. Li/Li$^+$) because it can have uniform insertion sites of lithium. The reason for this will be described below.

The composite oxide, which can be contained in the active material for a battery according to the first embodiment, is represented by the general formula of $Li_{2+w}Na_{2-x}M1_yTi_{6-z}M2_zO_{14+\delta}$. In this composite oxide, Li exists as a monovalent cation. M1 is at least one monovalent cation selected from the group consisting of Cs and K. M1 may be one of Cs and K, or both of Cs and K. M2 is at least one selected from the group consisting of Zr, Sn, V, Nb, Ta, Mo, W, Fe, Co, Mn and Al. M2 may be one selected from the group consisting of Zr, Sn, V, Nb, Ta, Mo, W, Fe, Co, Mn and Al, or be two or more selected from the group consisting of Zr, Sn, V, Nb, Ta, Mo, W, Fe, Co, Mn and Al. Here, each of Fe, Co, Mn and Al is a trivalent cation. Each of Zr and Sn is a tetravalent cation. Each of V, Nb and Ta is a pentavalent cation. Each of Mo and W is a hexavalent cation. Here, the valence of each cation described above are a valence of each cation when w is 0 in the above general formula, i.e., in a discharge state.

In this composite oxide, the total valence of the cations coincides with the total valence of oxide ions which are anions, and thus the charge neutrality can be maintained. Specifically, in this composite oxide, the total valence of the lithium ions is 2+w. The total valence of the sodium ions is 2−x. The total valence of the M1 is y. The total valence of Ti is 4×(6−z). The total valence of the M2 is, if one mole of the composite oxide contains $z_3$ mole of the trivalent cation $M2_3$, $z_4$ mole of the tetravalent cation $M2_4$, $z_5$ mole of the pentavalent cation $M2_5$, and $z_6$ mole of the hexavalent cation $M2_6$, $(z_3×3)+(z_4×4)+(z_5×5)+(z_6×6)$, wherein $z_3+z_4+z_5+z_6=z$. The total valence of these cations coincides with the total valence of oxide ions which are anions: $(-2)×(14+\delta)$. Here, the subscript of the oxide ion δ can have a value within a range of −0.5 to 0.5, and thus the same effects can be obtained even if the total valence of the cations described above varies within a range of ±1 to −28 valences, which is the total valence of the oxide ions. If the δ is beyond the range of −0.5≤δ≤0.5, there is a possibility of the oxidation-reduction state of the cations deviating from a stable state, or a lattice defects such as an oxygen deficiency occurring, thus undesirably resulting in reduced battery performance.

Here, assuming that the cations forming the composite oxide are in a stable oxidation state, and oxide ions exist in a proper quantity, δ=0, and thus the total valence of the oxide ions is −2×14=−28. In this case, the state in which the total valence of the cations coincides with the total valence of the oxide ions is represented by the following formula (1):

$$(2+w)+(2-x)+y+\{4\times(6-z)\}+\{(z_3\times3)+(z_4\times4)+(z_5\times5)+(z_6\times6)\}-28=0 \quad (1)$$

The formula (1) can be organized into the following formula (2):

$$w-x+y-4z+(3z_3+4z_4+5z_5+6z_6)=0 \quad (2)$$

The charge neutrality in the crystal structure of the composite oxide can be maintained by satisfying the conditions of the formula (2). The composite oxide $Li_{2+w}Na_{2-x}M1_yTi_{6-z}M2_zO_{14+\delta}$ whose charge neutrality is maintained is a substituted oxide in which a part of the Ti sites is properly substituted by the cation M2 in the crystal structure of the composite oxide represented by the general formula of $Li_{2+w}Na_2Ti_6O_{14+\delta}$. In addition, the composite oxide $Li_{2+w}Na_{2-x}M1_yTi_{6-z}M2_zO_{14+\delta}$ in which charge neutrality is maintained and y is greater than 0 is a substituted oxide in which a part of the Na sites is properly substituted by the cation M1 in the crystal structure of the composite oxide represented by the general formula of $Li_{2+w}Na_2Ti_6O_{14+\delta}$. In addition, in the composite oxide $Li_{2+w}Na_{2-x}M1_yTi_{6-z}M2_zO_{14+\delta}$ whose charge neutrality is maintained, a part corresponding to a part of the Na sites in the crystal structure of the composite oxide represented by the general formula of $Li_{2+w}Na_2Ti_6O_{14+\delta}$ can stably exist as a vacancy in the crystal structure. By containing the substituted oxide in which the cation M2 is properly substituted in the crystal structure of the composite oxide represented by the general formula of $Li_{2+w}Na_2Ti_6O_{14+\delta}$ and which contains the properly substituted cation M1 and/or the vacancy which can stably exist in the crystal structure of the composite oxide represented by the general formula of $Li_{2+w}Na_2Ti_6O_{14+\delta}$, as described above, the active material for a battery according to the first embodiment can make a coordination environment of the oxide ions to void sites where the lithium ions are inserted uniform. This is a reason why the composite oxide, which can be contained in the active material for a battery according to the first embodiment, can show a continuous potential change within a potential range of 1.0 V to 1.45 V (vs. Li/Li$^+$). On the other hand, a composite oxide in which the uniformity of the coordination environment of the oxide ions to the void sites is low exhibits a potential step in the charge-and-discharge curve, i.e., a steep change in the potential.

In addition, by containing the substituted oxide in which the cation M2 is properly substituted in the crystal structure of the composite oxide represented by the general formula of $Li_{2+w}Na_2Ti_6O_{14+\delta}$ and which contains the properly substituted cation M1 and/or the vacancy which can stably exist in the crystal structure of the composite oxide represented by the general formula of $Li_{2+w}Na_2Ti_6O_{14+\delta}$, the active material for a battery according to the first embodiment can provide a nonaqueous electrolyte battery capable of exhibiting the high reversible capacity in the charge and discharge and the excellent life performance. In particular, the substituted oxide in which a part of the Na sites in the composite oxide $Li_{2+w}Na_2Ti_6O_{14+\delta}$ are substituted by the vacancy which can stably exist can realize the higher reversible capacity, because electrical charge repulsion of sites, which can serve as host for Li ions, is reduced.

Consequently, the active material for a battery according to the first embodiment can realize a nonaqueous electrolyte battery which can exhibit high energy density and high battery voltage, can exhibit an excellent life performance, and can provide easy voltage management.

The subscript w in the general formula of $Li_{2+w}Na_{2-x}M1_yTi_{6-z}M2_zO_{14+\delta}$ for the composite oxide can vary within a range of $0 \leq w \leq 4$ depending on the state-of-charge of the composite oxide. For example, according to a production method described below, a composite oxide in which the subscript w is 0 in the general formula described above can be manufactured. When the composite oxide in which the subscript w is 0 is incorporated in a nonaqueous electrolyte battery as the negative electrode active material, and the resulting nonaqueous electrolyte battery is charged, the value of w+2 is elevated to a value within a range of more than 2 and 6 or less. Alternatively, a composite oxide can also be synthesized in a raw material composition ratio set so that an Li amount in the formula, w+2, is within a range of more than 2 and 6 or less before the initial charge, for example, by the process described below. The active material for a battery containing the composite oxide having an Li amount, w+2, within a range of more than 2 and 6 or less before the initial charge can suppress the trapping of lithium ions in its structure during the initial charge-and-discharge, and as a result, the initial charge-and-discharge efficiency can be improved.

The subscript x in the general formula of $Li_{2+w}Na_{2-x}M1_yTi_{6-z}M2_zO_{14+\delta}$ for the composite oxide indicates an Na amount in the crystal structure in this composite oxide. The active material for a battery according to the first embodiment can control an average operating potential of an electrode containing the active material for a battery within a range of 1.2 V (vs. Li/Li$^+$) to 1.5 V (vs. Li/Li$^+$) to the oxidation-reduction potential of the metal lithium by changing the Na amount in the crystal structure, i.e., the value of the subscript x, whereby the operating potential of the battery can be easily designed. From a different aspect, the subscript x is an index showing a ratio of a part which is substituted by the cation M1 or the vacancy in the substituted composite oxide, among the sites corresponding to the Na sites in the composite oxide $Li_{2+w}Na_2Ti_6O_{14+\delta}$. The subscript x is within a range of $0 < x < 2$, preferably $0.1 \leq x \leq 0.9$, more preferably $0.25 \leq x \leq 0.75$.

The subscript y in the general formula of $Li_{2+w}Na_{2-x}M1_yTi_{6-z}M2_zO_{14+\delta}$ indicates an amount of cation M1 contained in the crystal structure of the composite oxide represented by this general formula. In addition, the cation M1 is one with which a part of the Na sites in the composite oxide $Li_{2+w}Na_2Ti_6O_{14+\delta}$ is substituted. Accordingly, the combination of the subscript x and the subscript y is an index showing a ratio of a part which is substituted by the cation M1 in the substituted composite oxide, among the sites corresponding to the Na sites in the composite oxide $Li_{2+w}Na_2Ti_6O_{14+\delta}$. The value of the subscript y is, accordingly, a value equal to or less than the value of the subscript x.

The subscript y is within a range of $0 \leq y < 2$. Therefore, the value of the subscript y may be 0. That is, the composite oxide, represented by the general formula of $Li_{2+w}Na_{2-x}M1_yTi_{6-z}M2_zO_{14+\delta}$, may contain no cation M1. When the value of the subscript y is 0, the composite oxide, contained in the active material for a battery according to the first embodiment, is represented by the general formula of $Li_{2+w}Na_{2-x}Ti_{6-z}M2_zO_{14+\delta}$. In this composite oxide, a part corresponding to a part of the Na sites in the composite oxide $Li_{2+w}Na_2Ti_6O_{14+\delta}$, i.e., a part indicated by the subscript x is vacancy.

When Na ion are removed from a part of the Na sites in the composite oxide $Li_{2+w}Na_2Ti_6O_{14+\delta}$ to form vacancy, the total valence of the cations in the composite oxide is reduced. Specifically, when x moles of Na ions are removed from one mole of the composite oxide $Li_{2+w}Na_2Ti_6O_{14+\delta}$ to form x moles of vacancies, the total valence of the cations in this composite oxide is reduced by x. In such a case, the charge neutrality can be maintained, for example, by inserting Li ions into the formed vacancies or by substituting a part of Ti sites in the composite oxide $Li_{2+w}Na_2Ti_6O_{14+\delta}$ by the pentavalent M2$_5$ or the hexavalent M2$_6$ as the cation M2, so as to compensate the reduced valences x. Such a substitution can reduce Na ions, which impedes lithium ion conduction, and vacancies, which are host sites of Li ions, can be increased, while the crystal structure of the composite oxide $Li_{2+w}Na_2Ti_6O_{14+\delta}$ is maintained. Thus, the substituted composite oxide capable of realizing the improved charge-and-discharge capacity can be obtained.

The subscript y is preferably within a range of $0 \leq y \leq 1$, more preferably 0.

The subscript z in the general formula of $Li_{2+w}Na_{2-x}M1_yTi_{6-z}M2_zO_{14+\delta}$ for the composite oxide indicates an amount of the cation M2 contained in the crystal structure of the composite oxide represented by this general formula. In addition, the cation M2 is one with which a part of the Ti sites in the composite oxide $Li_{2+w}Na_2Ti_6O_{14+\delta}$ is substituted. Therefore, the subscript z is an index showing a ratio of a part which is substituted by the cation M2 in the substituted composite oxide, among the sites corresponding to the Ti sites in the composite oxide $Li_{2+w}Na_2Ti_6O_{14+\delta}$. The subscript z is within a range of $0 < z \leq 6$, preferably $0.1 \leq z \leq 0.9$, more preferably $0.25 \leq z \leq 0.75$.

The subscript $\delta$ in the general formula of $Li_{2+w}Na_{2-x}M1_yTi_{6-z}M2_zO_{14+\delta}$ for the composite oxide may vary within a range of $-0.5 \leq \delta \leq 0.5$ depending on the oxygen deficiency of the composite oxide represented by this general formula or the amount of oxygen inevitably incorporated during the production process of the active material for a battery.

Although each of the subscripts w, x, y, z and $\delta$ can be a value within the specific range as described above, in the composite oxide represented by the general formula of $Li_{2+w}Na_{2-x}M1_yTi_{6-z}M2_zO_{14+\delta}$, the total valence of the cations is equal to the total valence of the anions, as described above.

In an X-ray diffraction diagram for the composite oxide represented by the general formula of $Li_{2+w}Na_{2-x}M1_yTi_{6-z}M2_zO_{14+\delta}$, obtained by a powder X-ray diffraction using Cu—K$\alpha$ rays, it is preferable that an intensity ratio $I_L/I_H$ is within a range of $2.25 \leq I_L/I_H \leq 3.50$, wherein $I_L$ is an intensity of a strongest diffraction peak appearing in a range of $17° \leq 2\theta \leq 18.5°$, and $I_H$ is an intensity of a strongest diffraction peak appearing in a range of $18.5° < 2\theta \leq 19.5°$.

A composite oxide according to another example of the preferable aspects in which the intensity ratio $I_L/I_H$ is within a range of $2.25 \leq I_L/I_H \leq 3.5$ in an X-ray diffraction diagram of a composite oxide, obtained according to a powder X-ray diffraction, is a composite oxide having an orthorhombic crystal structure belonging to a space group Fmmm. In such a composite oxide, in the X-ray diffraction diagram of the composite oxide obtained by the powder X-ray diffraction using Cu—K$\alpha$ rays, an intensity ratio is within a range of $2.25 \leq I_{L1}/I_{H1} \leq 3.5$, wherein $I_{L1}$ is an intensity of a diffraction peak corresponding to a (111) plane, and $I_{H1}$ is an intensity of a diffraction peak corresponding to a (202) plane.

FIG. 2 is a crystal structure view of $Li_2Na_{1.5}Ti_{5.5}Nb_{0.5}O_{14}$ which is one example of the composite oxide having the symmetry of the space group Fmmm.

In the crystal structure shown in FIG. 2, the smallest spheres 100 indicate positions of oxide ions.

In the crystal structure shown in FIG. 2, a region A shows a void site containing a channel in which the lithium ion can three-dimensionally move in the crystal structure, and the region A can insert and extract the lithium ions. A region B has a polyhedral structure of oxide having a center of Ti or Nb, serving as the backbone of the crystal structure. On the other hand, a region C is a site in which lithium ions which can be inserted and extracted exist. A region D is a site in which Na and Li, which functions as a backbone for stabilizing the crystal structure, or in which a vacancy exist.

In the X-ray diffraction diagram of the composite oxide of this example measured according to the powder X-ray diffraction using Cu—Kα rays, an intensity ratio $I_{L1}/I_{H1}$ is within a range of $2.25 \leq I_{L1}/I_{H1} \leq 3.5$. Here, $I_{L1}$ is an intensity of a diffraction peak corresponding to a (111) plane, appearing in a range of $17.8° \leq 2\theta \leq 18.5°$, and $I_{H1}$ is an intensity of a diffraction peak corresponding to a (202) plane, appearing in a range of $18.5° \leq 2\theta \leq 19.5°$.

The composite oxide of this example can have crystallites grown in a desired direction for insertion and extraction of lithium ions. Furthermore, the composite oxide of this example can suppress the insertion of lithium ions into void sites the oxide-ions coordination environments of which are different to each other. Such an insertion of lithium ions is a cause for creating a potential step in the charge-and-discharge curve. In the active material containing the composite oxide of this example, accordingly, the appearance of the potential step can be suppressed on the charge-and-discharge curve, and the reversibility of the lithium ions is improved during the charge-and-discharge. Therefore, the effective capacity can be increased, and the life performance of the nonaqueous electrolyte battery can be improved, which is preferable.

Even if the active material for a battery according to the first embodiment contains a composite oxide having a crystal structure in which a crystal phase having a symmetry other than the Fmmm symmetry is mixed, or a composite oxide having a crystal structure similar to the Fmmm symmetry, the same effects as those obtained in the active material for a battery containing the composite oxide having the symmetry of the space group Fmmm can be obtained. Examples of the symmetry similar to the Fmmm symmetry may include, specifically, Cmca, F222, Pmcm, Pmma, Cmma, and the like. The type of symmetry of a space group may be one or more than one. In the composite oxide having the crystal structure having each of the symmetries described above, regardless of the crystal plane indices, an intensity ratio $I_L/I_H$ is preferably within a range of $2.25 \leq I_L/I_H \leq 3.5$, wherein $I_L$ is an intensity of a strongest diffraction peak appearing in a range of $17° \leq 2\theta \leq 18.5°$, and $I_H$ is an intensity of a strongest diffraction peak appearing in a range of $18.5° < 2\theta \leq 19.5°$. In such a case, not only is the charge-and-discharge curve smooth but also the reversibility of the lithium ion is improved in the charge-and-discharge, whereby the effective capacity is increased, and the life performance of the nonaqueous electrolyte battery can be improved.

In one preferable aspect, the active material for a battery according to the first embodiment contains the composite oxide represented by the general formula of $Li_{2+w}Na_{2-x}Ti_{6-z}M2_zO_{14+\delta}$. In the formula, M2 is at least one selected from the group consisting of Zr, Sn, V, Nb, Ta, Mo, W, Fe, Co, Mn, and Al; w is within a range of $0 \leq w \leq 4$; x is within a range of $0 < x < 2$; z is within a range of $0 < z \leq 6$; and δ is within a range of $-0.5 \leq \delta \leq 0.5$.

In the orthorhombic crystal structure of the composite oxide represented by the general formula of $Li_{2+w}Na_2Ti_6O_{14}$, a part of the Na sites is reduced and vacancy sites, which serve as hosts for the Li ions, can be formed, whereby the energy density per unit weight or unit volume can be increased while a lattice volume capable of easily inserting and extracting the lithium ions is maintained. In addition, when the Na amount is changed, the average operating potential of the electrode can be changed, whereby it is easy to design the voltage of the battery.

Furthermore, a more preferable aspect among these aspects is a composite oxide in which the cation M2 is Nb. In the more preferable aspect, accordingly, the composite oxide contained in the active material for a battery according to the first embodiment is represented by the general formula of $Li_{2+w}Na_{2-x}Ti_{6-z}Nb_zO_{14+\delta}$. Nb can be subjected to a divalent reduction from the pentavalent Nb to the trivalent Nb, and thus at least a part of the Ti ions, which can be subjected to a monovalent reduction from the tetravalent Ti to the trivalent Ti, are substituted by Nb, and, on the other hand, vacancy sites are formed on the Na sites, whereby the lithium insertion amount of the composite oxide can be increased. When Nb is contained in the crystal structure, a potential based on the oxidation-reduction potential of the metal lithium during the insertion of Li is continuously changed in a wide range of 1.5 V to 1.0 V. When at least a part of the Ti ions is substituted by Nb, therefore, not only is the charge-and-discharge capacity increased but also a part where the variation in the potential accompanied with a change in the capacity is larger can be contained in the charge-and-discharge curve. The composite oxide, which can exhibit such a charge-and-discharge curve, can easily correlate the charge and discharge potential with the state-of-charge (SOC), and the state-of-charge of the battery can be easily managed.

In another preferable aspect, a composite oxide contained in the active material for a battery according to the first embodiment contains two or more elements which have different valences from each other at sites corresponding to the Ti sites in the composite oxide $Li_{2+w}Na_2Ti_6O_{14+\delta}$. Such a composite oxide has a larger potential gradient during the charge-and-discharge, and therefore is preferable. The reason why the potential gradient is larger is, for example, that there are two or more elements having electrical correlations with the oxide ion different from each other at sites corresponding to titanium sites in the crystal structure of the composite oxide $Li_{2+w}Na_2Ti_6O_{14+\delta}$, and thus multiple sites, which have a difference from each other in electrical correlation with the Li ion and with the oxide ion respectively, are generated at these sites. More specifically, an element having a higher valence contained in these sites has a tendency to take more of an electron cloud of the oxide ion and, on the other hand, an element having a lower valence has a tendency in which the correlation between the oxide ion and the electron cloud is weak. Therefore, a difference occurs in an electrical state of the oxide ion near to the lithium host site, and as a result, the electrical correlation which is provided to the lithium ion from the lithium host site becomes different. Consequently, the variation in the potential due to the insertion and extraction of the lithium ion increases.

The composite oxide contained in the active material for a battery according to the first embodiment may be in the state of, for example, a particle. An average particle size of the composite oxide contained in the active material for a battery according to the first embodiment is not particularly limited, and may be varied depending on the desired battery characteristic.

It is preferable that the active material for a battery according to the first embodiment contains the composite oxide particles described above, and a conductive substance such as carbon with which the surface of the particles is covered. The active material for a battery according to such a preferable aspect can exhibit an improved quick charge-and-discharge performance. In the composite oxide described above, the lithium is inserted and extracted via a homogeneous solid state reaction, and thus the composite oxide has a nature in which the higher the lithium insertion amount, the higher the electrical conductivity. In such a composite oxide, the electrical conductivity is relatively reduced in a region where the lithium insertion amount is small. When the surface of the composite oxide particle is previously coated with a conductive substance such as carbon, accordingly, the high quick-charge-and-discharge performance can be obtained regardless of the lithium insertion amount.

Alternatively, the same effects as above can be obtained by coating the surface of the composite oxide particles with lithium titanate, which expresses electrical conductivity with the lithium insertion, instead of the conductive substance such as carbon. In addition, since lithium titanate with which the surface of the composite oxide particles is covered exhibit an insulation property by the extraction of lithium when the battery is internally short-circuited, the lithium titanate can exhibit excellent safety.

<BET Specific Surface Area>

The BET specific surface area of the composite oxide contained in the active material for a battery according to the first embodiment is not particularly limited, and is preferably 5 m$^2$/g or more and less than 200 m$^2$/g. The BET specific surface area is more preferably 5 to 30 m$^2$/g.

When the BET specific surface area is 5 m$^2$/g or more, the contact area with the electrolytic solution can be secured. Thus, good discharge rate performances can be easily obtained and also, a charge time can be shortened. On the other hand, when the BET specific surface area is less than 200 m$^2$/g, reactivity with the electrolytic solution can be prevented from being too high and therefore, the life performance can be improved. When the BET specific surface area is 30 m$^2$/g or less, side reactions with the electrolytic solution can be suppressed, and thereby longer life can be further expected. And, in this case, a coatability of a slurry containing the active material for a battery in the production of an electrode, which will be described later, can be improved.

Here, as the measurement of the specific surface area, a method is used, the method including allowing molecules of which an occupied area in adsorption is known to be adsorbed onto the surface of powder particles at the temperature of liquid nitrogen and determining the specific surface area of the sample from the amount of adsorbed molecules. The most frequently used method is a BET method based on the low temperature/low humidity physical adsorption of an inert gas. This method is based on the best-known theory of the method of calculating the specific surface area in which the Langmuir theory as a monolayer adsorption theory is extended to multilayer adsorption. The specific surface area determined by the above method is referred to as "BET specific surface area".

<Production Method>

The active material for a battery according to the first embodiment can be synthesized, for example, by a solid phase reaction as described below. First, raw materials, such as oxide, compound, and a salt, are mixed in a proper stoichiometric ratio to obtain a mixture. The salts are preferably salts capable of decomposing at a comparatively low temperature to generate an oxide, such as carbonates and nitrates. Next, the obtained mixture is ground and mixed as uniformly as possible. Subsequently, the resulting mixture is calcinated. The calcination is performed at a temperature range of 600° C. to 850° C. in an air atmosphere for a total of 1 to 3 hours. Next, the firing temperature is increased and the main-sintering is performed at 900° C. to 1500° C. in the atmosphere. At that time, the lithium, which is a light element, may be vaporized by firing it at a temperature of 900° C. or higher. In such a case, a vaporized amount of lithium in the firing conditions is checked, and the vaporized amount checked up is compensated for by providing a raw material containing lithium in an excess amount to obtain a sample having a proper composition. Furthermore, it is more preferable to prevent a lattice defect due to oxygen deficiency or the like. For example, the raw material powder is subjected to pressure molding to pellets or rods before the main-sintering to decrease an area brought into contact with the air atmosphere and to increase the contact surface between particles. When a material in this state is sintering, the generation of the lattice defect can be suppressed. It is also effective to prevent the vaporization of the light elements by attaching a lid to a nagger for sintering. In a case of industrial mass production, it is preferable that when the raw material powder is sintering, the sintering is performed under a high oxygen partial pressure such as an oxygen atmosphere, or after the usual air-atmosphere sintering, a heat treatment (annealing) is performed at a temperature range of 400° C. to 1000° C. to restore the oxygen deficiency. If the generation of the lattice defect is not suppressed, the crystallinity may possibly be reduced.

When the composite oxide obtained by the synthesis above has a symmetry belonging to the space group Fmmm, the intensity ratio is within a range of $2.25 \leq I_{L1}/I_{H1} \leq 3.5$ in the X-ray diffraction diagram obtained according to the powder X-ray diffraction using Cu—Kα rays. The intensity $I_{L1}$ is an intensity of a diffraction peak corresponding to a (111) plane, appearing in a range of $17.8° \leq 2\theta \leq 18.5°$, and the intensity $I_{H1}$ is an intensity of a diffraction peak corresponding to a (202) plane, appearing in a range of $18.5° < 2\theta \leq 19.5°$.

When the synthesis is performed as described above, for example, the composite oxide represented by the above general formula wherein the subscript w is 0 can be produced, as explained above. When the composite oxide wherein the subscript w is 0 is incorporated into the nonaqueous electrolyte battery as the negative electrode active material, and the resulting nonaqueous electrolyte battery is charged, a state in which the Li amount w+2 in the formula is increased to a range of more than 2 and 6 or less is made. Alternatively, when a lithium source such as lithium carbonate is used as a raw material, and the composite oxide is synthesized in a raw material composition ratio so that the value of w is within a range of more than 0 and 4 or less, the composite oxide in a state in which the value of w+2 is within a range of more than 2 and 6 or less can also be synthesized. In addition, the composite oxide in a state in which the value of w+2 is within a range of more than 2 and 6 or less can also be obtained by, after the composite oxide is synthesized, immersing the composite oxide into the aqueous lithium hydroxide solution.

Next, a method for obtaining the X-ray diffraction diagram of the composite oxide according to the powder X-ray diffraction, and a method for confirming the composition of the composite oxide will be described.

When an active material to be measured is contained in an electrode material of a nonaqueous electrolyte battery, a pre-treatment is performed as described below.

First, a state in which lithium ions are completely removed from the crystals of the active material is made. When the active material to be measured is contained in the negative electrode, the battery is made to be in a completely discharged state. However, there are remaining lithium ions even if in the discharged state, but the existence thereof does not greatly affect the measurement results of the powder X-ray diffraction described below.

Next, the battery is disassembled in a glove box filled with argon to take out an electrode. The taken-out electrode is washed with an appropriate solvent and dried under a reduced pressure. For example, ethyl methyl carbonate may be used. After washing and drying, whether or not there are white precipitates such as a lithium salt on the surface is confirmed.

When the powder X-ray diffraction measurement is performed, the washed electrode is cut into a size having the same area as that of a holder in the powder X-ray diffraction apparatus, for used as a measurement sample.

When a composition analysis is performed, the active material is taken out from the washed electrode, and the taken-out active material is analyzed, as described later.

<Method for Obtaining X-Ray Diffraction Diagram of Composite Oxide According to Powder X-Ray Diffraction>

The powder X-ray diffraction measurement of the active material is performed as follows:

First, the target sample is ground until an average particle size reaches about 5 μm. Even if the original average particle size is less than 5 μm, it is preferable that the sample is subjected to a grinding treatment with a mortar for grinding aggregates. The average particle size can be obtained by laser diffraction. The ground sample is filled in a holder part having a depth of 0.5 mm, formed on a glass sample plate. A glass sample plate manufactured by Rigaku Corporation is used as the glass sample plate. At this time, much care is necessary to fill the holder part fully with the sample. Special care should be taken to avoid cracking and formation of voids caused by insufficient filling of the sample. Then, another glass plate is used to smooth the surface of the sample by sufficiently pressing the glass plate against the sample. In this case, much care should be taken to avoid too much or too little amount of the sample to be filled, so as to prevent any rises and dents in the basic plane of the glass holder. Then, the glass plate filled with the sample is set in a powder X-ray diffractometer. And then, a diffraction pattern [XRD (X-ray diffraction) pattern] is obtained by using Cu—Kα rays.

In the case where an orientation in which crystal planes are arranged in a specific direction according to the shapes of particles is observed from the results of the Rietveld analysis, there is the possibility of deviation of peak position and variation in an intensity ratio, depending on the way of filling the sample when the glass plate is filled with the sample. Such a sample having high orientation is measured using a capillary (cylindrical glass narrow tube). Specifically, the sample is inserted into the capillary, which is then mounted on a rotary sample table to measure while being rotated. Such a measuring method can provide the result of reducing the influence of orientation.

As an apparatus for powder X-ray diffraction measurement, SmartLab manufactured by Rigaku is used. Measurement is performed under the following condition: Cu target; 45 kV, 200 mA; soller slit: 5 degrees in both incident light and received light; step width: 0.02 deg; scan speed: 20 deg/min; semiconductor detector: D/teX Ultra 250; sample plate holder: flat glass sample plate holder (0.5 mm in thickness); measurement range: $5°≤2θ≤90°$. When another apparatus is used, measurement using a standard Si powder for powder X-ray diffraction is performed under conditions where a peak intensity and a peak top position correspond to those by obtained using the above apparatus so as to obtain measurement results equivalent to those described above.

The X-ray diffraction (XRD) pattern obtained herein must be applicable to Rietveld analysis. In order to collect the data for Rietveld analysis, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The parameters of the crystal structure (lattice constant, atomic coordinate, and crystal site occupancy ratio or the like) can be precisely analyzed by fitting all the calculated values and measurement values. Thereby, the characteristics of the crystal structure of the synthesized composite oxide can be determined. The site occupancy ratio g of constitutional elements in each of the sites can be determined. A fitting parameter S is used as the scale for estimating the degree of agreement between the measured reflection patterns and the calculated patterns in the Rietveld analysis. The S value must be less than 1.8 in the analysis. When determining the occupancies in each of the sites, the standard deviation $σ_j$ must be taken into consideration. The fitting parameter S and standard deviation $σ_j$ defined herein are estimated using the formula described in "Funmatsu X sen Kaisetsu no Jissai (Reality of Powder X-Ray Analysis", X-Ray Analysis Investigation Conversazione, The Japan Society for Analytical Chemistry, written and edited by Izumi Nakai and Fujio Izumi (Asakura Publishing Co., Ltd.).

By the above method, information about the crystal structure of the active material to be measured can be obtained. For example, when the active material according to the first embodiment is measured as described above, the active material to be measured is found to have a composite oxide having an orthorhombic structure. The symmetry of the crystal structure to be measured, such as space group Fmmm, can be examined, for example, by measuring as described above. Furthermore, the existence or non-existence of a vacancy and the amount of vacancies can be determined by more precisely refining the occupancies of constitutional elements in each of the sites. For example, to determine the existence or non-existence of a vacancy in the Na sites of a crystal represented by the general formula of $Li_{2+w}Na_{2-x}M1_yTi_{6-z}M2_zO_{14+δ}$, Rietveld analysis may be performed while changing the site occupancy ratio of Na. First, assume that the fitting parameter in Rietveld analysis performed at the occupancy ratio g of 1.0, that is, 100%, is $S_{100}$. Then, assume that the fitting parameter in Rietveld analysis performed at the occupancy ratio g of lower than 1.0, that is, lower than 100%, is $S_{vacant}$. If $S_{100}$ is greater than $S_{vacant}$ ($S_{100}>S_{vacant}$), it is possible to determine that a vacancy exists in the Na sites. Besides, the amount of vacancies (x-y) introduced in the Na sites can be estimated by further precisely refining the site occupancy ratio g. In this case, the site occupancy ratio of a light element, such as Li, also need be determined. Therefore, it is preferable that the analysis be performed by using neutron powder diffraction.

On the other hand, in order to determine the previously described intensities $I_L$ and $I_H$ ($I_{L1}$ and $I_{H1}$) of diffraction peaks for the composite oxide, the powder X-ray diffraction results measured under the above conditions without processing, i.e., raw data is used. The peak top, i.e., the maximum intensity of a strongest diffraction peak appearing within the range of $17°≤2θ≤18.5°$ is defined as $I_L$. On the other hand, the peak top; i.e., the maximum intensity of a strongest diffraction peak appearing within the range of $18.5°<2θ≤19.5°$ is defined as $I_H$. An intensity ratio $I_L/I_H$ can be calculated by dividing the intensity numerical value (counts per second: cps) of the intensity $I_L$ by the intensity numerical value (cps) of the intensity $I_H$.

When the active material to be measured is contained in the electrode material of the nonaqueous electrolyte battery, first, the electrode is taken out from the nonaqueous electrolyte battery according to the previously described procedure. The taken-out and washed electrode is cut to the size almost equal to the area of the holder of a powder X-ray diffractometer, and used as the measurement sample.

The obtained measurement sample is affixed directly to the glass holder, and measured. In this case, the position of the peak originated from the electrode substrate such as a metal foil is previously measured. The peaks of other components such as a conductive agent and a binder are also previously measured. When the peaks of the substrate and active material overlap to each other, it is desirable that the layer containing the active material (e.g., the below-described active material layer) is separated from the substrate, and subjected to measurement. This is a process for separating the overlapping peaks when the peak intensity is quantitatively measured. For example, the active material layer can be separated by irradiating the electrode substrate with an ultrasonic wave in a solvent. The active material layer is inserted into the capillary, mounted on the rotary sample table, and measured. As a result of this process, the XRD pattern of the active material can be obtained with the influence of the orientation reduced.

<Method for Confirming Composition of Composite Oxide>

The composition of the active material for a battery can be analyzed using Inductively Coupled Plasma (ICP) emission spectrography, for example. In this case, the abundance ratios of elements depend on the sensitivity of an analyzing device to be used. Therefore, when the composition of the active material for a battery as an example according to the first embodiment is analyzed, for example, using ICP emission spectrography, the numerical values may deviate due to errors of the measuring device from the previously described element ratios. However, even if the measurement results deviate as described above in the error range of the analyzing device, the active material for a battery as an example according to the first embodiment can sufficiently exhibit the previously described effects.

In order to measure the composition of the active material for a battery included in the battery according to ICP emission spectrography, the following procedure is specifically performed. First, according to the previously described procedure, an electrode containing an active material to be measured is taken out from a nonaqueous electrolyte battery, and washed. The washed electrode is put in a suitable solvent, and irradiated with an ultrasonic wave. For example, an electrode is put into ethyl methyl carbonate in a glass beaker and the glass beaker is vibrated in an ultrasonic washing machine, and thereby an electrode layer containing an electrode active material can be separated from a current collector. Next, the separated electrode layer is dried under reduced pressure. The obtained electrode layer is ground in a mortar or the like to provide a powder containing the target active material for a battery, conductive auxiliary agent, and binder or the like. By dissolving the powder in an acid, a liquid sample containing the active material for a battery can be prepared. At this time, hydrochloric acid, nitric acid, sulfuric acid, and hydrogen fluoride or the like can be used as the acid. The composition of the active material for a battery can be found by subjecting the liquid sample to ICP emission spectrochemical analysis.

According to the first embodiment, the active material for a battery containing the composite oxide having the orthorhombic crystal structure can be provided. The composite oxide is represented by the general formula of $Li_{2+w}Na_{2-x}M1_yTi_{6-z}M2_zO_{14+δ}$. The composite oxide can exhibit a large potential change with a change of capacity in a potential range of 1.0 V (vs. Li/Li$^+$) to 1.45 V (vs. Li/Li$^+$). In addition, the average operating potential of the composite oxide can be controlled by changing the Na amount. Further, the composite oxide can have a crystal structure in which lithium ions are easily inserted into and extracted from the crystal structure, and thus high reversible capacity during the charge-and-discharge and excellent life performance can be realized. As a result, the active material for a battery according to the first embodiment can realize a nonaqueous electrolyte battery which can exhibit a high energy density, a high battery voltage, and excellent life performance, and can provide a easy voltage management.

Second Embodiment

According to a second embodiment, a nonaqueous electrolyte battery is provided. The nonaqueous electrolyte battery includes a negative electrode containing the active material for a battery according to the first embodiment, a positive electrode, and a nonaqueous electrolyte.

The nonaqueous electrolyte battery according to the second embodiment can further include a separator provided between the positive electrode and the negative electrode. The positive electrode, the negative electrode, and the separator can constitute an electrode group. The nonaqueous electrolyte may be held in the electrode group.

The nonaqueous electrolyte battery according to the second embodiment can further include a container member accommodating the electrode group and the nonaqueous electrolyte.

The nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may be extended to the outside of the container member.

Hereinafter, the negative electrode, the positive electrode, the nonaqueous electrolyte, the separator, the container member, the positive electrode terminal, and the negative electrode terminal will be described in detail.

1) Negative Electrode

The negative electrode can contain a current collector, and a negative electrode layer (a negative electrode active material-containing layer). The negative electrode layer can be formed on one or both surfaces of the current collector. The negative electrode layer can contain a negative electrode active material, and optionally a conductive agent and a binder.

The active material for a battery according to the first embodiment can be contained in the negative electrode layer as a negative electrode active material. The negative electrode using the active material for a battery according to the first embodiment can exhibit a low electrode potential in which the potential is continuously changed within a potential range of 1.45 V (vs. Li/Li$^+$) to 1.0 V (vs. Li/Li$^+$). In the negative electrode using the active material for a battery according to the first embodiment, the average operating potential can be controlled, as described above. Further, the active material for a battery according to the first embodiment can exhibit a high reversible capacity during the charge-and-discharge and excellent life performance, as described above. For those reasons, the nonaqueous electrolyte battery according to the second embodiment which contains such a negative electrode can exhibit a high energy density, a high battery voltage, and excellent life performance, and can provide easy voltage management.

In the negative electrode, the active material for a battery according to the first embodiment may be singly used as the negative electrode active material, but a mixture prepared by mixing the active material for a battery according to the first embodiment with another active material may also be used. Examples of other active materials include lithium titanate having a ramsdellite structure (e.g., $Li_2Ti_3O_7$), lithium titanate having a spinel structure (e.g., $Li_4Ti_5O_{12}$), monoclinic type titanium dioxide ($TiO_2$ (B)), anatase type titanium dioxide, rutile type titanium dioxide, a hollandite-type titanium composite oxide, and a monoclinic type niobium titanium composite oxide (e.g., $Nb_2TiO_7$).

The conductive agent is added to improve a current collection performance and to suppress the contact resistance between the negative electrode active material and the current collector. Examples of the conductive agent include carbonaceous substances such as vapor grown carbon fiber (VGCF), acetylene black, carbon black, and graphite.

The binder is added to fill gaps in the dispersed negative electrode active material and also to bind the negative electrode active material with the current collector. Examples of the binder include polytetrafluoroethylene (PTFE), polyvinylidene fluoride (PVdF), fluorine rubber, styrene-butadiene rubber, a polyacrylic acid compound, and an imide compound.

The blending ratios of the active material, conductive agent and binder in the negative electrode layer are preferably 68% by mass to 96% by mass, 2% by mass to 30% by mass, and 2% by mass to 30% by mass, respectively. When the content of the conductive agent is 2% by mass or more, the current collection performance of the negative electrode layer can be improved. When the content of the binder is 2% by mass or more, binding between the negative electrode layer and current collector is sufficiently achieved, and excellent cycling characteristics can be expected. On the other hand, each of the contents of the conductive agent and binder is preferably 28% by mass or less, thereby increasing the capacity.

As the current collector, a material which is electrochemically stable at the lithium insertion and extraction potential of the negative electrode active material is used. The current collector is preferably made of copper, nickel, stainless steel or aluminum, or an aluminum alloy containing one or more elements selected from Mg, Ti, Zn, Mn, Fe, Cu, and Si. The thickness of the current collector is preferably 5 to 20 μm.

The current collector having such a thickness can keep a balance between the strength and weight reduction of the negative electrode.

By using the active material for a battery according to the first embodiment, the density of the negative electrode layer (excluding the current collector) can be set to the range of 1.8 g/cm$^3$ to 2.8 g/cm$^3$. The negative electrode in which the density of the negative electrode layer is within the range can exhibit an excellent energy density and excellent electrolytic solution holdablility. More preferably, the density of the negative electrode layer is 2.1 g/cm$^3$ to 2.6 g/cm$^3$.

The negative electrode is produced by, for example, suspending a negative electrode active material, a binder, and a conductive agent in an ordinary solvent to prepare a slurry, applying the slurry to a current collector, drying the coating to form a negative electrode layer, and then pressing the layer. Alternatively, the negative electrode may be also produced by forming a negative electrode active material, a binder, and a conductive agent into pellets to produce a negative electrode layer, and placing it on a current collector.

2) Positive Electrode

The positive electrode can include a current collector and a positive electrode layer (positive electrode active material-containing layer). The positive electrode layer may be formed on one or both surfaces of the current collector. The positive electrode layer can include a positive electrode active material, and optionally a conductive agent and a binder.

The positive electrode active material may be, for example, an oxide or a sulfide. Examples of the oxide and sulfide include a compound capable of inserting and extracting lithium. Specific examples thereof include manganese dioxide ($MnO_2$), iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), lithium manganese nickel composite oxide having a spinel structure (e.g., $Li_xMn_{2-y}Ni_yO_4$), lithium phosphorus oxide having an olivine structure (e.g., $Li_xFePO_4$, $Li_xFe_{1-y}Mn_yPO_4$, and $Li_xCoPO_4$), iron sulfate [$Fe_2(SO_4)_3$], vanadium oxide (e.g., $V_2O_5$), and lithium nickel cobalt manganese composite oxide. In the above-described formula, 0<x≤1, and 0<y≤1. As the active material, one of these compounds may be used singly, or combination of two or more of the compounds can be used.

More preferred examples of the positive electrode active material include lithium manganese composite oxide having a high positive electrode voltage (e.g., $Li_xMn_2O_4$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese nickel composite oxide having a spinel structure (e.g., $Li_xMn_{2-y}Ni_yO_4$), lithium manganese cobalt composite oxide (e.g., $Li_xMn_yCo_{1-y}O_2$), lithium iron phosphate (e.g., $Li_xFePO_4$), and lithium nickel cobalt manganese composite oxide. In the above-described formula, 0<x≤1, and 0<y≤1.

When an ordinary-temperature molten salt is used as the nonaqueous electrolyte of the battery, preferred examples of the positive electrode active material include lithium iron phosphate, $Li_xVPO_4F$ (0≤x≤1), lithium manganese composite oxide, lithium nickel composite oxide, and lithium nickel cobalt composite oxide. Since these compounds have low reactivity with ordinary-temperature molten salts, they can improve the cycle life.

The primary particle size of the positive electrode active material is preferably 100 nm to 1 μm. The positive electrode active material having a primary particle size of 100 nm or more is easy to handle during industrial production. The positive electrode active material having a primary particle size of 1 μm or less can allow lithium ions to smoothly diffuse in solids.

The specific surface area of the positive electrode active material is preferably 0.1 m$^2$/g to 10 m$^2$/g. The positive electrode active material having a specific surface area of 0.1 m$^2$/g or more can secure sufficient sites in which lithium ions can be inserted and extracted. The positive electrode active material having a specific surface area of 10 m$^2$/g or less is easy to handle during industrial production, and can secure a good charge-and-discharge cycle performance.

The binder is added to bind the positive electrode active material with the current collector. Examples of the binder include polytetrafluoroethylene (PTFE), polyvinylidene fluoride (PVdF), fluorine rubber, a polyacrylic acid compound, and an imide compound.

The conductive agent is as necessary added to improve the current collection performance, and to suppress the contact resistance between the positive electrode active material and current collector. Examples of the conductive agent include carbonaceous substances such as acetylene black, carbon black and graphite.

In the positive electrode layer, the blending ratios of the positive electrode active material and binder are preferably 80% by mass to 98% by mass, and 2% by mass to 20% by mass, respectively.

When the binder content is 2% by mass or more, sufficient electrode strength can be achieved. When the binder content is 20% by mass or less, the loading of the insulator in the electrode can be reduced, and thereby the internal resistance can be decreased.

When a conductive agent is added, the blending ratios of the positive electrode active material, binder, and conductive agent are preferably 77% by mass to 95% by mass, 2% by mass to 20% by mass, and 3% by mass to 15% by mass, respectively. When the content of the conductive agent is 3% by mass or more, the above-described effects can be achieved. By setting the amount of the positive electrode conductive agent to 15% by mass or less, the decomposition of a nonaqueous electrolyte on the surface of the positive electrode conductive agent in high-temperature storage can be reduced.

The current collector is preferably an aluminum foil, or an aluminum alloy foil containing one or more elements selected from Mg, Ti, Zn, Ni, Cr, Mn, Fe, Cu, and Si.

The thickness of the aluminum foil or aluminum alloy foil is preferably 5 μm to 20 μm, and more preferably 15 μm or less. The purity of the aluminum foil is preferably 99% by mass or more. The content of the transition metal such as iron, copper, nickel, or chromium contained in the aluminum foil or aluminum alloy foil is preferably 1% by mass or less.

The positive electrode is produced by, for example, suspending a positive electrode active material, a binder, and as necessary a conductive agent in an appropriate solvent to prepare a slurry, applying the slurry to a positive electrode current collector, drying the coating to form a positive electrode layer, and then pressing the layer. Alternatively, the positive electrode may be also produced by forming an active material, a binder, and as necessary a conductive agent into pellets to produce a positive electrode layer, and placing it on a current collector.

3) Nonaqueous Electrolyte

The nonaqueous electrolyte may be, for example, a liquid nonaqueous electrolyte which is prepared by dissolving an electrolyte in an organic solvent, or gel-like nonaqueous electrolyte which is a composite of a liquid electrolyte and a polymer material.

The liquid nonaqueous electrolyte is preferably prepared by dissolving an electrolyte in an organic solvent in the concentration of 0.5 mol/L to 2.5 mol/L.

Examples of the electrolyte include lithium salts such as lithium perchlorate (LiClO$_4$), lithium hexafluorophosphate (LiPF$_6$), lithium tetrafluoroborate (LiBF$_4$), lithium hexafluoroarsenate (LiAsF$_6$), lithium trifluoromethanesulfonate (LiCF$_3$SO$_3$), and lithium bistrifluoromethylsulfonylimide [LiN(CF$_3$SO$_2$)$_2$], and mixtures thereof. The electrolyte is preferably resistant to oxidation even at a high potential, and most preferably LiPF$_6$.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a chain ether such as dimethoxy ethane (DME) or diethoxy ethane (DEE); γ-butyrolactone (GBL), acetonitrile (AN), and sulfolane (SL). One of these organic solvents can be used alone or a mixed solvent can be used.

Examples of the polymeric material include polyvinylidene fluoride (PVdF), polyacrylonitrile (PAN), and polyethylene oxide (PEO).

Alternatively, the nonaqueous electrolyte may be, for example, an ordinary-temperature molten salt (ionic melt) containing lithium ions, a polymer solid electrolyte, or an inorganic solid electrolyte.

The ordinary-temperature molten salt (ionic melt) means compounds which can exist in a liquid state at ordinary temperature (15 to 25° C.) among organic salts constituted of combinations of organic cations and anions. The ordinary-temperature molten salt includes an ordinary-temperature molten salt which exists alone as a liquid, an ordinary-temperature molten salt which becomes a liquid after being mixed with an electrolyte, and an ordinary-temperature molten salt which becomes a liquid after being dissolved in an organic solvent. In general, the melting point of the ordinary-temperature molten salt used in nonaqueous electrolyte batteries is 25° C. or below. The organic cations generally have a quaternary ammonium skeleton.

The polymer solid electrolyte is prepared by dissolving the electrolyte in a polymeric material, and solidifying it.

The inorganic solid electrolyte is a solid substance having lithium ion conductivity.

4) Separator

The separator may be made of, for example, a porous film or synthetic resin nonwoven fabric containing polyethylene, polypropylene, cellulose, or polyvinylidene fluoride (PVdF). Among these, a porous film containing polyethylene or polypropylene can improve safety because the porous film melts at a fixed temperature to be able to shut off a current.

5) Container Member

The container member may be, for example, a laminate film having a thickness of 0.5 mm or less, or a metal case having a wall thickness of 1 mm or less. The thickness of the laminate film is more preferably 0.2 mm or less. The wall thickness of the metal case is more preferably 0.5 mm or less, and still more preferably 0.2 mm or less.

The shape of the container member is not particularly limited, and may be, for example, flat (thin), square, cylinder, coin, or button-shaped. The container member depends on the size of the battery, and may be that for a compact battery mounted on mobile electronic devices, and a large battery mounted on two- to four-wheel automobiles.

The laminate film used herein is a multilayer film including resin layers and a metal layer sandwiched between the resin layers. The metal layer is preferably an aluminum foil or an aluminum alloy foil for reducing weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy, for example. As the aluminum alloy, an alloy containing an element such as magnesium, zinc, or silicon is preferable. If a transition metal such as iron, copper, nickel, or chromium is contained in the alloy, the content thereof is preferably set to 1% by mass or less.

6) Positive Electrode Terminal and Negative Electrode Terminal

The positive electrode terminal may be made of, for example, a material which is electrically stable in the potential range of 3 V to 5 V based on the oxidation-reduction potential of lithium, and has electrical conductivity. Specifically, the positive electrode terminal is made of aluminum or an aluminum alloy containing Mg, Ti, Zn, Mn, Fe, Cu, and Si or the like. The positive electrode terminal is preferably made of the same material as the positive electrode current collector in order to reduce contact resistance with the positive electrode current collector.

The negative electrode terminal may be made of a material which is electrochemically stable at the potential at which the negative electrode active material described above inserts and extracts Li, and has electrical conductivity. Specific examples of the material for the negative electrode terminal include copper, nickel, stainless steel, or aluminum. The negative electrode terminal is preferably made of the same material as the negative electrode current collector in order to reduce the contact resistance with the negative electrode current collector.

Next, the nonaqueous electrolyte battery according to the second embodiment will be more specifically described with reference to the drawings.

First, a nonaqueous electrolyte battery as an example according to the second embodiment will be described with reference to FIGS. 3 and 4.

FIG. 3 is a cross sectional view of a nonaqueous electrolyte battery as an example according to the second embodiment. FIG. 4 is an enlarged cross sectional view showing a portion A in FIG. 3.

Figure 4:
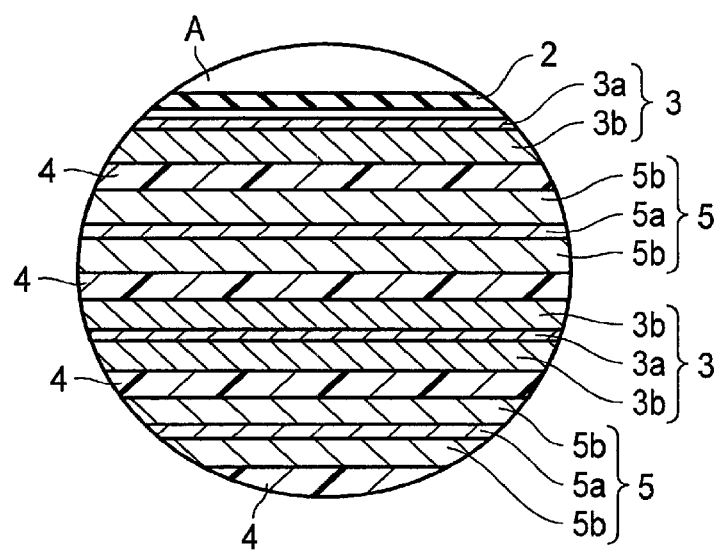
FIG. 4 is an enlarged cross sectional view showing a portion A in FIG. 3.

A nonaqueous electrolyte battery 10 shown in FIGS. 3 and 4 includes a bag-shaped container member 2 shown in FIG. 3, an electrode group 1 shown in FIGS. 3 and 4, and a nonaqueous electrolyte (not shown). The electrode group 1 and the nonaqueous electrolyte are accommodated in the container member 2. The nonaqueous electrolyte is held in the electrode group 1.

The bag-shaped container member 2 is made of a laminate film including two resin layers and a metal layer sandwiched between the resin layers.

As shown in FIG. 3, the electrode group 1 is a coiled electrode group in a flat form. The coiled electrode group 1 in a flat form is formed by, as shown in FIG. 4, spirally winding a laminate which includes, from the outside to the inside, a negative electrode 3, a separator 4, a positive electrode 5, and a separator 4, and then press-forming the wound laminate.

The negative electrode 3 includes a negative electrode current collector 3a and a negative electrode layer 3b. The negative electrode layer 3b contains the active material for a battery according to the first embodiment. The negative electrode 3 in the outermost layer has a configuration in which a negative electrode layer 3b is formed on one side which is the internal surface of a negative electrode current collector 3a as shown in FIG. 4. In the other portion of the negative electrode 3, the negative electrode layers 3b are formed on both surfaces of the negative electrode current collector 3a.

The positive electrode 5 includes a positive electrode current collector 5a and positive electrode layers 5b formed on both surfaces of the positive electrode current collector 5a.

As shown in FIG. 3, in the vicinity of the outer peripheral edge of the coiled electrode group 1, a negative electrode terminal 6 is connected to the negative electrode current collector 3a in the outermost negative electrode 3, and a positive electrode terminal 7 is connected to the positive electrode current collector 5a in the inside positive electrode 5. The negative electrode terminal 6 and the positive electrode terminal 7 are extended out from the opening of the bag-shaped container member 2.

The nonaqueous electrolyte battery 10 shown in FIGS. 3 and 4 can be produced according to the following procedure, for example. First, an electrode group 1 is produced. The electrode group 1 is then enclosed in a bag-shaped container member 2. In this case, one ends of a negative electrode terminal 6 and positive electrode terminal 7 are protruded toward the outside of the container member 2. Next, the circumference of the container member 2 is heat-sealed while a part thereof remains unsealed. Next, for example, a liquid nonaqueous electrolyte is injected via the opening of the bag-shaped container member 2 which is not heat-sealed. Finally, the opening is heat-sealed, and thereby the coiled electrode group 1 and the liquid state nonaqueous electrolyte are completely sealed.

Figure 5:
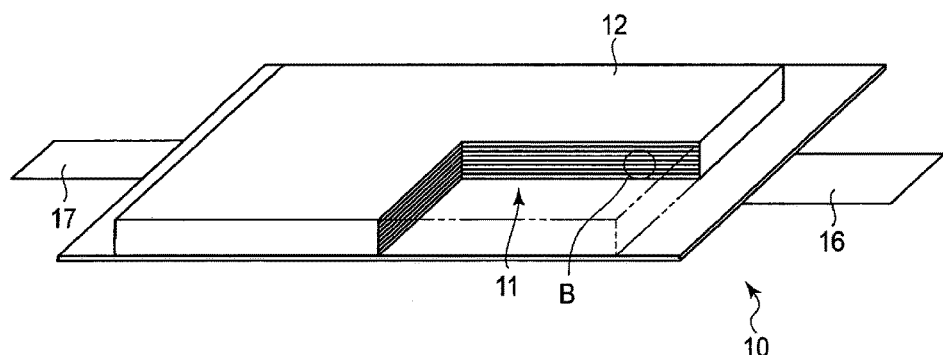
FIG. 5 is a partially cutaway perspective view schematically showing a nonaqueous electrolyte battery as another example according to a second embodiment.
Figure 6:
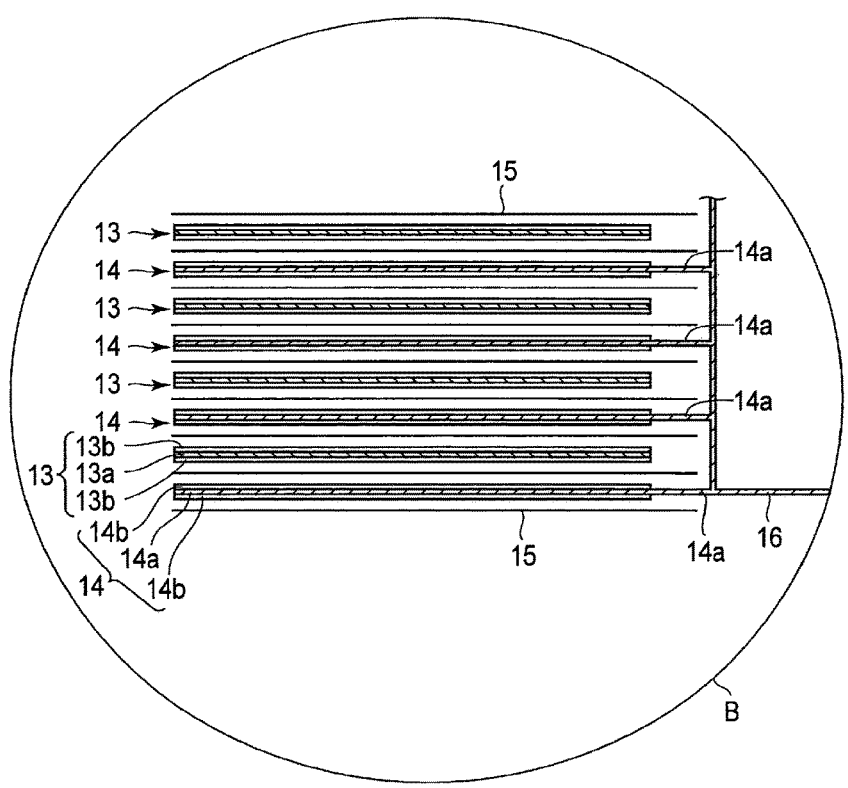
FIG. 6 is an enlarged cross sectional view of a portion B in FIG. 5.

The nonaqueous electrolyte battery according to the second embodiment is not limited to the nonaqueous electrolyte battery as an example shown in FIGS. 3 and 4, and may be, for example, a battery having a structure shown in FIGS. 5 and 6.

FIG. 5 is a partially cutaway perspective view schematically showing a nonaqueous electrolyte battery as another example according to the second embodiment. FIG. 6 is an enlarged cross sectional view showing a portion B in FIG. 5.

A nonaqueous electrolyte battery 10 shown in FIGS. 5 and 6 includes an electrode group 11 shown in FIGS. 5 and 6, a container member 12 shown in FIG. 5, and a nonaqueous electrolyte (not shown). The electrode group 11 and the nonaqueous electrolyte are accommodated in the container member 12. The nonaqueous electrolyte is held in the electrode group 11.

The container member 12 is made of a laminate film including two resin layers and a metal layer sandwiched between the resin layers.

As shown in FIG. 6, the electrode group 11 is a stacked electrode group. As shown in FIG. 6, the stacked electrode group 11 has a structure in which positive electrodes 13 and negative electrodes 14 are alternately laminated with a sandwiched therebetween.

The electrode group 11 includes a plurality of positive electrodes 13. Each of the plurality of positive electrodes 13 includes a positive electrode current collector 13a, and a positive electrode layer 13b supported on each of the both surfaces of the positive electrode current collector 13a. The electrode group 11 includes a plurality of negative electrodes 14. Each of the plurality of negative electrodes 14 includes a negative electrode current collector 14a, and a negative electrode layer 14b supported on each of the both surfaces of the negative electrode current collector 14a. A part of the negative electrode current collector 14a of each of the negative electrodes 14 protrudes at one side from the negative electrode 14. The protruded part of the negative electrode current collector 14a is electrically connected to a strip-shaped negative electrode terminal 16. The tip of the strip-shaped negative electrode terminal 16 is extended out from the container member 12. Although not shown in the drawings, a part of the positive electrode current collector 13a of the positive electrode 13 protrudes from the positive electrode 13 at the side opposed to the protruded side of the negative electrode current collector 14a. The protruded part of the positive electrode current collector 13a from the positive electrode 13 is electrically connected to a strip-shaped positive electrode terminal 17. The tip of the strip-shaped positive electrode terminal 17 is opposed to the negative electrode terminal 16, and extended out from a side of the container member 12.

The nonaqueous electrolyte battery according to the second embodiment contains the active material for a battery according to the first embodiment. The nonaqueous electrolyte battery according to the second embodiment, accordingly, can exhibit a high energy density, a high battery voltage, and excellent life performance, and can provide easy voltage management.

Third Embodiment

According to a third embodiment, there is provided a battery pack. The battery pack includes the nonaqueous electrolyte battery according to the second embodiment.

The battery pack according to the third embodiment can include one or more nonaqueous electrolyte batteries (unit cells) according to the second embodiment described above. The plurality of nonaqueous electrolyte batteries which may be included in the battery pack according to the third embodiment can be electrically connected in series or parallel, to constitute a battery module. The battery pack according to the third embodiment may include a plurality of battery modules.

Next, a battery pack as an example according to the third embodiment will be described with reference to the drawings.

Figure 7:
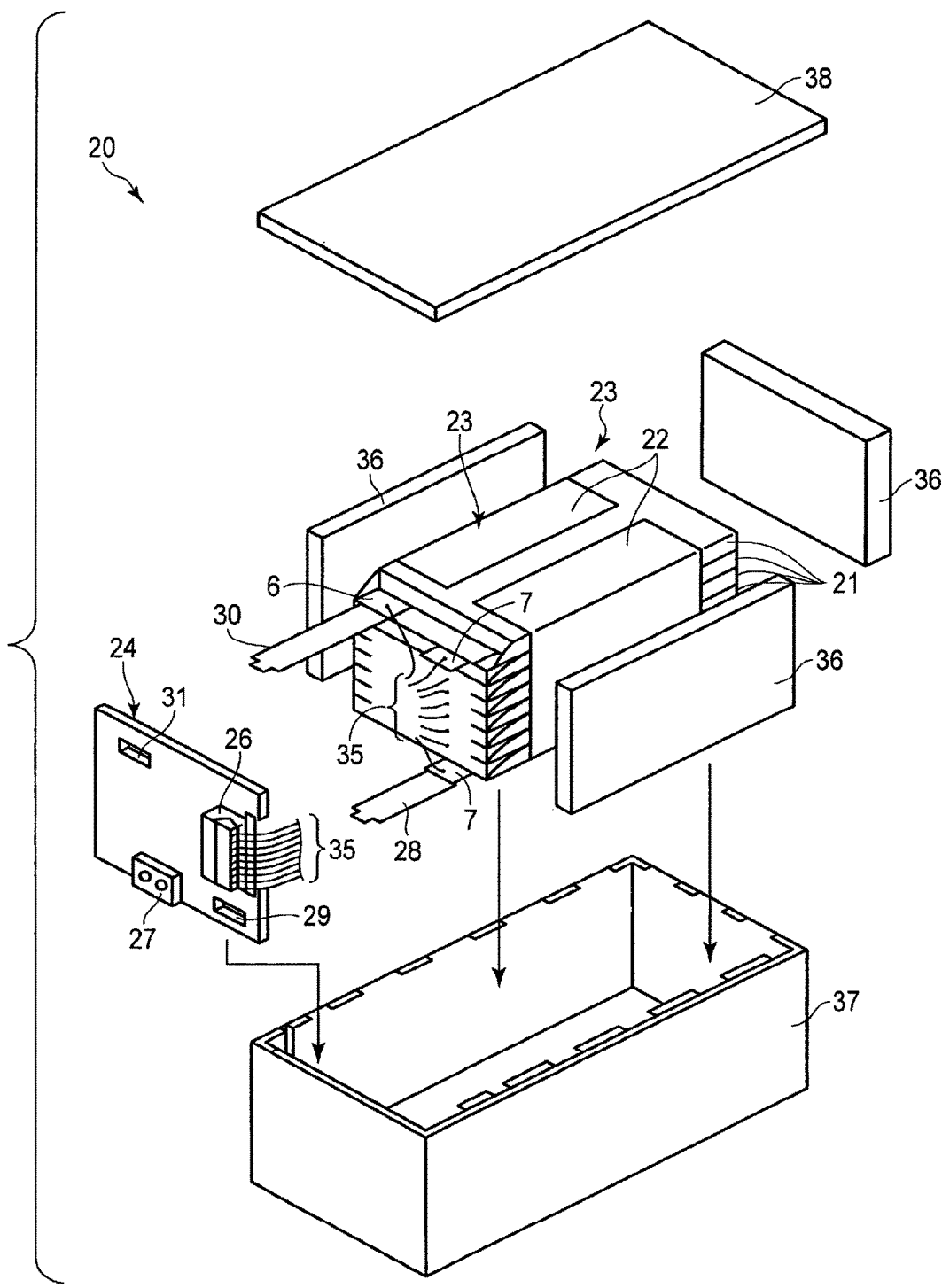
FIG. 7 is an exploded perspective view of a battery pack, which is one example according to a third embodiment.
Figure 8:
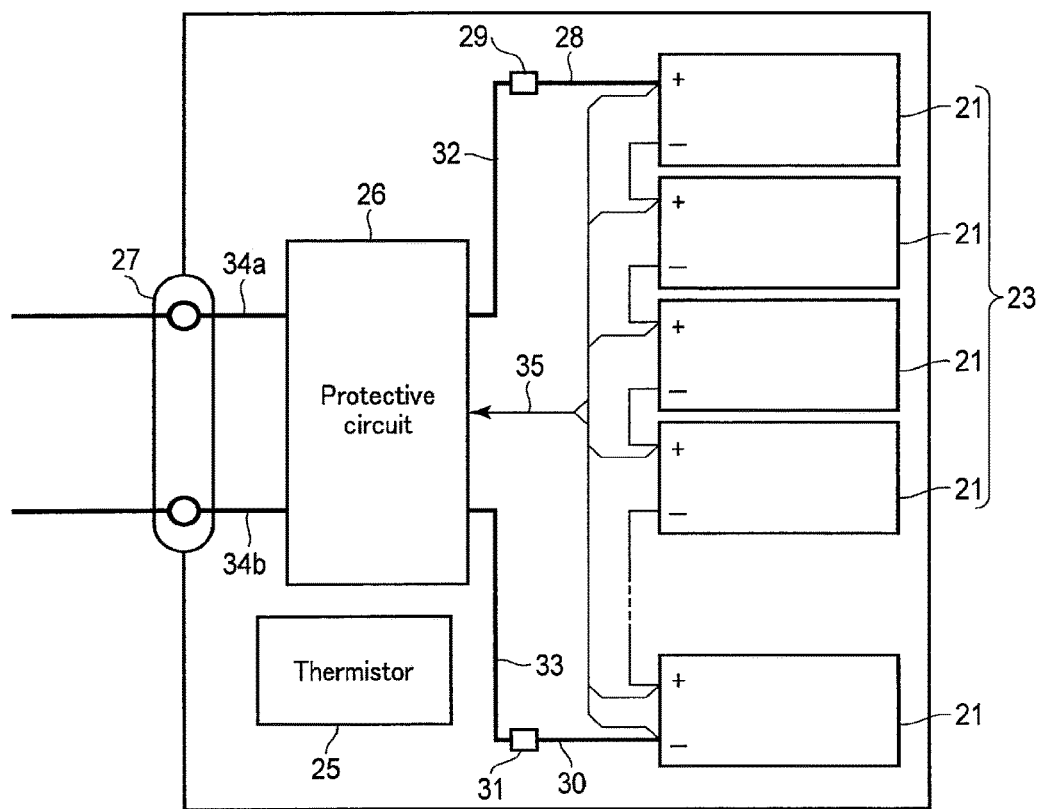
FIG. 8 is a block diagram showing an electric circuit of the battery pack of FIG. 7.

FIG. 7 is an exploded perspective view of the battery pack as an example according to the third embodiment. FIG. 8 is a block diagram showing an electric circuit of the battery pack of FIG. 7.

A battery pack 20 shown in FIGS. 7 and 8 includes a plurality of unit cells 21. Each of the plurality of unit cells 21 is flat nonaqueous electrolyte battery 10 described with reference to FIGS. 3 and 4.

The plurality of unit cells 21 are stacked so that the negative electrode terminal 6 and the positive electrode terminal 7 extended outside are arranged in the same direction, and fastened with an adhesive tape 22 to constitute a battery module 23. The unit cells 21 are electrically connected to each other in series as shown in FIG. 8.

A printed wiring board 24 is arranged opposed to the side plane where the negative electrode terminal 6 and the positive electrode terminal 7 of the unit cell 21 are extended.

A thermistor 25, a protective circuit 26, and an energizing terminal 27 to an external device are mounted on the printed wiring board 24 as shown in FIG. 8. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wirers 32 and 33 formed in the printed wiring board 24.

The thermistor 25 detects the temperature of the unit cells 21 and the detection signal is sent to the protective circuit 26. The protective circuit 26 can shut down a plus-side wirer 34a and a minus-side wirer 34b between the protective circuit 26 and the energizing terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the unit cells 21 is detected. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 20 of FIGS. 7 and 8, wirers 35 for voltage detection are connected to each of the unit cells 21. Detection signals are sent to the protective circuit 26 through the wirers 35.

Protective sheets 36 including rubber or resin are arranged on three side planes of the battery module 23 except the side plane from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 7 and 8, the structure in which the unit cells 21 are connected to each other in series is shown. In order to increase the battery capacity, the unit cells may be connected to each other in parallel. Furthermore, the assembled battery packs can be connected to each other in series and/or in parallel.

The aspect of the battery pack according to the third embodiment may be appropriately changed depending on its application. The applications of the battery pack according to the third embodiment are preferably those for which cycle characteristics when large-current is taken out are desired. Specific examples of these applications include application as a battery of a digital camera and application to a vehicle such as a two- or four-wheeled hybrid electric vehicle, a two- or four-wheeled electric vehicle or a power-assisted bicycle. Particularly preferably, the battery pack according to the third embodiment is used for a battery mounted to a vehicle.

The battery pack according to the third embodiment includes the nonaqueous electrolyte battery according to the second embodiment. Therefore, the battery pack according to the third embodiment can exhibit a high energy density and a high battery voltage, exhibit excellent life performance, and can provide easy voltage management.

Fourth Embodiment

According to a fourth embodiment, there is provided a battery module. The battery module includes nonaqueous electrolyte batteries. Each of the nonaqueous electrolyte batteries is the nonaqueous electrolyte battery according to the second embodiment. The nonaqueous electrolyte batteries are electrically connected in series.

The battery module according to the fourth embodiment can further include a lead for electrically connecting the plurality of nonaqueous electrolyte batteries to each other. The lead is preferably made of the same material as that of a terminal of the nonaqueous electrolyte battery in order to reduce contact resistance with the terminal of the nonaqueous electrolyte battery with which the lead is connected, for example.

For example, the battery module as an example according to the fourth embodiment can include five nonaqueous electrolyte batteries. As described above, the nonaqueous electrolyte battery according to the second embodiment can exhibit a high battery voltage. Therefore, the battery module including the five nonaqueous electrolyte batteries according to the second embodiment connected to each other in series can show the same operating voltage as that of a lead storage battery, for example.

Alternatively, a battery module as another example according to the fourth embodiment can include six nonaqueous electrolyte batteries.

The battery pack according to the third embodiment can include the battery module according to the fourth embodiment.

Next, the battery module as an example according to the fourth embodiment will be described in more detail with reference to the drawings.

Figure 9:
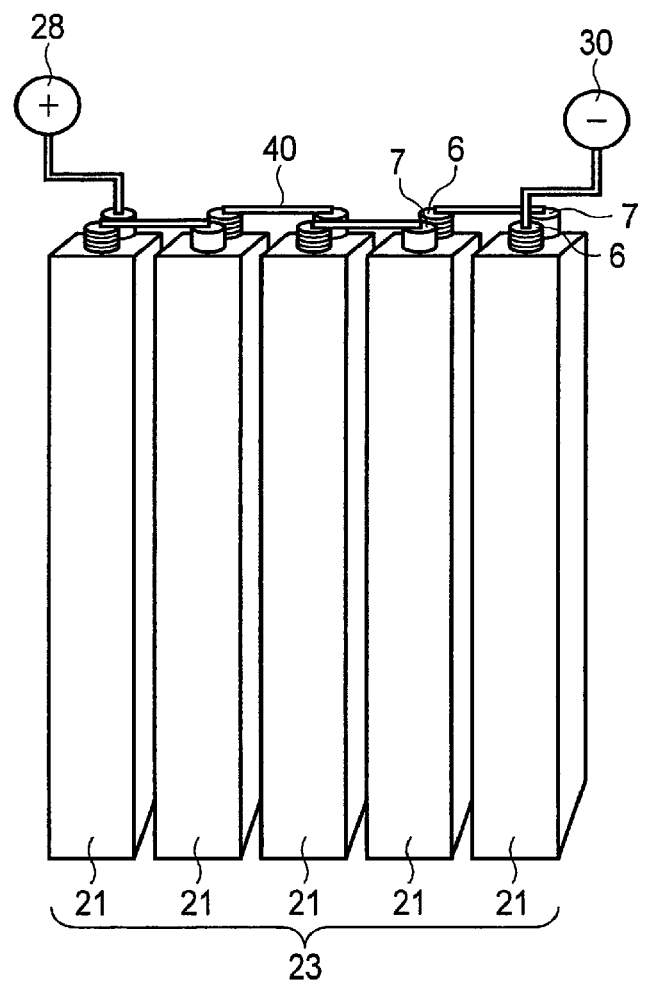
FIG. 9 is a schematic perspective view of a battery module as an example according to a fourth embodiment.

FIG. 9 is a schematic perspective view of a battery module as an example according to the fourth embodiment. A battery module 23 shown in FIG. 9 includes five unit cells 21. Each of the five unit cells 21 is the square type nonaqueous electrolyte battery as an example according to the second embodiment.

The battery module 23 shown in FIG. 9 further includes four leads 40. A lead 40 connects a negative electrode terminal 6 of one unit cell 21 and a positive electrode terminal 7 of another unit cell 21. Thus, the five unit cells 21 are electrically connected to each other in series via the four leads 40. That is, the battery module 23 of FIG. 9 is a battery module including the five unit cells connected in series.

As shown in FIG. 9, the positive electrode terminal 7 of one unit cell 21 among the five unit cells 21 is connected to a positive electrode-side lead 28 for external connection. The negative electrode terminal 6 of another unit cell 21 among the five unit cells 21 is connected to a negative electrode-side lead 30 for external connection.

Since the battery module according to the fourth embodiment includes the nonaqueous electrolyte batteries each of which is one according to the second embodiment, the battery module can provide easy charge-and-discharge management, exhibit excellent life performance, and exhibit a high energy density and a high battery voltage.

EXAMPLES

Hereinafter, the above embodiments are explained in more detail referring to Examples. The identification of a crystal phase and the estimation of a crystal structure of each of synthesized products was performed by powder X-ray diffraction using Cu—Kα rays. In addition, a composition of a product was analyzed by an ICP method to confirm that a target product was obtained.

Synthesis

Example A

Examples A-1 to A-13

In Example A-1 to A-13, products of Examples A-1 to A-13 were synthesized according to the following procedures. Target compositions of Examples A-1 to A-13 are shown in the following Table 1.

First, commercially available oxide and carbonate reagents shown in the following Table 1 were provided as starting materials so that molar ratios shown in Table 1 were satisfied and the total weight was 50 g. Since the vaporized amount corresponding to 3% was confirmed as the amount of lithium carbonate as a result of analyzing the vaporized amount of lithium ions during firing in a preliminary experiment, lithium carbonate was provided in a higher amount than that of the target composition by 3%.

Next, the starting materials, provided as above, were mixed, and the mixture was put in an agate pod (a volume of 300 ml) for a ball mill. Agate balls having a diameter of 10 mm or 5 mm were put in the pod in a ratio of the number of balls of 1:1 up to one third of the pod volume. After that, 50 ml of ethanol was added to the pod, and the mixture was wet-mixed at 120 rpm for 60 minutes to obtain a mixture. When the starting materials are uniformly mixed by the wet-mixing, and thus a target single phase of a crystal phase can be obtained.

Next, the thus obtained mixture was put in an electric furnace, and a heat treatment was performed by the following procedures.

First, calcination was performed at a temperature of 650° C. for 6 hours in an air atmosphere. Next, a powder obtained by calcination was taken out from the furnace, and the powder was reground and mixed. When the calcination is previously performed as above to decompose the carbonates or the like in the materials and they are mixed again, the raw material particles can cohere to each other in a main sintering; as a result, particles which are uniform and have high crystallinity can be obtained.

The thus obtained mixture was subsequently subjected to a first-sintering at a temperature of 900° C. for 6 hours. After the sintering, the sintered powder was taken out from the furnace, and the sintered powder was mixed again.

Subsequently, the re-mixed sintered powder was put in the furnace, and a second sintering was performed at a temperature of 900° C. for 6 hours in an air atmosphere. After that, the temperature in the electric furnace was kept at 400° C. for 2 hours, and then was quickly cooled to room temperature. Next, the sintered powder was taken out from the furnace, and the sintered powder was mixed again. The powder obtained after the second sintering, i.e., as a result of sintering at a temperature of 900° C. for a total of 12 hours was used as each of products was used as each of products of Example A-1 to A-13.

Example A-14

In Example A-14, a product of Example A-14 was synthesized in the same manner as in Example A-5 except that the sintering was performed in a reduction atmosphere by blowing nitrogen gas containing 3% hydrogen into the electric furnace.

starting materials containing no M2 source, as shown in Table 1, were used, and the sintering was continuously performed at 1000° C. for 24 hours without considering the Li vaporization amount during the sintering. On the other hand, in Comparative Example A-1b, a product of Comparative Example A-1b was synthesized in the same manner as in Example A-1 except that starting materials containing no M2 source as shown in Table 1 were used.

In Comparative Example A-2, a product of Comparative Example A-2 was synthesized in the same manner as in Comparative Example A-1b except that amounts of lithium carbonate and sodium carbonate were changed to those described in Table 1.

In Comparative Example A-3, a product of Comparative Example A-3 was synthesized in the same manner as in Comparative Example A-1b except that starting materials shown in Table 1 were used.

In Comparative Examples A-4 and A-5, products of Comparative Examples A-4 and A-5 were synthesized in the same manner as in Example A-1 except that the target compositions were to be those described in Electrochemistry Communications 11 (2009) pp. 1251-1254. The target compositions, the starting materials and the molar ratios were as described in the above Table 1.

TABLE 1

| A series | Target Composition | Li Source/Amount | Na Source/Amount | M1 Source/Amount | Ti Source/Amount | M2 Source/Amount |
|---|---|---|---|---|---|---|
| Comparative Example A-1a | $Li_2Na_2Ti_6O_{14}$ | $Li_2CO_3/1.0$ | $Na_2CO_3/1.0$ | — | $TiO_2/6.0$ | — |
| Comparative Example A-1b | $Li_2Na_2Ti_6O_{14}$ | $Li_2CO_3/1.0$ | $Na_2CO_3/1.0$ | — | $TiO_2/6.0$ | — |
| Comparative Example A-2 | $Li_{2.1}Na_{1.9}Ti_6O_{14}$ | $Li_2CO_3/1.05$ | $Na_2CO_3/0.95$ | — | $TiO_2/6.0$ | — |
| Comparative Example A-3 | $Li_2Na_2Ti_{5.9}Nb_{0.1}O_{14}$ | $Li_2CO_3/1.0$ | $Na_2CO_3/1.0$ | — | $TiO_2/5.9$ | $Nb_2O_5/0.05$ |
| Comparative Example A-4 | $Li_2MgTi_6O_{14}$ | $Li_2CO_3/1.0$ | — | $MgO/1.0$ | $TiO_2/6.0$ | — |
| Comparative Example A-5 | $Li_2BaTi_{5.9}Al_{0.1}O_{14}$ | $Li_2CO_3/1.0$ | — | $BaCO_3/1.0$ | $TiO_2/5.9$ | $Al_2O_3/0.05$ |
| Example A-1 | $Li_2Na_{1.99}Ti_{5.99}Nb_{0.01}O_{14}$ | $Li_2CO_3/1.0$ | $Na_2CO_3/0.995$ | — | $TiO_2/5.99$ | $Nb_2O_5/0.005$ |
| Example A-2 | $Li_2Na_{1.95}Ti_{5.95}Nb_{0.05}O_{14}$ | $Li_2CO_3/1.0$ | $Na_2CO_3/0.975$ | — | $TiO_2/5.95$ | $Nb_2O_5/0.025$ |
| Example A-3 | $Li_2Na_{1.9}Ti_{5.9}Nb_{0.1}O_{14}$ | $Li_2CO_3/1.0$ | $Na_2CO_3/0.95$ | — | $TiO_2/5.9$ | $Nb_2O_5/0.05$ |
| Example A-4 | $Li_2Na_{1.75}Ti_{5.75}Nb_{0.25}O_{14}$ | $Li_2CO_3/1.0$ | $Na_2CO_3/0.875$ | — | $TiO_2/5.75$ | $Nb_2O_5/0.125$ |
| Example A-5 | $Li_2Na_{1.5}Ti_{5.5}Nb_{0.5}O_{14}$ | $Li_2CO_3/1.0$ | $Na_2CO_3/0.75$ | — | $TiO_2/5.50$ | $Nb_2O_5/0.25$ |
| Example A-6 | $Li_2Na_{1.25}Ti_{5.25}Nb_{0.75}O_{14}$ | $Li_2CO_3/1.0$ | $Na_2CO_3/0.625$ | — | $TiO_2/5.25$ | $Nb_2O_5/0.375$ |
| Example A-7 | $Li_2Na_{1.1}Ti_{5.1}Nb_{0.9}O_{14}$ | $Li_2CO_3/1.0$ | $Na_2CO_3/0.55$ | — | $TiO_2/5.10$ | $Nb_2O_5/0.45$ |
| Example A-8 | $Li_2Na_{1.05}Ti_{5.05}Nb_{0.95}O_{14}$ | $Li_2CO_3/1.0$ | $Na_2CO_3/0.525$ | — | $TiO_2/5.05$ | $Nb_2O_5/0.475$ |
| Example A-9 | $Li_2Na_{1.01}Ti_{5.01}Nb_{0.99}O_{14}$ | $Li_2CO_3/1.0$ | $Na_2CO_3/0.505$ | — | $TiO_2/5.01$ | $Nb_2O_5/0.495$ |
| Example A-10 | $Li_{2.1}Na_{1.99}Ti_{5.99}Nb_{0.01}O_{14}$ | $Li_2CO_3/1.05$ | $Na_2CO_3/0.995$ | — | $TiO_2/5.99$ | $Nb_2O_5/0.005$ |
| Example A-11 | $Li_{2.5}Na_{1.5}Ti_{5.5}Nb_{0.5}O_{14}$ | $Li_2CO_3/1.25$ | $Na_2CO_3/0.75$ | — | $TiO_2/5.50$ | $Nb_2O_5/0.25$ |
| Example A-12 | $Li_4Na_{1.5}Ti_{5.5}Nb_{0.5}O_{14}$ | $Li_2CO_3/2.00$ | $Na_2CO_3/0.75$ | — | $TiO_2/5.50$ | $Nb_2O_5/0.25$ |
| Example A-13 | $Li_6Na_{1.5}Ti_{5.5}Nb_{0.5}O_{14}$ | $Li_2CO_3/3.00$ | $Na_2CO_3/0.75$ | — | $TiO_2/5.50$ | $Nb_2O_5/0.25$ |
| Example A-14 | $Li_2Na_{1.5}Ti_{5.5}Nb_{0.5}O_{13.5}$ | $Li_2CO_3/1.00$ | $Na_2CO_3/0.75$ | — | $TiO_2/5.50$ | $Nb_2O_5/0.25$ |

Comparative Examples A-1 to A-5

In Comparative Example A-1, in order to show that an intensity ratio of the powder X-ray diffraction diagram varies depending on the synthesis condition, products of Comparative Examples A-1a and A-1b, whose target composition was compound $Li_2Na_2Ti_6O_{14}$, were synthesized under different two conditions. In Comparative Example A-1a, a product of Comparative Example A-1a was synthesized in the same manner as in Example A-1 except that (Confirmation of Composition of Product)

The compositions of the products of Examples A-1 to A-14 and the products of Comparative Examples A-1 to A-5 were analyzed according to the ICP method described above. The results are shown in Table 2 below.

As shown in Table 2, the product of Example A-14 had a subscript of oxygen in the composition formula of 13.5. In the product of Example A-14, accordingly, oxygen deficiency occurred slightly compared to Example A-5.

TABLE 2

| A series | Composition | $Li_{2+w}Na_{2-x}M1_yTi_{6-z}M2_zO_{14}$ | | | |
|---|---|---|---|---|---|
| | | w | x | y | z |
| Comparative Example A-1a | $Li_2Na_2Ti_6O_{14}$ | 0 | 0 | 0 | 0 |
| Comparative Example A-1b | $Li_2Na_2Ti_6O_{14}$ | 0 | 0 | 0 | 0 |
| Comparative Example A-2 | $Li_{2.1}Na_{1.9}Ti_6O_{14}$ | 0.1 | 0.1 | 0 | 0 |
| Comparative Example A-3 | $Li_2Na_2Ti_{5.9}Nb_{0.1}O_{14}$ | 0 | 0 | 0 | 0.1 |
| Comparative Example A-4 | $Li_2MgTi_6O_{14}$ | 0 | — | 0 | 0 |
| Comparative Example A-5 | $Li_2BaTi_{5.9}Al_{0.1}O_{14}$ | 0 | — | 0 | 0.1 |
| Example A-1 | $Li_2Na_{1.99}Ti_{5.99}Nb_{0.01}O_{14}$ | 0 | 0.01 | 0 | 0.01 |
| Example A-2 | $Li_2Na_{1.95}Ti_{5.95}Nb_{0.05}O_{14}$ | 0 | 0.05 | 0 | 0.05 |
| Example A-3 | $Li_2Na_{1.9}Ti_{5.9}Nb_{0.1}O_{14}$ | 0 | 0.1 | 0 | 0.1 |
| Example A-4 | $Li_2Na_{1.75}Ti_{5.75}Nb_{0.25}O_{14}$ | 0 | 0.25 | 0 | 0.25 |
| Example A-5 | $Li_2Na_{1.5}Ti_{5.5}Nb_{0.5}O_{14}$ | 0 | 0.5 | 0 | 0.5 |
| Example A-6 | $Li_2Na_{1.25}Ti_{5.25}Nb_{0.75}O_{14}$ | 0 | 0.75 | 0 | 0.75 |
| Example A-7 | $Li_2Na_{1.1}Ti_{5.1}Nb_{0.9}O_{14}$ | 0 | 0.9 | 0 | 0.9 |
| Example A-8 | $Li_2Na_{1.05}Ti_{5.05}Nb_{0.95}O_{14}$ | 0 | 0.95 | 0 | 0.95 |
| Example A-9 | $Li_2Na_{1.01}Ti_{5.01}Nb_{0.99}O_{14}$ | 0 | 0.99 | 0 | 0.99 |
| Example A-10 | $Li_{2.1}Na_{1.99}Ti_{5.99}Nb_{0.01}O_{14}$ | 0.1 | 0.01 | 0 | 0.01 |
| Example A-11 | $Li_{2.5}Na_{1.5}Ti_{5.5}Nb_{0.5}O_{14}$ | 0.5 | 0.5 | 0 | 0.5 |
| Example A-12 | $Li_4Na_{1.5}Ti_{5.5}Nb_{0.5}O_{14}$ | 2.0 | 0.5 | 0 | 0.5 |
| Example A-13 | $Li_6Na_{1.5}Ti_{5.5}Nb_{0.5}O_{14}$ | 4.0 | 0.5 | 0 | 0.5 |
| Example A-14 | $Li_2Na_{1.5}Ti_{5.5}Nb_{0.5}O_{13.5}$ | 0 | 0.5 | 0 | 0.5 |

(Powder X-Ray Diffraction Measurement)

The products of Examples A-1 to A-14 and the products of Comparative Examples A-1 to A-5 were subjected to the powder X-ray diffraction measurement according to the procedure described above.

The following Table 3 shows a crystal plane index corresponding to a strongest diffraction peak L appearing in a range of $17° \leq 2\theta \leq 18.5°$; a value $2\theta_L$ of $2\theta$ of the diffraction peak L; a crystal plane index corresponding to a strongest diffraction peak H appearing in a range of $18.5° < 2\theta \leq 19.5°$; a value $2\theta_H$ of $2\theta$ of the diffraction peak H; and an intensity ratio $I_L/I_H$ of these diffraction peaks, which were obtained from the results of the powder X-ray diffraction measurement of each product.

As apparent from the following Table 3, in Comparative Examples A-1a and A-1b, the obtained results of the intensity ratio $I_L/I_H$ of the diffraction peaks were different from each other, though the target compositions are the same. In Comparative Example A-1a, the sintering was performed at one time at 1000° C. for a long time without considering the vaporization amount of Li. On the other hand, in Comparative Example A-1b, the synthesis was performed in the same manner as in Example A-1 of the present application. It can be considered therefore that if the sintering condition or the feed amount of the lithium starting materials is different, the crystallite growing condition is also different.

On the other hand, the results of the powder X-ray diffraction were analyzed according to a Rietveld method. As a result, it was found that the products obtained in Examples A-1 to A-14 were orthorhombic type compounds having the space group Fmmm symmetry shown in FIG. 2. Crystal phases and space groups of the products are shown in Table 3 altogether.

Next, according to the procedures described above, the amount of vacancies was obtained from the site occupancy ratio of the Na sites. As a specific example, the product of Example A-5 is explained. As described above, the product of Example A-5 is an orthorhombic crystal having the space group Fmmm. The sites occupied by Na in the crystal structure are represented as the 8g site and the 8i site by Wyckoff notation in the International Tables. Rietveld analysis was performed while changing the occupancy ratio g of the Na sites. The result is that the fitting parameter $S_{vacant}$ when the occupancy ratio g is lower than 1.0, that is, lower than 100% is smaller than the fitting parameter $S_{100}$ when the occupancy ratio g is 1.0, that is, 100%. From the result, it was confirmed that vacancies exist in the product of Example A-5. Furthermore, the analysis shows that the ratio of vacancies in the Na sites for the product of Example A-5 calculated by the procedure described above by $(1-g) \times 100$ was about 25%.

The crystal phase, the space group and the results of determination of existence or non-existence of vacancies obtained from occupancy ratio of the Na sites of each of products are summarized in Table 3 below.

TABLE 3

| A series | Composition | Crystal Phase | Space Group | Diffraction Peak L Plane Index | Diffraction Peak L 2θ/deg | Diffraction Line H Plane Index | Diffraction Line H 2θ/deg | Intensity Ratio of Diffraction Peaks $I_L/I_H$ | Ratio of Vacancies in Na Sites |
|---|---|---|---|---|---|---|---|---|---|
| Comparative Example A-1a | $Li_2Na_2Ti_6O_{14}$ | Orthorhombic | Fmmm | (111) | 18.14 | (202) | 19.09 | 3.06 | 0 |
| Comparative Example A-1b | $Li_2Na_2Ti_6O_{14}$ | Orthorhombic | Fmmm | (111) | 18.15 | (202) | 19.13 | 2.20 | 0 |

TABLE 3-continued

| A series | Composition | Crystal Phase | Space Group | Diffraction Peak L Plane Index | Diffraction Peak L 2θ/deg | Diffraction Line H Plane Index | Diffraction Line H 2θ/deg | Intensity Ratio of Diffraction Peaks $I_L/I_H$ | Ratio of Vacancies in Na Sites |
|---|---|---|---|---|---|---|---|---|---|
| Comparative Example A-2 | $Li_{2.1}Na_{1.9}Ti_6O_{14}$ | Orthorhombic | Fmmm | (111) | 18.16 | (202) | 19.14 | 2.21 | 0 |
| Comparative Example A-3 | $Li_2Na_2Ti_{5.9}Nb_{0.1}O_{14}$ | Orthorhombic | Fmmm | (111) | 18.16 | (202) | 19.14 | 2.23 | 0 |
| Comparative Example A-4 | $Li_2MgTi_6O_{14}$ | Orthorhombic | Cmca | (021) | 18.35 | (220) | 19.34 | 0.52 | — |
| Comparative Example A-5 | $Li_2BaTi_{5.9}Al_{0.1}O_{14}$ | Orthorhombic | Cmca | (021) | 17.58 | (220) | 19.28 | 0.43 | — |
| Example A-1 | $Li_2Na_{1.99}Ti_{5.99}Nb_{0.01}O_{14}$ | Orthorhombic | Fmmm | (111) | 18.16 | (202) | 19.15 | 2.25 | 0.5% |
| Example A-2 | $Li_2Na_{1.95}Ti_{5.95}Nb_{0.05}O_{14}$ | Orthorhombic | Fmmm | (111) | 18.17 | (202) | 19.16 | 2.29 | 2.48% |
| Example A-3 | $Li_2Na_{1.9}Ti_{5.9}Nb_{0.1}O_{14}$ | Orthorhombic | Fmmm | (111) | 18.17 | (202) | 19.17 | 2.40 | 4.8% |
| Example A-4 | $Li_2Na_{1.75}Ti_{5.75}Nb_{0.25}O_{14}$ | Orthorhombic | Fmmm | (111) | 18.17 | (202) | 19.16 | 2.43 | 12.1% |
| Example A-5 | $Li_2Na_{1.5}Ti_{5.5}Nb_{0.5}O_{14}$ | Orthorhombic | Fmmm | (111) | 18.15 | (202) | 19.14 | 2.55 | 24.8% |
| Example A-6 | $Li_2Na_{1.25}Ti_{5.25}Nb_{0.75}O_{14}$ | Orthorhombic | Fmmm | (111) | 18.10 | (202) | 19.11 | 2.75 | 37.2% |
| Example A-7 | $Li_2Na_{1.1}Ti_{5.1}Nb_{0.9}O_{14}$ | Orthorhombic | Fmmm | (111) | 18.11 | (202) | 19.10 | 2.83 | 45.3% |
| Example A-8 | $Li_2Na_{1.05}Ti_{5.05}Nb_{0.95}O_{14}$ | Orthorhombic | Fmmm | (111) | 18.12 | (202) | 19.12 | 3.21 | 47.6% |
| Example A-9 | $Li_2Na_{1.01}Ti_{5.01}Nb_{0.99}O_{14}$ | Orthorhombic | Fmmm | (111) | 18.14 | (202) | 19.14 | 3.50 | 49.8% |
| Example A-10 | $Li_{2.1}Na_{1.99}Ti_{5.99}Nb_{0.01}O_{14}$ | Orthorhombic | Fmmm | (111) | 18.13 | (202) | 19.14 | 2.27 | 0.48% |
| Example A-11 | $Li_{2.5}Na_{1.5}Ti_{5.5}Nb_{0.5}O_{14}$ | Orthorhombic | Fmmm | (111) | 18.14 | (202) | 19.16 | 2.54 | 24.6% |
| Example A-12 | $Li_4Na_{1.5}Ti_{5.5}Nb_{0.5}O_{14}$ | Orthorhombic | Fmmm | (111) | 18.13 | (202) | 19.12 | 2.35 | 24.5% |
| Example A-13 | $Li_6Na_{1.5}Ti_{5.5}Nb_{0.5}O_{14}$ | Orthorhombic + Unknown Phase | Fmmm | (111) | 18.09 | (202) | 19.06 | 2.61 | 24.9% |
| Example A-14 | $Li_2Na_{1.5}Ti_{5.5}Nb_{0.5}O_{13.5}$ | Orthorhombic | Fmmm | (111) | 18.15 | (202) | 19.14 | 2.59 | 24.6% |

Figure 10:
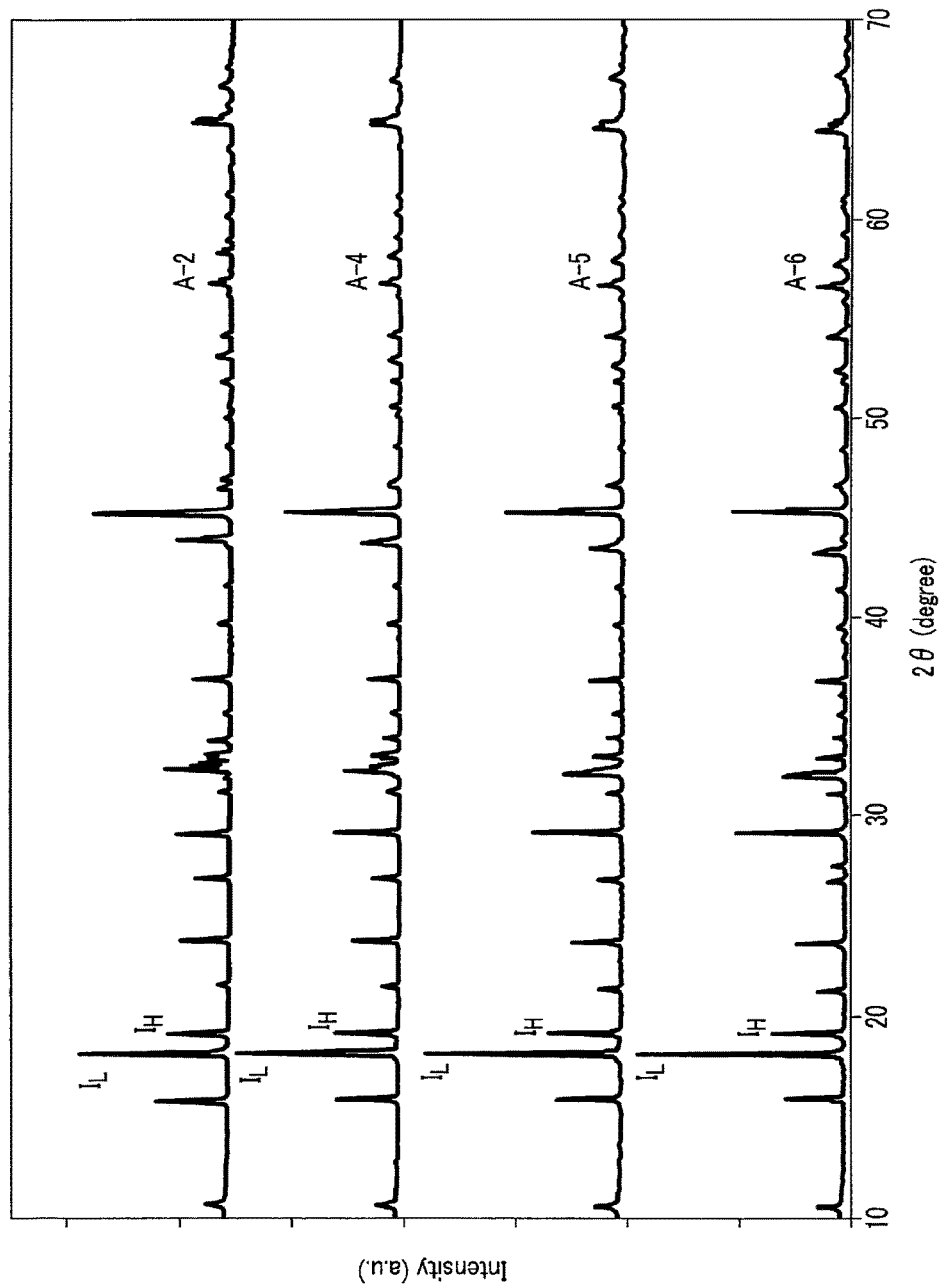
FIG. 10 shows X-ray diffraction diagrams of products of Examples A-2, A-4, A-5, A-6 and A-9.

As typical X-ray charts, X-ray charts in Example A-2, Example A-4, Example A-5, and Example A-6 are shown in FIG. 10.

Example A-15

In Example A-15, a product of Example A-15 was synthesized according to the following procedures.

First, a part of the product of Example A-5 was immersed into a sucrose aqueous solution having a concentration adjusted to 10% by weight. Then, the sucrose solution was filtered. Then, the filtration residue was heated at 700° C. for 2 hours in a nitrogen atmosphere. The product obtained by the heating was used as the product of Example A-15.

The product of Example A-15 was analyzed by TEM-EDX (transmission electron microscopy and energy dispersive X-ray spectroscopy). As a result, it was found that the surface of the particles of the product of Example A-5 was coated with carbon.

Example A-16

In Example A-16, a product of Example A-16 was synthesized by coating the surface of the product of Example A-5 with lithium titanate $Li_4Ti_5O_{12}$ using a tumbling fluidized bed granulator according to the following procedures.

Specifically, first, lithium ethoxide and titanium tetraisopropoxide were mixed in a molar ratio of Li:Ti of 4:5 to prepare a sol-gel liquid. Next, the prepared sol-gel liquid was sprayed to a part of the product of Example A-5 in the tumbling fluidized bed granulator. Thus a composite in which the sol-gel liquid adhered to the particle surface is obtained. The composite was fired at 600° C. for 2 hours in an air atmosphere, whereby the sol-gel liquid was converted into a spinel lithium titanate. The thus obtained product was used as the product of Example A-16.

The product of Example A-16 was analyzed by TEM-EDX (transmission electron microscopy and energy dispersive X-ray spectroscopy), and electron beam diffraction. As a result, it was found that the surface of the particle of the product of Example A-5 was coated with a layer of lithium titanate $Li_4Ti_5O_{12}$ having spinel type crystal structure.

Example B

In Examples B-1 to B-8, products of Examples B-1 to B-8 were obtained in the same manner as in Examples A-1 to A-13 except that starting materials shown in the following Table 4 were used for obtaining the products each of which has a target composition shown in Table 4. The molar ratios of the starting materials were set to ratios shown in the following Table 4.

TABLE 4

| B series | Target Composition | Li Source/Amount | Na Source/Amount | M1 Source/Amount | Ti Source/Amount | M2 Source/Amount |
|---|---|---|---|---|---|---|
| Example B-1 | $Li_2Na_{1.9}Cs_{0.05}Ti_{5.95}Nb_{0.05}O_{14}$ | $Li_2CO_3/1.0$ | $Na_2CO_3/0.95$ | $Cs_2CO_3/0.025$ | $TiO_2/5.95$ | $Nb_2O_5/0.025$ |
| Example B-2 | $Li_2Na_{1.5}Cs_{0.25}Ti_{5.75}Nb_{0.25}O_{14}$ | $Li_2CO_3/1.0$ | $Na_2CO_3/0.75$ | $Cs_2CO_3/0.125$ | $TiO_2/5.75$ | $Nb_2O_5/0.125$ |
| Example B-3 | $Li_2Na_{1.0}Cs_{0.5}Ti_{5.5}Nb_{0.5}O_{14}$ | $Li_2CO_3/1.0$ | $Na_2CO_3/0.5$ | $Cs_2CO_3/0.25$ | $TiO_2/5.50$ | $Nb_2O_5/0.25$ |
| Example B-4 | $Li_2Na_{0.5}Cs_{0.75}Ti_{5.25}Nb_{0.75}O_{14}$ | $Li_2CO_3/1.0$ | $Na_2CO_3/0.25$ | $Cs_2CO_3/0.375$ | $TiO_2/5.25$ | $Nb_2O_5/0.375$ |
| Example B-5 | $Li_2Na_{0.1}Cs_{0.95}Ti_{5.05}Nb_{0.95}O_{14}$ | $Li_2CO_3/1.0$ | $Na_2CO_3/0.05$ | $Cs_2CO_3/0.475$ | $TiO_2/5.05$ | $Nb_2O_5/0.475$ |

TABLE 4-continued

| B series | Target Composition | Li Source/ Amount | Na Source/ Amount | M1 Source/ Amount | Ti Source/ Amount | M2 Source/ Amount |
|---|---|---|---|---|---|---|
| Example B-6 | $Li_2Na_{0.5}Cs_{1.0}Ti_{5.5}Nb_{0.5}O_{14}$ | $Li_2CO_3/1.0$ | $Na_2CO_3/0.25$ | $Cs_2CO_3/0.5$ | $TiO_2/5.50$ | $Nb_2O_5/0.25$ |
| Example B-7 | $Li_2Na_{0.25}Cs_{1.5}Ti_{5.75}Nb_{0.25}O_{14}$ | $Li_2CO_3/1.0$ | $Na_2CO_3/0.125$ | $Cs_2CO_3/0.75$ | $TiO_2/5.75$ | $Nb_2O_5/0.125$ |
| Example B-8 | $Li_2Na_{0.05}Cs_{1.9}Ti_{5.95}Nb_{0.05}O_{14}$ | $Li_2CO_3/1.0$ | $Na_2CO_3/0.025$ | $Cs_2CO_3/0.95$ | $TiO_2/5.95$ | $Nb_2O_5/0.025$ |

The products of Examples B-1 to B-8 were subjected to the composition analysis and the powder X-ray diffraction measurement in the same manner as in the Example A-series. The results are shown in the following Table 5 and Table 6.

TABLE 5

| | | $Li_{2+w}Na_{2-x}M1_yTi_{6-z}M2_zO_{14}$ | | | |
|---|---|---|---|---|---|
| B series | Composition | w | x | y | z |
| Example B-1 | $Li_2Na_{1.9}Cs_{0.05}Ti_{5.95}Nb_{0.05}O_{14}$ | 0 | 0.1 | 0.05 | 0.05 |
| Example B-2 | $Li_2Na_{1.5}Cs_{0.25}Ti_{5.75}Nb_{0.25}O_{14}$ | 0 | 0.5 | 0.25 | 0.25 |
| Example B-3 | $Li_2Na_{1.0}Cs_{0.5}Ti_{5.5}Nb_{0.5}O_{14}$ | 0 | 1.0 | 0.5 | 0.5 |
| Example B-4 | $Li_2Na_{0.5}Cs_{0.75}Ti_{5.25}Nb_{0.75}O_{14}$ | 0 | 1.5 | 0.75 | 0.75 |
| Example B-5 | $Li_2Na_{0.1}Cs_{0.95}Ti_{5.05}Nb_{0.95}O_{14}$ | 0 | 1.9 | 0.95 | 0.95 |
| Example B-6 | $Li_2Na_{0.5}Cs_{1.0}Ti_{5.5}Nb_{0.5}O_{14}$ | 0 | 1.5 | 1.0 | 0.5 |
| Example B-7 | $Li_2Na_{0.25}Cs_{1.5}Ti_{5.75}Nb_{0.25}O_{14}$ | 0 | 1.75 | 1.5 | 0.25 |
| Example B-8 | $Li_2Na_{0.05}Cs_{1.9}Ti_{5.95}Nb_{0.05}O_{14}$ | 0 | 1.95 | 1.9 | 0.05 |

TABLE 6

| B series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_L/I_H$ | Ratio of Vacancies in Na Sites |
|---|---|---|---|---|---|---|---|---|---|
| Example B-1 | $Li_2Na_{1.9}Cs_{0.05}Ti_{5.95}Nb_{0.05}O_{14}$ | Orthorhombic | Fmmm | (111) | 18.13 | (202) | 19.12 | 2.27 | 2.45% |
| Example B-2 | $Li_2Na_{1.5}Cs_{0.25}Ti_{5.75}Nb_{0.25}O_{14}$ | Orthorhombic | Fmmm | (111) | 18.09 | (202) | 19.08 | 2.35 | 11.9% |
| Example B-3 | $Li_2Na_{1.0}Cs_{0.5}Ti_{5.5}Nb_{0.5}O_{14}$ | Orthorhombic | Fmmm | (111) | 18.01 | (202) | 19.00 | 2.51 | 24.9% |
| Example B-4 | $Li_2Na_{0.5}Cs_{0.75}Ti_{5.25}Nb_{0.75}O_{14}$ | Orthorhombic | Fmmm | (111) | 17.98 | (202) | 18.99 | 2.55 | 37.5% |
| Example B-5 | $Li_2Na_{0.1}Cs_{0.95}Ti_{5.05}Nb_{0.95}O_{14}$ | Orthorhombic | Fmmm | (111) | 17.95 | (202) | 18.94 | 2.64 | 47.4% |
| Example B-6 | $Li_2Na_{0.5}Cs_{1.0}Ti_{5.5}Nb_{0.5}O_{14}$ | Orthorhombic | Fmmm | (111) | 17.93 | (202) | 18.92 | 2.83 | 24.8% |
| Example B-7 | $Li_2Na_{0.25}Cs_{1.5}Ti_{5.75}Nb_{0.25}O_{14}$ | Orthorhombic | Fmmm | (111) | 17.89 | (202) | 18.88 | 2.78 | 12.1% |
| Example B-8 | $Li_2Na_{0.05}Cs_{1.9}Ti_{5.95}Nb_{0.05}O_{14}$ | Orthorhombic | Fmmm | (111) | 17.86 | (202) | 18.86 | 2.89 | 2.51% |

Example C

In Examples C-1 to C-10, products of Example C-1 to C-10 were obtained in the same manner as in Examples A-1 to A-12 except that starting materials shown in the following Table 7 were used for obtaining the products each of which has a target composition shown in Table 7. The molar ratios of the starting materials were set to ratios shown in the following Table 7.

Comparative Example C

In Comparative Examples C-1 and C-2, products of Comparative Examples C-1 and C-2 were obtained in a synthesis manner described in Jpn. Pat. Appln. KOKAI Publication No. 2014-103032, for obtaining the products each of which has a target composition shown in the following Table 7. The molar ratios of the starting materials were set to ratios shown in the following Table 7.

TABLE 7

| C series | Target Composition | Li Source/ Amount | Na Source/ Amount | M1 Source/ Amount | Ti Source/ Amount | M2 Source/ Amount |
|---|---|---|---|---|---|---|
| Comparative Example C-1 | $Li_2NaKTi_6O_{14}$ | $Li_2CO_3/1.0$ | $Na_2CO_3/0.5$ | $K_2CO_3/0.5$ | $TiO_2/6.00$ | — |
| Comparative Example C-2 | $Li_2Na_{1.15}K_{0.6}Rb_{0.25}Ti_6O_{14}$ | $Li_2CO_3/1.0$ | $Na_2CO_3/0.575$ | $K_2CO_3/0.3$ $Rb_2CO_3/0.125$ | $TiO_2/6.00$ | — |
| Example C-1 | $Li_2Na_{1.9}K_{0.05}Ti_{5.95}Nb_{0.05}O_{14}$ | $Li_2CO_3/1.0$ | $Na_2CO_3/0.95$ | $K_2CO_3/0.025$ | $TiO_2/5.95$ | $Nb_2O_5/0.025$ |
| Example C-2 | $Li_2Na_{1.5}K_{0.25}Ti_{5.75}Nb_{0.25}O_{14}$ | $Li_2CO_3/1.0$ | $Na_2CO_3/0.75$ | $K_2CO_3/0.125$ | $TiO_2/5.75$ | $Nb_2O_5/0.125$ |
| Example C-3 | $Li_2Na_{1.0}K_{0.5}Ti_{5.5}Nb_{0.5}O_{14}$ | $Li_2CO_3/1.0$ | $Na_2CO_3/0.5$ | $K_2CO_3/0.25$ | $TiO_2/5.50$ | $Nb_2O_5/0.25$ |

TABLE 7-continued

| C series | Target Composition | Li Source/ Amount | Na Source/ Amount | M1 Source/ Amount | Ti Source/ Amount | M2 Source/ Amount |
|---|---|---|---|---|---|---|
| Example C-4 | $Li_2Na_{0.5}K_{0.75}Ti_{5.25}Nb_{0.75}O_{14}$ | $Li_2CO_3/1.0$ | $Na_2CO_3/0.25$ | $K_2CO_3/0.375$ | $TiO_2/5.25$ | $Nb_2O_5/0.375$ |
| Example C-5 | $Li_2Na_{0.1}K_{0.95}Ti_{5.05}Nb_{0.95}O_{14}$ | $Li_2CO_3/1.0$ | $Na_2CO_3/0.05$ | $K_2CO_3/0.475$ | $TiO_2/5.05$ | $Nb_2O_5/0.475$ |
| Example C-6 | $Li_2Na_{0.5}K_{1.0}Ti_{5.5}Nb_{0.5}O_{14}$ | $Li_2CO_3/1.0$ | $Na_2CO_3/0.25$ | $K_2CO_3/0.5$ | $TiO_2/5.50$ | $Nb_2O_5/0.25$ |
| Example C-7 | $Li_2Na_{0.25}K_{1.5}Ti_{5.75}Nb_{0.25}O_{14}$ | $Li_2CO_3/1.0$ | $Na_2CO_3/0.125$ | $K_2CO_3/0.75$ | $TiO_2/5.75$ | $Nb_2O_5/0.125$ |
| Example C-8 | $Li_2Na_{0.05}K_{1.9}Ti_{5.95}Nb_{0.05}O_{14}$ | $Li_2CO_3/1.0$ | $Na_2CO_3/0.025$ | $K_2CO_3/0.95$ | $TiO_2/5.95$ | $Nb_2O_5/0.025$ |
| Example C-9 | $Li_2Na_{1.95}K_{0.05}Ti_{5.99}Zr_{0.01}O_{14}$ | $Li_2CO_3/1.0$ | $Na_2CO_3/0.975$ | $K_2CO_3/0.025$ | $TiO_2/5.99$ | $ZrO_2/0.01$ |
| Example C-10 | $Li_2NaKTi_{5.9}Sn_{0.1}O_{14}$ | $Li_2CO_3/1.0$ | $Na_2CO_3/0.5$ | $K_2CO_3/0.5$ | $TiO_2/5.9$ | $SnO_2/0.1$ |

The products of Examples C-1 to C-7 and Comparative Examples C-1 and C-2 were subjected to the composition analysis and the powder X-ray diffraction measurement in the same manner as in the Example A-series. The results thereof are shown in the following Table 8 and Table 9.

TABLE 8

| | | $Li_{2+w}Na_{2-x}M1_yTi_{6-z}M2_zO_{14}$ | | | |
|---|---|---|---|---|---|
| C series | Composition | w | x | y | z |
| Comparative Example C-1 | $Li_2NaKTi_6O_{14}$ | 0 | 1.0 | 1.0 | 0 |
| Comparative Example C-2 | $Li_2Na_{1.15}K_{0.6}Rb_{0.25}Ti_6O_{14}$ | 0 | 0.85 | 0.85 | 0 |
| Example C-1 | $Li_2Na_{1.9}K_{0.05}Ti_{5.95}Nb_{0.05}O_{14}$ | 0 | 0.1 | 0.05 | 0.05 |
| Example C-2 | $Li_2Na_{1.5}K_{0.25}Ti_{5.75}Nb_{0.25}O_{14}$ | 0 | 0.5 | 0.25 | 0.25 |
| Example C-3 | $Li_2Na_{1.0}K_{0.5}Ti_{5.5}Nb_{0.5}O_{14}$ | 0 | 1.0 | 0.5 | 0.5 |
| Example C-4 | $Li_2Na_{0.5}K_{0.75}Ti_{5.25}Nb_{0.75}O_{14}$ | 0 | 1.5 | 0.75 | 0.75 |
| Example C-5 | $Li_2Na_{0.1}K_{0.95}Ti_{5.05}Nb_{0.95}O_{14}$ | 0 | 1.9 | 0.95 | 0.95 |
| Example C-6 | $Li_2Na_{0.5}K_{1.0}Ti_{5.5}Nb_{0.5}O_{14}$ | 0 | 1.5 | 1.0 | 0.5 |
| Example C-7 | $Li_2Na_{0.25}K_{1.5}Ti_{5.75}Nb_{0.25}O_{14}$ | 0 | 1.75 | 1.5 | 0.25 |
| Example C-8 | $Li_2Na_{0.05}K_{1.9}Ti_{5.95}Nb_{0.05}O_{14}$ | 0 | 1.95 | 1.9 | 0.05 |
| Example C-9 | $Li_2Na_{1.95}K_{0.05}Ti_{5.99}Zr_{0.01}O_{14}$ | 0 | 0.05 | 0.05 | 0.01 |
| Example C-10 | $Li_2NaKTi_{5.9}Sn_{0.1}O_{14}$ | 0 | 1.0 | 1.0 | 0.1 |

TABLE 9

| C series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_L/I_H$ | Ratio of Vacancies in Na Sites |
|---|---|---|---|---|---|---|---|---|---|
| Comparative Example C-1 | $Li_2NaKTi_6O_{14}$ | Orthorhombic | Fmmm | (111) | 18.23 | (202) | 19.24 | 2.20 | 0% |
| Comparative Example C-2 | $Li_2Na_{1.15}K_{0.6}Rb_{0.25}Ti_6O_{14}$ | Orthorhombic | Fmmm | (111) | 18.14 | (202) | 19.15 | 2.19 | 0% |
| Example C-1 | $Li_2Na_{1.9}K_{0.05}Ti_{5.95}Nb_{0.05}O_{14}$ | Orthorhombic | Fmmm | (111) | 18.17 | (202) | 19.16 | 2.33 | 2.48% |
| Example C-2 | $Li_2Na_{1.5}K_{0.25}Ti_{5.75}Nb_{0.25}O_{14}$ | Orthorhombic | Fmmm | (111) | 18.19 | (202) | 19.18 | 2.41 | 12.0% |
| Example C-3 | $Li_2Na_{1.0}K_{0.5}Ti_{5.5}Nb_{0.5}O_{14}$ | Orthorhombic | Fmmm | (111) | 18.20 | (202) | 19.20 | 2.50 | 25.2% |
| Example C-4 | $Li_2Na_{0.5}K_{0.75}Ti_{5.25}Nb_{0.75}O_{14}$ | Orthorhombic | Fmmm | (111) | 18.22 | (202) | 19.21 | 2.85 | 37.4% |
| Example C-5 | $Li_2Na_{0.1}K_{0.95}Ti_{5.05}Nb_{0.95}O_{14}$ | Orthorhombic | Fmmm | (111) | 18.24 | (202) | 19.23 | 2.81 | 47.6% |
| Example C-6 | $Li_2Na_{0.5}K_{1.0}Ti_{5.5}Nb_{0.5}O_{14}$ | Orthorhombic | Fmmm | (111) | 18.22 | (202) | 19.22 | 2.65 | 25.0% |
| Example C-7 | $Li_2Na_{0.25}K_{1.5}Ti_{5.75}Nb_{0.25}O_{14}$ | Orthorhombic | Fmmm | (111) | 18.26 | (202) | 19.25 | 3.01 | 11.8% |
| Example C-8 | $Li_2Na_{0.05}K_{1.9}Ti_{5.95}Nb_{0.05}O_{14}$ | Orthorhombic | Fmmm | (111) | 18.27 | (202) | 19.27 | 2.71 | 2.50% |
| Example C-9 | $Li_2Na_{1.95}K_{0.05}Ti_{5.99}Zr_{0.01}O_{14}$ | Orthorhombic | Fmmm | (111) | 18.18 | (202) | 19.17 | 2.29 | 0% |
| Example C-10 | $Li_2NaKTi_{5.9}Sn_{0.1}O_{14}$ | Orthorhombic | Fmmm | (111) | 18.23 | (202) | 19.23 | 2.26 | 0% |

Example D

In Examples D-1 to D-18, products of Examples D-1 to D-18 were obtained in the same manner as in Examples A-1 to A-12 except that starting materials shown in the following Table 10 were used for obtaining the products each of which has a target composition shown in Table 10. The molar ratios of the starting materials were set to ratios shown in the following Table 10.

TABLE 10

| D series | Target Composition | Li Source/Amount | Na Source/Amount | M1 Source/Amount | Ti Source/Amount | M2 Source/Amount |
|---|---|---|---|---|---|---|
| Example D-1 | $Li_2Na_{1.9}Ti_{5.8}(Nb_{0.1}Zr_{0.1})O_{14}$ | $Li_2CO_3$/1.0 | $Na_2CO_3$/0.95 | — | $TiO_2$/5.80 | $ZrO_2$/0.1 $Nb_2O_5$/0.05 |
| Example D-2 | $Li_2Na_{1.9}Ti_{5.8}(Nb_{0.1}Sn_{0.1})O_{14}$ | $Li_2CO_3$/1.0 | $Na_2CO_3$/0.95 | — | $TiO_2$/5.80 | $SnO_2$/0.1 $Nb_2O_5$/0.05 |
| Example D-3 | $Li_2Na_{1.5}Ti_{5.4}(Nb_{0.5}Sn_{0.1})O_{14}$ | $Li_2CO_3$/1.0 | $Na_2CO_3$/0.75 | — | $TiO_2$/5.40 | $SnO_2$/0.1 $Nb_2O_5$/0.25 |
| Example D-4 | $Li_2Na_{1.9}Ti_{5.9}V_{0.1}O_{14}$ | $Li_2CO_3$/1.0 | $Na_2CO_3$/0.95 | — | $TiO_2$/5.90 | $V_2O_5$/0.05 |
| Example D-5 | $Li_2Na_{1.8}Ti_{5.8}(Nb_{0.1}V_{0.1})O_{14}$ | $Li_2CO_3$/1.0 | $Na_2CO_3$/0.90 | — | $TiO_2$/5.80 | $V_2O_5$/0.05 $Nb_2O_5$/0.05 |
| Example D-6 | $Li_2Na_{1.9}Ti_{5.9}Ta_{0.1}O_{14}$ | $Li_2CO_3$/1.0 | $Na_2CO_3$/0.95 | — | $TiO_2$/5.90 | $Ta_2O_5$/0.05 |
| Example D-7 | $Li_2Na_{1.99}Ti_{5.99}Ta_{0.01}O_{14}$ | $Li_2CO_3$/1.0 | $Na_2CO_3$/0.995 | — | $TiO_2$/5.99 | $Ta_2O_5$/0.005 |
| Example D-8 | $Li_2Na_{1.9}Ti_{5.9}(Nb_{0.09}Ta_{0.01})O_{14}$ | $Li_2CO_3$/1.0 | $Na_2CO_3$/0.95 | — | $TiO_2$/5.90 | $Ta_2O_5$/0.005 $Nb_2O_5$/0.045 |
| Example D-9 | $Li_2Na_{1.5}Ti_{5.5}(Nb_{0.49}Ta_{0.01})O_{14}$ | $Li_2CO_3$/1.0 | $Na_2CO_3$/0.75 | — | $TiO_2$/5.50 | $Ta_2O_5$/0.005 $Nb_2O_5$/0.245 |
| Example D-10 | $Li_2Na_{1.5}Ti_{5.5}(Nb_{0.4}Ta_{0.1})O_{14}$ | $Li_2CO_3$/1.0 | $Na_2CO_3$/0.75 | — | $TiO_2$/5.50 | $Ta_2O_5$/0.05 $Nb_2O_5$/0.2 |
| Example D-11 | $Li_2Na_{1.25}Ti_{5.75}(Nb_{0.74}Ta_{0.01})O_{14}$ | $Li_2CO_3$/1.0 | $Na_2CO_3$/0.625 | — | $TiO_2$/5.75 | $Ta_2O_5$/0.005 $Nb_2O_5$/0.37 |
| Example D-12 | $Li_2Na_{1.8}Ti_{5.9}Mo_{0.1}O_{14}$ | $Li_2CO_3$/1.0 | $Na_2CO_3$/0.90 | — | $TiO_2$/5.90 | $MoO_3$/0.1 |
| Example D-13 | $Li_2Na_{1.4}Ti_{5.6}(Nb_{0.2}Mo_{0.2})O_{14}$ | $Li_2CO_3$/1.0 | $Na_2CO_3$/0.70 | — | $TiO_2$/5.60 | $Nb_2O_5$/0.1 $MoO_3$/0.2 |
| Example D-14 | $Li_{2.2}Na_{1.9}Ti_{5.9}Fe_{0.1}O_{14}$ | $Li_2CO_3$/1.10 | $Na_2CO_3$/0.95 | — | $TiO_2$/5.90 | $Fe_2O_3$/0.05 |
| Example D-15 | $Li_{2.2}Na_{1.5}Ti_{5.5}(Nb_{0.4}Fe_{0.1})O_{14}$ | $Li_2CO_3$/1.10 | $Na_2CO_3$/0.75 | — | $TiO_2$/5.50 | $Nb_2O_5$/0.20 $Fe_2O_3$/0.05 |
| Example D-16 | $Li_{2.2}Na_{1.9}Ti_{5.9}Co_{0.1}O_{14}$ | $Li_2CO_3$/1.10 | $Na_2CO_3$/0.95 | — | $TiO_2$/5.90 | $Co_2O_3$/0.05 |
| Example D-17 | $Li_{2.2}Na_{1.9}Ti_{5.9}Mn_{0.1}O_{14}$ | $Li_2CO_3$/1.10 | $Na_2CO_3$/0.95 | — | $TiO_2$/5.90 | $Mn_2O_3$/0.05 |
| Example D-18 | $Li_{2.2}Na_{1.9}Ti_{5.9}Al_{0.1}O_{14}$ | $Li_2CO_3$/1.10 | $Na_2CO_3$/0.95 | — | $TiO_2$/5.90 | $Al_2O_3$/0.05 |

The products of Examples D-1 to D-18 were subjected to composition analysis and powder X-ray diffraction measurement in the same manner as in the Example A-series. The results thereof are shown in the following Table 11 and Table 12.

TABLE 11

| | | $Li_{2+w}Na_{2-x}M1_yTi_{6-z}M2_zO_{14}$ | | | |
|---|---|---|---|---|---|
| D series | Composition | w | x | y | z |
| Example D-1 | $Li_2Na_{1.9}Ti_{5.8}(Nb_{0.1}Zr_{0.1})O_{14}$ | 0 | 0.1 | 0 | 0.2 |
| Example D-2 | $Li_2Na_{1.9}Ti_{5.8}(Nb_{0.1}Sn_{0.1})O_{14}$ | 0 | 0.1 | 0 | 0.2 |
| Example D-3 | $Li_2Na_{1.5}Ti_{5.4}(Nb_{0.5}Sn_{0.1})O_{14}$ | 0 | 0.5 | 0 | 0.6 |
| Example D-4 | $Li_2Na_{1.9}Ti_{5.9}V_{0.1}O_{14}$ | 0 | 0.1 | 0 | 0.1 |
| Example D-5 | $Li_2Na_{1.8}Ti_{5.8}(Nb_{0.1}V_{0.1})O_{14}$ | 0 | 0.2 | 0 | 0.2 |
| Example D-6 | $Li_2Na_{1.9}Ti_{5.9}Ta_{0.1}O_{14}$ | 0 | 0.1 | 0 | 0.1 |
| Example D-7 | $Li_2Na_{1.99}Ti_{5.99}Ta_{0.01}O_{14}$ | 0 | 0.01 | 0 | 0.01 |
| Example D-8 | $Li_2Na_{1.9}Ti_{5.9}(Nb_{0.09}Ta_{0.01})O_{14}$ | 0 | 0.1 | 0 | 0.1 |
| Example D-9 | $Li_2Na_{1.5}Ti_{5.5}(Nb_{0.49}Ta_{0.01})O_{14}$ | 0 | 0.5 | 0 | 0.5 |
| Example D-10 | $Li_2Na_{1.5}Ti_{5.5}(Nb_{0.4}Ta_{0.1})O_{14}$ | 0 | 0.5 | 0 | 0.5 |
| Example D-11 | $Li_2Na_{1.25}Ti_{5.75}(Nb_{0.74}Ta_{0.01})O_{14}$ | 0 | 0.75 | 0 | 0.75 |
| Example D-12 | $Li_2Na_{1.8}Ti_{5.9}Mo_{0.1}O_{14}$ | 0 | 0.2 | 0 | 0.1 |
| Example D-13 | $Li_2Na_{1.4}Ti_{5.6}(Nb_{0.2}Mo_{0.2})O_{14}$ | 0 | 0.6 | 0 | 0.4 |
| Example D-14 | $Li_{2.2}Na_{1.9}Ti_{5.9}Fe_{0.1}O_{14}$ | 0.2 | 0.1 | 0 | 0.1 |
| Example D-15 | $Li_{2.2}Na_{1.5}Ti_{5.5}(Nb_{0.4}Fe_{0.1})O_{14}$ | 0.2 | 0.5 | 0 | 0.5 |
| Example D-16 | $Li_{2.2}Na_{1.9}Ti_{5.9}Co_{0.1}O_{14}$ | 0.2 | 0.1 | 0 | 0.1 |
| Example D-17 | $Li_{2.2}Na_{1.9}Ti_{5.9}Mn_{0.1}O_{14}$ | 0.2 | 0.1 | 0 | 0.1 |
| Example D-18 | $Li_{2.2}Na_{1.9}Ti_{5.9}Al_{0.1}O_{14}$ | 0.2 | 0.1 | 0 | 0.1 |

TABLE 12

| D series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_L/I_H$ | Ratio of Vacancies in Na Sites |
|---|---|---|---|---|---|---|---|---|---|
| Example D-1 | $Li_2Na_{1.9}Ti_{5.8}(Nb_{0.1}Zr_{0.1})O_{14}$ | Orthorhombic | Fmmm | (111) | 18.16 | (202) | 19.16 | 2.41 | 4.9% |
| Example D-2 | $Li_2Na_{1.9}Ti_{5.8}(Nb_{0.1}Sn_{0.1})O_{14}$ | Orthorhombic | Fmmm | (111) | 18.16 | (202) | 19.16 | 2.45 | 5.0% |

TABLE 12-continued

| D series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_L/I_H$ | Ratio of Vacancies in Na Sites |
|---|---|---|---|---|---|---|---|---|---|
| Example D-3 | $Li_2Na_{1.5}Ti_{5.4}(Nb_{0.5}Sn_{0.1})O_{14}$ | Orthorhombic | Fmmm | (111) | 18.15 | (202) | 19.14 | 2.56 | 25.1% |
| Example D-4 | $Li_2Na_{1.9}Ti_{5.9}V_{0.1}O_{14}$ | Orthorhombic | Fmmm | (111) | 18.16 | (202) | 19.16 | 2.43 | 5.1% |
| Example D-5 | $Li_2Na_{1.8}Ti_{5.8}(Nb_{0.1}V_{0.1})O_{14}$ | Orthorhombic | Fmmm | (111) | 18.16 | (202) | 19.16 | 2.42 | 9.9% |
| Example D-6 | $Li_2Na_{1.9}Ti_{5.9}Ta_{0.1}O_{14}$ | Orthorhombic | Fmmm | (111) | 18.17 | (202) | 19.17 | 2.46 | 5.0% |
| Example D-7 | $Li_2Na_{1.99}Ti_{5.99}Ta_{0.01}O_{14}$ | Orthorhombic | Fmmm | (111) | 18.16 | (202) | 19.15 | 2.28 | 0.50% |
| Example D-8 | $Li_2Na_{1.9}Ti_{5.9}(Nb_{0.09}Ta_{0.01})O_{14}$ | Orthorhombic | Fmmm | (111) | 18.16 | (202) | 19.15 | 2.42 | 4.9% |
| Example D-9 | $Li_2Na_{1.5}Ti_{5.5}(Nb_{0.49}Ta_{0.01})O_{14}$ | Orthorhombic | Fmmm | (111) | 18.15 | (202) | 19.14 | 2.53 | 25.0% |
| Example D-10 | $Li_2Na_{1.5}Ti_{5.5}(Nb_{0.4}Ta_{0.1})O_{14}$ | Orthorhombic | Fmmm | (111) | 18.15 | (202) | 19.14 | 2.55 | 24.9% |
| Example D-11 | $Li_2Na_{1.25}Ti_{5.75}(Nb_{0.74}Ta_{0.01})O_{14}$ | Orthorhombic | Fmmm | (111) | 18.10 | (202) | 19.11 | 2.77 | 37.6% |
| Example D-12 | $Li_2Na_{1.8}Ti_{5.9}Mo_{0.1}O_{14}$ | Orthorhombic | Fmmm | (111) | 18.17 | (202) | 19.17 | 2.50 | 10.1% |
| Example D-13 | $Li_2Na_{1.4}Ti_{5.6}(Nb_{0.2}Mo_{0.2})O_{14}$ | Orthorhombic | Fmmm | (111) | 18.18 | (202) | 19.18 | 2.52 | 29.8% |
| Example D-14 | $Li_{2.2}Na_{1.9}Ti_{5.9}Fe_{0.1}O_{14}$ | Orthorhombic | Fmmm | (111) | 18.17 | (202) | 19.17 | 2.55 | 4.9% |
| Example D-15 | $Li_{2.2}Na_{1.5}Ti_{5.5}(Nb_{0.4}Fe_{0.1})O_{14}$ | Orthorhombic | Fmmm | (111) | 18.15 | (202) | 19.14 | 2.58 | 24.8% |
| Example D-16 | $Li_{2.2}Na_{1.9}Ti_{5.9}Co_{0.1}O_{14}$ | Orthorhombic | Fmmm | (111) | 18.16 | (202) | 19.17 | 2.57 | 4.8% |
| Example D-17 | $Li_{2.2}Na_{1.9}Ti_{5.9}Mn_{0.1}O_{14}$ | Orthorhombic | Fmmm | (111) | 18.17 | (202) | 19.17 | 2.56 | 4.9% |
| Example D-18 | $Li_{2.2}Na_{1.9}Ti_{5.9}Al_{0.1}O_{14}$ | Orthorhombic | Fmmm | (111) | 18.16 | (202) | 19.16 | 2.53 | 4.9% |

(Electrochemical Measurement)

Each of the products obtained in Examples and Comparative Examples described above was subjected to an electrochemical measurement according to the following procedures. The following explanation is made using the product of Example A-1 as an example, and the electrochemical measurement of the products of other Examples and Comparative Examples were performed in the same manner as in that of the product of Example A-1.

First, the product particles of Example A-1 were ground to obtain a ground product having an average particle size of 5 μm or less. Next, acetylene black, as a conductive agent, was mixed with the active material in a proportion of 10 parts by mass relative to the active material to obtain a mixture. Next, the mixture was dispersed in NMP (N-methyl-2-pyrrolidone) to obtain a dispersion. Polyvinylidene fluoride (PVdF), as a binder, was mixed with the dispersion in a proportion of 10 parts by mass relative to the product of Example to obtain an electrode slurry. A current collector, formed of an aluminum foil, was coated with the slurry using a blade. This was dried at 130° C. for 12 hours under vacuum, and then rolled so that the density of an electrode layer (excluding a current collector) was 2.2 g/cm³ to obtain an electrode.

Using this electrode, a metal lithium foil as a counter electrode and nonaqueous electrolyte, an electrochemical measurement cell of Example was produced. As a nonaqueous electrolyte, a mixture in which lithium hexafluorophosphate ($LiPF_6$) was dissolved in a concentration of 1 M in a mixed solvent of ethylene carbonate and diethyl carbonate (volume ratio of 1:1) was used.

The electrochemical measurement cell of Example A-1 was subjected to a charge-and-discharge test at room temperature. The charge-and-discharge test was performed within a potential range of 1.0 V to 3.0 V with reference to the metal lithium electrode at a charge-and-discharge current value of 0.2 C (hourly discharge rate). In this test, a first Li insertion amount was defined as an initial charge capacity, and a first Li extraction amount was defined as an initial discharge capacity. At this time, a value obtained by dividing an initial discharge capacity by the initial charge capacity, and multiplying the obtained value by 100 (initial discharge capacity/initial charge capacity×100) was defined as an initial charge-and-discharge efficiency.

Next, in order to confirm whether or not the product of Example A-1 can be stably charged and discharged, the electrochemical measurement cell of Example A-1 was repeatedly subjected to 50 cycles of charge and discharge. One cycle consisted of one charge and one discharge. The charge and discharge were performed at room temperature within a potential range of 1.0 V to 3.0 V with reference to the metal lithium electrode at a current value of 1 C (hourly discharge rate).

In order to confirm the discharge capacity retention ratio after 50 cycles, the electrochemical measurement cell of Example was charged and discharged again at 0.2 C (hourly discharge rate), and the capacity retention ratio was calculated with the initial discharge capacity defined as 100%.

In addition, the discharge capacity at 0.2 C and the discharge capacity at 10.0 C of the electrochemical measurement cell of Example A-1 were measured. The discharge rate was calculated as the barometer of the rate performance by dividing the discharge capacity at 10 C obtained by the measurement by the capacity at 0.2 C similarly obtained by the measurement.

[Charge-And-Discharge Curve]

Figure 11:
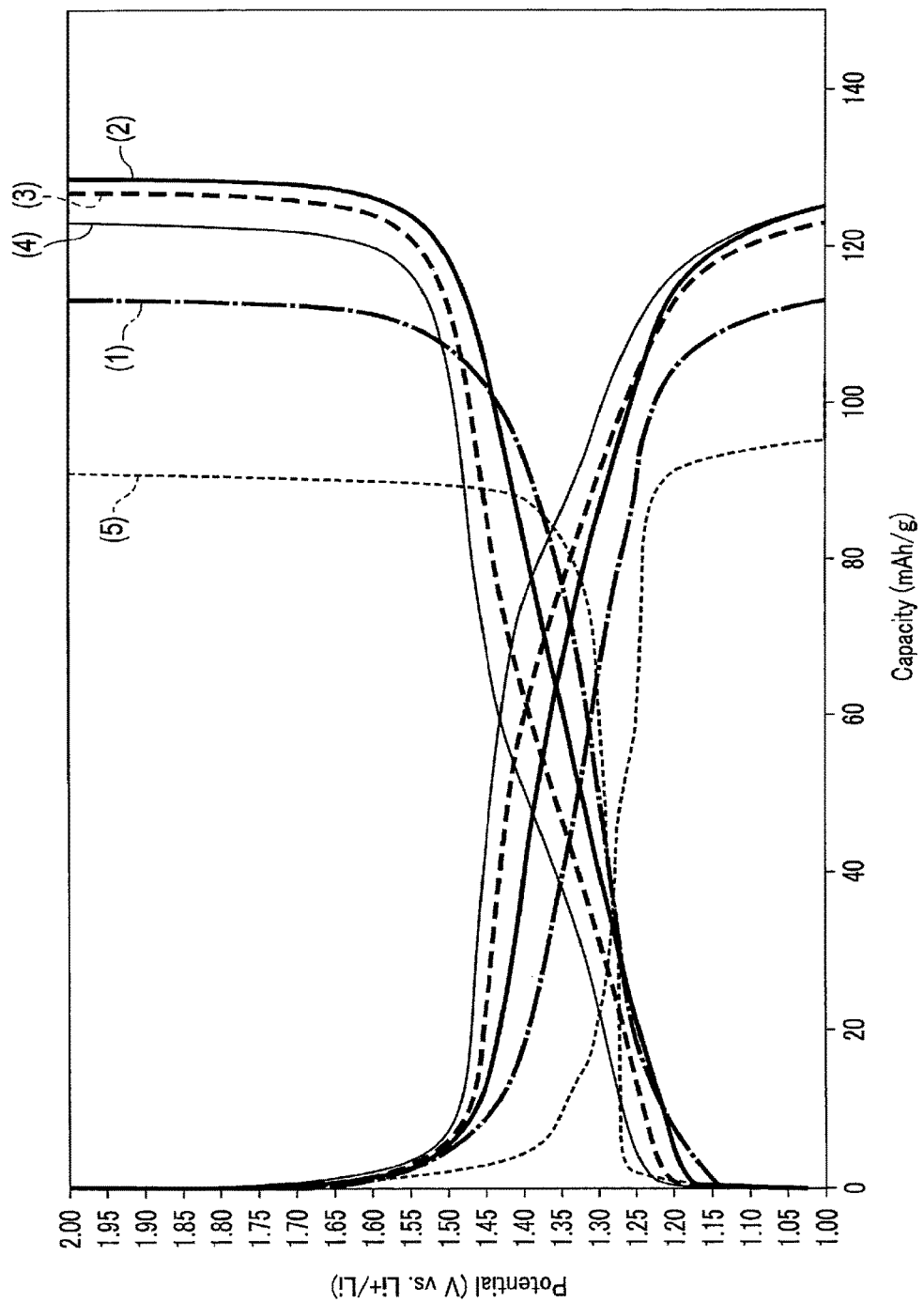
FIG. 11 shows initial charge-and-discharge curves obtained by an electrochemical measurement of electrochemical measurement cells of Examples A-4, A-5, A-6 and A-9 and an electrochemical measurement cell of Comparative Example A-1b.

FIG. 11 shows initial charge and discharge curves obtained by the electrochemical measurement of the electrochemical measurement cells of Examples A-4, A-5, A-6 and A-9 and a electrochemical measurement cell of Comparative Example A-1b. In FIG. 11, the curves of long dashed and short dashes line having symbol (1) show a potential change of the electrode containing the orthorhombic crystal composite oxide of Example A-4. the solid line curves having symbol (2) show a potential change containing the orthorhombic crystal composite oxide of Example A-5. The broken line curves having symbol (3) show a potential change of the electrode containing the orthorhombic crystal composite oxide of Example A-6. The solid line curves having symbol (4) show a potential change of the electrode containing the orthorhombic crystal composite oxide of Example A-9. The dotted line curves having symbol (5) show a potential change of the electrode containing the orthorhombic crystal composite oxide of Comparative Example A-1b.

As apparent from FIG. 11, in a potential of the electrochemical measurement cell within a range of 1.0 V (vs. Li/Li$^+$) to 2.0 V (vs. Li/Li$^+$) as the effective potential range of the negative electrode, the charge-and-discharge curve of Comparative Example A-1b had, within a wide range of the capacity, potential flat parts in which the variation in the potential accompanied with a change in the capacity is small. The product of Comparative Example A-1b exhibiting such charge-and-discharge curve is not practically preferable, because it is difficult to comprehend the correlation between the charging capacity and the battery voltage, as described above. Furthermore, the electrode of Comparative Example A-1b has a small capacity, i.e., about 90 mAh/g.

On the contrary, as shown in FIG. 11, each of the charge-and-discharge curves of Examples A-4, A-5, A-6, and A-9 has, within a range of 1.0 V (vs. Li/Li$^+$) to 2.0 V (vs. Li/Li$^+$), a continuous potential-gradient exhibiting a large variation in the potential with the change of charged or discharged capacity. As for a rechargeable battery, a state-of-charge (residual capacity) of the battery can be estimated by examining a battery voltage. The continuous potential gradient, which can be exhibited by the products of Examples A-4, A-5, A-6, and A-9, is useful to control the charge-and-discharge of the battery. In addition, as apparent from FIG. 11, the electrode capacities in Examples A-4, A-5, A-6, and A-9 are higher than that in Comparative Example A-1b. The products of Examples A-4, A-5, A-6, and A-9 accordingly can provide a battery exhibiting a high energy density.

On the other hand, in the charge-and-discharge curves in Examples A-4, A-5, A-6, and A-9, an electrode potential to metal Li at SOC=50% (a state in which a half of the charge capacity is charged) varies within a range of 1.43 V to 1.30 V. It is found from this result and the compositions shown in Table 2 that a battery voltage can be arbitrarily controlled, depending on the application of the battery, by changing the value of the subscript x in the general formula of $Li_{2+w}Na_{2-x}M1_yTi_{6-z}M2_zO_{14+\delta}$ for the composite oxide. For example, when the battery is used for a battery module for automobiles, whose operating voltage range is decided, a desired battery voltage can be obtained by changing a negative electrode potential according to the positive electrode to be combined, as shown in Examples.

The initial charge-and-discharge curves of the electrochemical measurement cells of Examples A-1 to A-3, A-7, A-8, A-10 to A-16, B-1 to B-8, C-1 to C-10, and D-1 to D-18, which are not shown, as in Examples A-4 to 6, and A-9, had, in the battery voltage of each of the electrochemical measurement cell within a range of 1.0 V to 2.0 V, a variation in the potential accompanied with a change in the capacity during the charge-and-discharge larger than that in Comparative Example A-1b, and exhibited a continuous potential gradient corresponding to the charged or discharged capacity. In addition, the electrode capacities in these Examples were higher than that in Comparative Example A-1b.

Table 13 to Table 16 below show an initial discharge capacity (mAh/g), an initial charge-and-discharge efficiency (%), a 10 C/0.2 C discharge capacity ratio (%), a capacity retention ratio after 50 cycles, a potential (V vs. Li/Li$^+$) in a half charge state (50% state-of-charge=SOC 50% when a full charge is defined as 100%), and a difference in potential ΔV (mV) between SOC 20-80%, of each the electrochemical measurement cells of Examples A series to D series, Comparative Example A series, and Comparative Examples C series.

Here, the potential in SOC 50% refers to an electrode potential based on metal lithium in the half state-of-charge and in an open circuit state (the potential is defined as a potential of the cell in the state in which the cell has been kept in the open circuit state for one hour after charging the cell at 0.2 C from the completely discharged state (Li extracted state) to 50% of the capacity (Li insertion)).

The difference in potential ΔV between SOC 20-80% refers to a difference in potential between an electrode potential (vs. metal lithium) at 20% of 0.2 C discharge capacity and an electrode potential (vs. metal lithium) at 80%.

Figure 12:
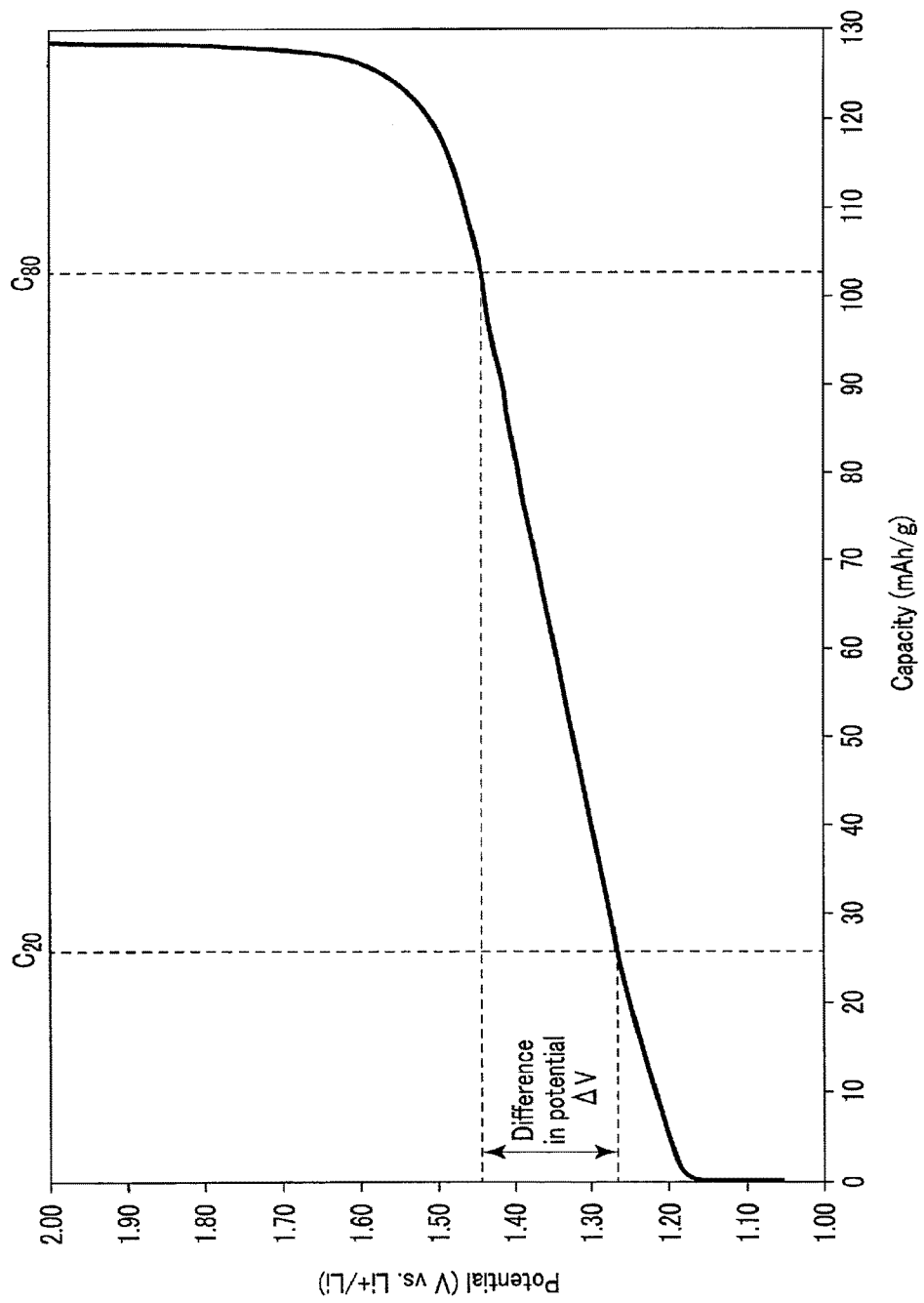
FIG. 12 shows a discharge (Li extraction) curve of $Li_2Na_{1.5}Ti_{5.5}Nb_{0.5}O_{14}$.

The calculation method of the difference in potential is as follows: FIG. 12 shows a discharge (Li extraction) curve of $Li_2Na_{1.5}Ti_{5.5}Nb_{0.5}O_{14}$ as one example. First, Li is inserted to an electrode containing a composite oxide to be measured at a charge rate of 0.2 C, then the electrode is subjected to a constant-voltage charge at 1.0 V (vs. metal lithium potential) for 5 hours, and a one-hour suspension is taken (CC-CV charge). Next, the electrode is discharged (Li extraction) at 0.2 C up to 2.0 V (vs. metal lithium). Thus, the discharge curve as shown in FIG. 12 can be obtained. Discharge of the total capacity at this time is defined as 100%, and a difference between a potential (vs. metal lithium) at capacity $C_{20}$, corresponding to 20%, and a potential (vs. metal lithium) at capacity $C_{80}$, corresponding to 80%, is obtained from the discharge curve obtained as above. In FIG. 12, the potential is 1.445 V (vs. Li/Li$^+$) at SOC 80% and the potential is 1.264 V (vs. Li/Li$^+$) at SOC 20%. The difference thereof, i.e., the difference in potential ΔV is, accordingly, 181 mV. The higher the numerical value is, the larger the electrode potential with the change of the capacity during charge and discharge is. In an electrode this value of which is high, the correlation between the charged or discharged capacity and the battery voltage can be easily comprehended, and it can be presumed that the charge-and-discharge can be easily managed in such an electrode.

TABLE 13

| A series | Composition | Initial Discharge Capacity (mAh/g) | Initial Charge-and-Discharge Efficiency (%) | 10 C/0.2 C Discharge Capacity Ratio (%) | Capacity Retention Ratio after 50 Cycles (%) | Potential in SOC50% (V vs. Li$^+$/Li) | Difference in potential between SOC20% and SOC80% ΔV (mV) |
|---|---|---|---|---|---|---|---|
| Comparative Example A-1a | $Li_2Na_2Ti_6O_{14}$ | 90.8 | 92.0 | 89.8 | 90.5 | 1.28 | 36 |
| Comparative Example A-1b | $Li_2Na_2Ti_6O_{14}$ | 90.7 | 92.2 | 90.1 | 90.7 | 1.28 | 35 |
| Comparative Example A-2 | $Li_{2.1}Na_{1.9}Ti_6O_{14}$ | 91.5 | 90.9 | 89.3 | 90.1 | 1.27 | 36 |
| Comparative Example A-3 | $Li_2Na_2Ti_{5.9}Nb_{0.1}O_{14}$ | 91.6 | 92.3 | 90.9 | 91.3 | 1.28 | 38 |
| Comparative Example A-4 | $Li_2MgTi_6O_{14}$ | 96.1 | 91.8 | 86.5 | 87.3 | 1.42 | 18 |
| Comparative Example A-5 | $Li_2BaTi_{5.9}Al_{0.1}O_{14}$ | 107.3 | 90.9 | 84.3 | 90.1 | 1.43 | 16 |
| Example A-1 | $Li_2Na_{1.99}Ti_{5.99}Nb_{0.01}O_{14}$ | 92.0 | 92.1 | 89.9 | 91.5 | 1.28 | 40 |
| Example A-2 | $Li_2Na_{1.95}Ti_{5.95}Nb_{0.05}O_{14}$ | 92.8 | 92.2 | 91.5 | 93.0 | 1.28 | 76 |
| Example A-3 | $Li_2Na_{1.9}Ti_{5.9}Nb_{0.1}O_{14}$ | 101.7 | 92.3 | 91.4 | 92.8 | 1.29 | 118 |

TABLE 13-continued

| A series | Composition | Initial Discharge Capacity (mAh/g) | Initial Charge-and-Discharge Efficiency (%) | 10 C/0.2 C Discharge Capacity Ratio (%) | Capacity Retention Ratio after 50 Cycles (%) | Potential in SOC50% (V vs. Li$^+$/Li) | Difference in potential between SOC20% and SOC80% ΔV (mV) |
|---|---|---|---|---|---|---|---|
| Example A-4 | $Li_2Na_{1.75}Ti_{5.75}Nb_{0.25}O_{14}$ | 115.9 | 92.5 | 92.7 | 93.8 | 1.30 | 129 |
| Example A-5 | $Li_2Na_{1.5}Ti_{5.5}Nb_{0.5}O_{14}$ | 131.5 | 93.5 | 92.9 | 93.6 | 1.34 | 181 |
| Example A-6 | $Li_2Na_{1.25}Ti_{5.25}Nb_{0.75}O_{14}$ | 129.8 | 93.1 | 92.8 | 93.3 | 1.39 | 193 |
| Example A-7 | $Li_2Na_{1.1}Ti_{5.1}Nb_{0.9}O_{14}$ | 128.5 | 92.8 | 91.3 | 92.8 | 1.41 | 183 |
| Example A-8 | $Li_2Na_{1.05}Ti_{5.05}Nb_{0.95}O_{14}$ | 127.9 | 92.9 | 92.5 | 93.5 | 1.41 | 179 |
| Example A-9 | $Li_2Na_{1.01}Ti_{5.01}Nb_{0.99}O_{14}$ | 122.3 | 92.7 | 92.1 | 93.6 | 1.43 | 180 |
| Example A-10 | $Li_{2.1}Na_{1.99}Ti_{5.99}Nb_{0.01}O_{14}$ | 91.8 | 91.7 | 93.6 | 93.4 | 1.28 | 43 |
| Example A-11 | $Li_{2.5}Na_{1.5}Ti_{5.5}Nb_{0.5}O_{14}$ | 128.9 | 93.9 | 93.2 | 92.9 | 1.33 | 181 |
| Example A-12 | $Li_4Na_{1.5}Ti_{5.5}Nb_{0.5}O_{14}$ | 109.0 | 93.4 | 92.6 | 93.9 | 1.32 | 178 |
| Example A-13 | $Li_6Na_{1.5}Ti_{5.5}Nb_{0.5}O_{14}$ | 92.4 | 92.6 | 92.8 | 92.2 | 1.31 | 165 |
| Example A-14 | $Li_2Na_{1.5}Ti_{5.5}Nb_{0.5}O_{13.5}$ | 132.4 | 93.9 | 95.7 | 94.8 | 1.35 | 182 |
| Example A-15 | $Li_2Na_{1.5}Ti_{5.5}Nb_{0.5}O_{14}$ | 133.3 | 94.1 | 96.0 | 94.9 | 1.34 | 181 |
| Example A-16 | $Li_2Na_{1.5}Ti_{5.5}Nb_{0.5}O_{14}$ | 131.7 | 94.0 | 95.5 | 95.1 | 1.34 | 183 |

TABLE 14

| B series | Composition | Initial Discharge Capacity (mAh/g) | Initial Charge-and-Discharge Efficiency (%) | 10 C/0.2 C Discharge Capacity Ratio (%) | Capacity Retention Ratio after 50 Cycles (%) | Potential in SOC50% (V vs. Li$^+$/Li) | Difference in potential between SOC20% and SOC80% ΔV (mV) |
|---|---|---|---|---|---|---|---|
| Example B-1 | $Li_2Na_{1.9}Cs_{0.05}Ti_{5.95}Nb_{0.05}O_{14}$ | 93.1 | 92.6 | 92.0 | 93.4 | 1.28 | 81 |
| Example B-2 | $Li_2Na_{1.5}Cs_{0.25}Ti_{5.75}Nb_{0.25}O_{14}$ | 116.7 | 92.3 | 93.1 | 93.6 | 1.31 | 131 |
| Example B-3 | $Li_2Na_{1.0}Cs_{0.5}Ti_{5.5}Nb_{0.5}O_{14}$ | 121.9 | 92.5 | 92.8 | 93.1 | 1.42 | 178 |
| Example B-4 | $Li_2Na_{0.5}Cs_{0.75}Ti_{5.25}Nb_{0.75}O_{14}$ | 128.4 | 93.3 | 93.2 | 93.8 | 1.42 | 186 |
| Example B-5 | $Li_2Na_{0.1}Cs_{0.95}Ti_{5.05}Nb_{0.95}O_{14}$ | 126.6 | 92.7 | 92.9 | 93.1 | 1.42 | 165 |
| Example B-6 | $Li_2Na_{0.5}Cs_{1.0}Ti_{5.5}Nb_{0.5}O_{14}$ | 120.3 | 92.2 | 92.3 | 93.8 | 1.42 | 155 |
| Example B-7 | $Li_2Na_{0.25}Cs_{1.5}Ti_{5.75}Nb_{0.25}O_{14}$ | 115.9 | 92.1 | 92.6 | 94.2 | 1.30 | 128 |
| Example B-8 | $Li_2Na_{0.05}Cs_{1.9}Ti_{5.95}Nb_{0.05}O_{14}$ | 92.5 | 91.8 | 91.9 | 93.7 | 1.25 | 92 |

TABLE 15

| C series | Composition | Initial Discharge Capacity (mAh/g) | Initial Charge-and-Discharge Efficiency (%) | 10 C/0.2 C Discharge Capacity Ratio (%) | Capacity Retention Ratio after 50 Cycles (%) | Potential in SOC50% (V vs. Li$^+$/Li) | Difference in potential between SOC20% and SOC80% ΔV (mv) |
|---|---|---|---|---|---|---|---|
| Comparative Example C-1 | $Li_2NaKTi_6O_{14}$ | 86.8 | 92.3 | 88.8 | 89.5 | 1.26 | 38 |
| Comparative Example C-2 | $Li_2Na_{1.15}K_{0.6}Rb_{0.25}Ti_6O_{14}$ | 83.5 | 92.0 | 90.4 | 90.1 | 1.26 | 39 |
| Example C-1 | $Li_2Na_{1.9}K_{0.05}Ti_{5.95}Nb_{0.05}O_{14}$ | 93.1 | 92.6 | 91.3 | 92.7 | 1.28 | 78 |
| Example C-2 | $Li_2Na_{1.5}K_{0.25}Ti_{5.75}Nb_{0.25}O_{14}$ | 116.4 | 92.3 | 92.4 | 93.6 | 1.30 | 129 |
| Example C-3 | $Li_2Na_{1.0}K_{0.5}Ti_{5.5}Nb_{0.5}O_{14}$ | 130.9 | 93.4 | 92.6 | 93.9 | 1.34 | 181 |
| Example C-4 | $Li_2Na_{0.5}K_{0.75}Ti_{5.25}Nb_{0.75}O_{14}$ | 129.5 | 93.0 | 92.8 | 93.6 | 1.39 | 195 |
| Example C-5 | $Li_2Na_{0.1}K_{0.95}Ti_{5.05}Nb_{0.95}O_{14}$ | 127.7 | 92.9 | 92.3 | 93.1 | 1.41 | 176 |
| Example C-6 | $Li_2Na_{0.5}K_{1.0}Ti_{5.5}Nb_{0.5}O_{14}$ | 129.2 | 93.1 | 92.5 | 93.6 | 1.35 | 178 |
| Example C-7 | $Li_2Na_{0.25}K_{1.5}Ti_{5.75}Nb_{0.25}O_{14}$ | 115.3 | 92.5 | 92.8 | 93.3 | 1.32 | 125 |
| Example C-8 | $Li_2Na_{0.05}K_{1.9}Ti_{5.95}Nb_{0.05}O_{14}$ | 92.5 | 92.2 | 91.9 | 93.4 | 1.30 | 73 |
| Example C-9 | $Li_2Na_{1.95}K_{0.05}Ti_{5.99}Zr_{0.01}O_{14}$ | 92.1 | 92.3 | 90.5 | 92.8 | 1.26 | 42 |
| Example C-10 | $Li_2NaKTi_{5.9}Sn_{0.1}O_{14}$ | 92.0 | 92.7 | 91.7 | 92.2 | 1.26 | 45 |

TABLE 16

| D series | Composition | Initial Discharge Capacity (mAh/g) | Initial Charge-and-Discharge Efficiency (%) | 10 C/0.2 C Discharge Capacity Ratio (%) | Capacity Retention Ratio after 50 Cycles (%) | Potential in SOC50% (V vs. Li$^+$/Li) | Difference in potential between SOC20% and SOC80% ΔV (mV) |
|---|---|---|---|---|---|---|---|
| Example D-1 | $Li_2Na_{1.9}Ti_{5.8}(Nb_{0.1}Zr_{0.1})O_{14}$ | 100.5 | 92.4 | 91.8 | 93.2 | 1.29 | 119 |
| Example D-2 | $Li_2Na_{1.9}Ti_{5.8}(Nb_{0.1}Sn_{0.1})O_{14}$ | 99.7 | 92.1 | 92.0 | 92.9 | 1.29 | 116 |
| Example D-3 | $Li_2Na_{1.5}Ti_{5.4}(Nb_{0.5}Sn_{0.1})O_{14}$ | 131.4 | 93.8 | 93.3 | 93.9 | 1.34 | 180 |
| Example D-4 | $Li_2Na_{1.9}Ti_{5.9}V_{0.1}O_{14}$ | 101.8 | 92.6 | 92.5 | 93.5 | 1.29 | 117 |
| Example D-5 | $Li_2Na_{1.8}Ti_{5.8}(Nb_{0.1}V_{0.1})O_{14}$ | 102.5 | 93.5 | 93.4 | 93.4 | 1.29 | 118 |

TABLE 16-continued

| D series | Composition | Initial Discharge Capacity (mAh/g) | Initial Charge-and-Discharge Efficiency (%) | 10 C/0.2 C Discharge Capacity Ratio (%) | Capacity Retention Ratio after 50 Cycles (%) | Potential in SOC50% (V vs. Li$^+$/Li) | Difference in potential between SOC20% and SOC80% ΔV (mV) |
|---|---|---|---|---|---|---|---|
| Example D-6 | $Li_2Na_{1.9}Ti_{5.9}Ta_{0.1}O_{14}$ | 101.9 | 92.1 | 91.6 | 92.5 | 1.29 | 115 |
| Example D-7 | $Li_2Na_{1.99}Ti_{5.99}Ta_{0.01}O_{14}$ | 92.2 | 92.3 | 90.2 | 91.8 | 1.28 | 46 |
| Example D-8 | $Li_2Na_{1.9}Ti_{5.9}(Nb_{0.09}Ta_{0.01})O_{14}$ | 102.3 | 92.2 | 91.7 | 92.6 | 1.29 | 116 |
| Example D-9 | $Li_2Na_{1.5}Ti_{5.5}(Nb_{0.49}Ta_{0.1})O_{14}$ | 133.5 | 93.8 | 93.1 | 94.3 | 1.34 | 182 |
| Example D-10 | $Li_2Na_{1.5}Ti_{5.5}(Nb_{0.4}Ta_{0.1})O_{14}$ | 129.4 | 93.7 | 92.8 | 93.6 | 1.34 | 178 |
| Example D-11 | $Li_2Na_{1.25}Ti_{5.75}(Nb_{0.74}Ta_{0.01})O_{14}$ | 130.1 | 93.5 | 93.0 | 93.9 | 1.39 | 200 |
| Example D-12 | $Li_2Na_{1.8}Ti_{5.9}Mo_{0.1}O_{14}$ | 100.5 | 92.1 | 92.3 | 92.8 | 1.29 | 111 |
| Example D-13 | $Li_2Na_{1.4}Ti_{5.6}(Nb_{0.2}Mo_{0.2})O_{14}$ | 130.6 | 92.4 | 93.3 | 93.0 | 1.34 | 179 |
| Example D-14 | $Li_{2.2}Na_{1.9}Ti_{5.9}Fe_{0.1}O_{14}$ | 99.3 | 92.0 | 92.7 | 92.5 | 1.28 | 108 |
| Example D-15 | $Li_{2.2}Na_{1.5}Ti_{5.5}(Nb_{0.4}Fe_{0.1})O_{14}$ | 135.5 | 93.7 | 93.3 | 94.1 | 1.34 | 180 |
| Example D-16 | $Li_{2.2}Na_{1.9}Ti_{5.9}Co_{0.1}O_{14}$ | 98.3 | 92.3 | 92.9 | 93.0 | 1.28 | 109 |
| Example D-17 | $Li_{2.2}Na_{1.9}Ti_{5.9}Mn_{0.1}O_{14}$ | 99.0 | 92.1 | 92.7 | 92.7 | 1.28 | 106 |
| Example D-18 | $Li_{2.2}Na_{1.9}Ti_{5.9}Al_{0.1}O_{14}$ | 97.7 | 92.1 | 92.9 | 92.4 | 1.28 | 108 |

Example E

In Example E, a nonaqueous electrolyte battery was produced according to the following procedures.

(Production of Negative Electrode)

First, particles of the product of Example A-5 were ground so that the average particle size was 5 μm or less to obtain a ground product. Next, acetylene black, as a conductive agent, was mixed with the active material in an amount of 6 parts by mass relative to the active material to obtain a mixture. Next, the mixture was dispersed in NMP (N-methyl-2-pyrrolidone) to obtain a dispersion. Polyvinylidene fluoride (PVdF), as a binder, was mixed with the dispersion in an amount of 10 parts by mass relative to the product of Example A-5 to prepare a negative electrode slurry. A current collector, formed of aluminum foil, was coated with the slurry using a blade. After the obtained product was dried at 130° C. for 12 hours in vacuum, it was rolled so that a density of the electrode layer (excluding a current collector) was 2.2 g/cm³ to obtain a negative electrode.

(Production of Positive Electrode)

With a commercially available spinel lithium manganese oxide ($LiMn_2O_4$) was mixed 5 parts by weight of acetylene black as a conduction aid to obtain a mixture. Next, the mixture was dispersed in NMP to obtain a dispersion. To the dispersion was mixed with PVdF, as a binder, in an amount of 5 parts by weight relative to the lithium manganese oxide to prepare a positive electrode slurry. A current collector, formed of an aluminum foil, was coated with the slurry using a blade. After the obtained product was dried at 130° C. for 12 hours in vacuum, it was rolled so that a density of the electrode layer (excluding a current collector) was 2.1 g/cm³, to obtain a positive electrode.

(Production of Electrode Group)

The positive electrode and the negative electrode produced as described above were laminated with a polyethylene separator sandwiched between them to obtain a laminate. Next, this laminate was coiled and pressed to obtain a flat-shaped coiled electrode group. A positive electrode terminal and a negative electrode terminal were connected to this electrode group.

(Preparation of Nonaqueous Electrolyte)

As a mixed solvent, a mixed solvent of ethylene carbonate and diethyl carbonate (volume ratio of 1:1) was provided. Lithium hexafluorophosphate ($LiPF_6$) was dissolved in this solvent in a concentration of 1 M. Thus, a nonaqueous electrolyte was prepared.

(Assembly of Nonaqueous Electrolyte Battery)

Using the electrode group and the nonaqueous electrolyte produced as described above, a nonaqueous electrolyte battery of Example E was fabricated.

(Charge-And-Discharge Test)

The nonaqueous electrolyte battery of Example E was subjected to a charge-and-discharge test at room temperature. The charge-and-discharge test was performed at a charge-and-discharge current value of 0.2 C (a time discharge rate) within a potential range of 1.8 V to 3.1 V as the battery voltage.

Figure 13:
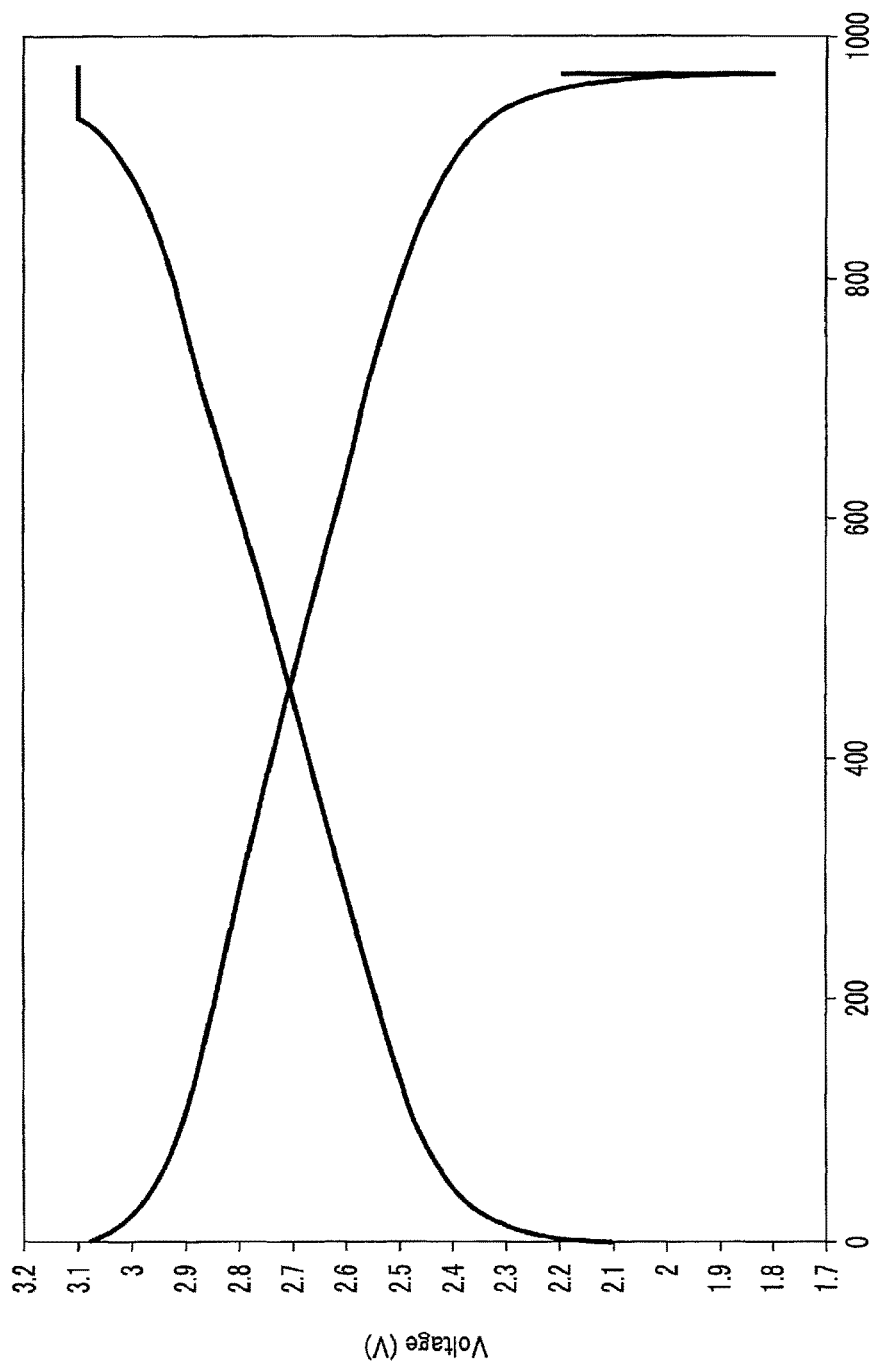
FIG. 13 shows a charge-and-discharge curve of a nonaqueous electrolyte battery of Example E.

FIG. 13 shows a charge-and-discharge curve of the nonaqueous electrolyte battery of Example E. As apparent from FIG. 13, in the nonaqueous electrolyte battery of Example E, the voltage smoothly varies within a voltage range of 2.3 V to 3.0 V, that is, a nonaqueous electrolyte battery in which the voltage smoothly varies within a voltage range of 2.3 V to 3.0 V could be obtained by using the product of Example A-5. When five of the nonaqueous electrolyte batteries were connected to each other in series, a higher operating voltage than that obtained in a case using a spinel lithium titanate ($Li_4Ti_5O_{12}$) as the negative electrode, i.e., 15.1 V to 11.5 V, was obtained, from which a battery pack having a voltage compatible with a 12 V lead storage battery for automobiles can be fabricated.

Example F

In Example F, battery modules of Examples F-1 to F-4 were produced according to the following procedures.

Example F-1

In Example F-1, five nonaqueous electrolyte batteries of Example F-1 were produced in the same procedures as described in Example E except that the particles of the product of Example A-4 were used instead of the particles of the product of Example A-5 when the negative electrode was produced.

Next, the five nonaqueous electrolyte batteries produced were electrically connected to each other in series. The thus obtained battery module was used as the battery module of Example F-1.

Example F-2 to F-4

In Examples F-2 to F-4, battery modules of Examples F-2 to F2-4 were produced in the same procedures as in Example F-1 except that the nonaqueous electrolyte battery of each of Examples F-2 to F-4 produced in the following procedures was used.

In Example F-2, five nonaqueous electrolyte batteries each of which was the same as the nonaqueous electrolyte battery of Example E were produced in the same procedures as described in Example E. They were used as the nonaqueous electrolyte batteries of Example F-2.

In Example F-3, five nonaqueous electrolyte batteries of Example F-3 were produced in the same procedures as described in Example E except that the particles of the product of Example A-6 were used instead of the particles of the product of Example A-5 when the negative electrode was produced.

In Example F-4, five nonaqueous electrolyte batteries of Example F-4 were produced in the same procedures as described in Example E except that the particles of the product of Example A-9 were used instead of the particles of the product of Example A-5 when the negative electrode was produced.

(Charge-And-Discharge Test)

The battery modules of Examples F-1 to F-4 were subjected to a charge-and-discharge test at room temperature. The charge-and-discharge test was performed at a charge-and-discharge current value of 0.2 C (a time discharge rate) within a potential range of 9.0 V to 15.5 V as the voltage of the battery module.

Figure 14:
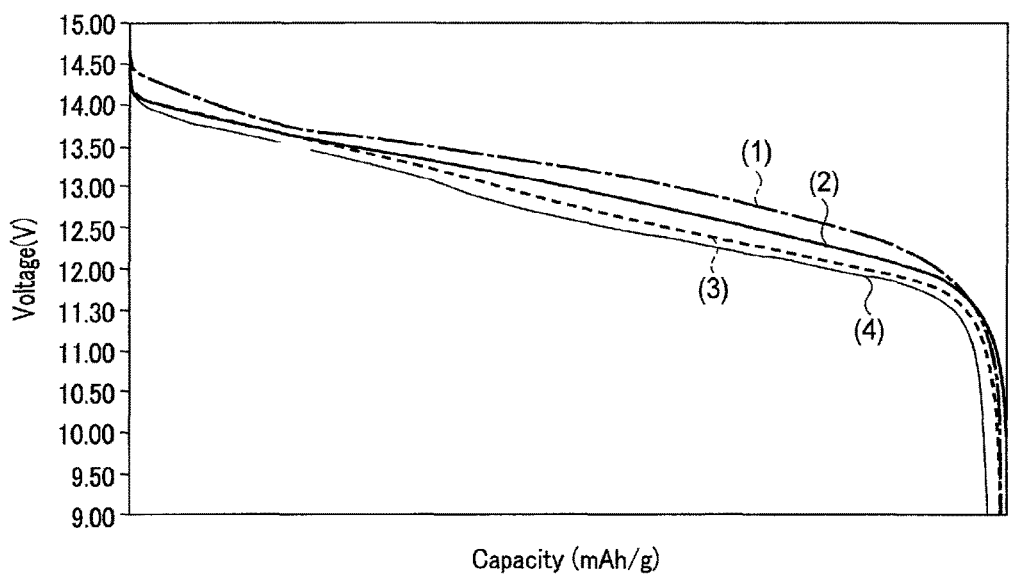
FIG. 14 shows charge-and-discharge curves of battery module of Example F-1 to F-4.

FIG. 14 shows discharge curves of the battery modules of Examples F-1 to F-4. In FIG. 14, the curve of long dashed and short dashed line having symbol (1) shows a discharge curve of the battery module of Example F-1. The curve of solid line having symbol (2) shows a discharge curve of the battery module of Example F-2. The curve of broken line having symbol (3) shows a discharge curve of the battery module of Example F-3. In addition, the curve of solid line having symbol (4) shows a discharge curve of the battery module of Example F-4.

From the results shown in FIG. 14, it is found that when the products of Examples A-4, A-5, A-6 and A-9 are used as the negative electrode active material, the battery modules having an average operating-voltage within a range of about 12.5 V to 13.5 V can be produced. It also is found that each discharge curve has a different voltage gradient. As described above, the operating voltage of the battery module can be designed according to the use by changing the average operating-voltage or the voltage gradient. For example, when a motor assist type hybrid car or an idling stop system is constructed by combining each battery module with a 12 V lead storage battery for automobiles, it is possible to design a battery pack voltage capable of preventing over-discharge of a lead storage battery upon a high load or adapting a voltage fluctuation upon an input of a regenerative energy.

The nonaqueous electrolyte battery using spinel lithium titanate ($Li_4Ti_5O_{12}$) as the negative electrode has a low average-operating-voltage, and thus it is necessary to connect six batteries in series, in order to obtain a voltage compatible with a lead storage battery for automobiles. On the other hand, as explained referring to examples, when the products of Example A-series, Example B-series, Example C-series and Example D-series are used as the negative electrode, the average operating-voltage of the nonaqueous electrolyte battery can be increased. When the products of Example A-series, Example B-series, Example C-series and Example D-series are used, accordingly, even if the number of the nonaqueous electrolyte batteries connected in series is changed to five, a battery module capable of exhibiting a voltage compatible with the 12 V lead storage battery for automobiles can be constructed, and thus a battery pack capable of exhibiting a voltage compatible with the 12 V lead storage battery for automobiles can be also constructed. The products of Example A-series, Example B-series, Example C-series, and Example D-series, accordingly, can realize a small size battery pack capable of exhibiting a low resistance and a high energy density at a low cost.

As explained above, according to at least one of the embodiments and Examples, the active material containing the composite oxide having the orthorhombic crystal structure is provided. The composite oxide is represented by the general formula $Li_{2+w}Na_{2-x}M1_yTi_{6-z}M2_zO_{14+\delta}$. The composite oxide can show a large potential change with a change of the capacity in a potential range of 1.0 V (vs. to 1.45 V (vs. $Li/Li^+$). The average action potential of the composite oxide can be controlled by changing the Na amount. In addition, the composite oxide can have a crystal structure in which lithium ions are easily inserted into and extracted from the crystal structure, and thus a high reversible capacity at the charge and discharge and excellent life span property can be realized. As a result, the active material can realize a nonaqueous electrolyte battery capable of showing high energy density, high battery voltage, and excellent life span property, and easily controlling the voltage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising:
a composite oxide having an orthorhombic crystal structure and represented by a general formula of $Li_{2+w}Na_{2-x}M1_yTi_{6-z}M2_zO_{14+\delta}$, wherein
the M1 is at least one selected from the group consisting of Cs and K,
the M2 is at least one selected from the group consisting of Zr, Sn, V, Nb, Ta, Mo, W, Fe, Co, Mn, and Al, and
w is within a range of $0 \le w \le 4$, x is within a range of $0 < x < 2$, y is within a range of $0 \le y < 2$, z is within a range of $0 < z \le 6$, and $\delta$ is within a range of $-0.5 \le \delta \le 0.5$.

2. The active material according to claim 1, wherein the M2 is at least one selected from the group consisting of trivalent Fe, Co, Mn and Al, tetravalent Zr and Sn, pentavalent V, Nb and Ta, and hexavalent Mo and W.

3. The active material according to claim 1, wherein, in an X-ray diffraction diagram for the composite oxide obtained by a powder X-ray diffraction method using Cu-Kα rays, an intensity ratio $I_L/I_H$ is within a range of $2.25 \le I_L/I_H \le 3.5$, wherein the intensity $I_L$ is an intensity of a strongest diffraction peak appearing in a range of $17° \le 2\theta \le 18.5°$, and the intensity $I_H$ is an intensity of a strongest diffraction peak appearing in a range of $18.5° \le 2\theta \le 19.5°$.

4. The active material according to claim 1, wherein the orthorhombic crystal structure belongs to a space group Fmmm, and
in an X-ray diffraction diagram for the composite oxide obtained by a powder X-ray diffraction method using Cu-Kα rays, an intensity ratio $I_{L1}/I_{H1}$ is within a range of $2.25 \le I_{L1}/I_{H1} \le 3.5$, wherein the intensity $I_{L1}$ is an intensity of a diffraction peak corresponding to a (111) plane, and the intensity $I_{H1}$ is an intensity of a diffraction peak corresponding to a (202) plane.

5. The active material according to claim 1, wherein,
the composite oxide is represented by a general formula of $Li_{2+w}Na_{2-x}M1_yTi_{6-z}M2_zO_{14+\delta}$,
the M2 is at least one selected from the group consisting of Zr, Sn, V, Nb, Ta, Mo, W, Fe, Co, Mn, and Al, and
w is within a range of $0 \leq w \leq 4$, x is within a range of $0 < x < 2$, z is within a range of $0 < z \leq 6$, y is 0, and $\delta$ is within a range of $-0.5 \leq \delta \leq 0.5$.

6. The active material according to claim 1, wherein the M2 comprises Nb.

7. The active material according to claim 1, wherein the M2 comprises two or more elements which have different valences and the M2 is selected from the group consisting of Zr, Sn, V, Nb, Ta, Mo, W, Fe, Co, Mn, and Al.

8. The active material according to claim 1, wherein the composite oxide is a particle, the active material further comprises a layer covering at least a part of a surface of the particle of the composite oxide, and the layer comprises carbon and/or lithium titanate.

9. The active material according to claim 1, wherein the active material is an active material for a battery.

10. A nonaqueous electrolyte battery comprising:
a negative electrode comprising the active material according to claim 1;
a positive electrode; and
a nonaqueous electrolyte.

11. The nonaqueous electrolyte battery according to claim 10, wherein
the negative electrode comprises a current collector and a negative electrode layer formed on the current collector,
the negative electrode layer comprises the active material,
a density of the negative electrode layer is in a range of 1.8 g/cm³ to 2.8 g/cm³.

12. A battery pack comprising the nonaqueous electrolyte battery according to claim 10.

13. A battery pack comprising nonaqueous electrolyte batteries, each of which comprises:
a negative electrode comprising the active material according to claim 1;
a positive electrode; and
a nonaqueous electrolyte,
wherein the nonaqueous electrolyte batteries are electrically connected in series and/or in parallel.

14. A battery module comprising nonaqueous electrolyte batteries, each of which comprises:
a negative electrode comprising the active material according to claim 1;
a positive electrode; and
a nonaqueous electrolyte, and
wherein the nonaqueous electrolyte batteries are electrically connected in series.

* * * * *